US007918016B2

(12) United States Patent
Hollis et al.

(10) Patent No.: US 7,918,016 B2
(45) Date of Patent: Apr. 5, 2011

(54) REINFORCED PLASTIC FOAM CUP, METHOD OF AND APPARATUS FOR MANUFACTURING SAME

(75) Inventors: Robert W. Hollis, Homer Glen, IL (US); Dimitri Stamatiou, Orland Park, IL (US)

(73) Assignee: Prairie Packaging, Inc., Bedford Park, IL (US)

(*) Notice: Subject to any disclaimer, the term of this patent is extended or adjusted under 35 U.S.C. 154(b) by 0 days.

(21) Appl. No.: 12/870,042

(22) Filed: Aug. 27, 2010

(65) Prior Publication Data

US 2010/0323866 A1 Dec. 23, 2010

Related U.S. Application Data

(62) Division of application No. 11/305,617, filed on Dec. 15, 2005, now Pat. No. 7,814,647.

(60) Provisional application No. 60/685,192, filed on May 27, 2005.

(51) Int. Cl.
*B23P 21/00* (2006.01)

(52) U.S. Cl. ................ 29/775; 29/785; 29/786; 29/783; 29/430

(58) Field of Classification Search .................... 29/775, 29/783, 785, 786, 793, 794, 430, DIG. 78
See application file for complete search history.

(56) References Cited

U.S. PATENT DOCUMENTS

| | | | |
|---|---|---|---|
| 261,131 | A | 7/1882 | Bonshire |
| 496,131 | A | 4/1893 | Peirce |
| 1,312,611 | A | 8/1919 | Chess |
| 1,545,580 | A | 7/1925 | Campbell |
| 1,770,118 | A | 7/1930 | Williams |
| 2,013,616 | A | 9/1935 | Rettenmeyer |
| 2,129,364 | A | 9/1938 | Simons et al. |
| 2,178,948 | A | 11/1939 | Brozek |
| 2,246,426 | A | 6/1941 | Wickstrom |
| 2,266,828 | A | 12/1941 | Sykes |
| 2,395,267 | A | 2/1946 | Gilbert |
| 2,563,352 | A | 8/1951 | Morse |
| 2,661,889 | A | 12/1953 | Phinney |
| 2,685,860 | A | 8/1954 | Plakas |
| 2,723,643 | A | 11/1955 | Weiss |
| 2,844,893 | A | 7/1958 | Keller |
| 2,853,222 | A | 9/1958 | Gallagher |
| 2,860,431 | A | 11/1958 | Barnum, Jr. |
| 2,917,217 | A | 12/1959 | Sisson |
| 2,983,692 | A | 5/1961 | D'Alelio |
| 3,023,175 | A | 2/1962 | Rodman, Jr. |
| 3,082,900 | A | 3/1963 | Goodman |

(Continued)

FOREIGN PATENT DOCUMENTS

DE 1786171 2/1972

(Continued)

OTHER PUBLICATIONS

Quaker® Instant Oatmeal Express container, printed from www.quakeroatmeal.com/qo_ourProducts/oatmealExpress/index.cfm on Sep. 18, 2006 and distributed by The Quaker Oats Company, P.O. Box 049003, Chicago, IL 60604-9003 available prior to May 2005.

(Continued)

*Primary Examiner* — David P Bryant
*Assistant Examiner* — Christopher M Koehler
(74) *Attorney, Agent, or Firm* — K&L Gates LLP

(57) ABSTRACT

A reinforced plastic foam cup including a body which defines an open top end and a closed bottom end, wherein the top end has a greater diameter than the bottom end. The body includes a reinforced tapered side wall that extends from the bottom end to the top end. A substantial portion of the reinforced tapered side wall includes a plastic foam layer, a pressure sensitive adhesive layer and a rigid material layer. Such reinforced plastic foam cup provides an improved tactile feel and enhanced insulation and rigidity properties.

1 Claim, 65 Drawing Sheets

U.S. PATENT DOCUMENTS 3,091,360 A 5/1963 Edwards
3,126,139 A 3/1964 Schechter
3,139,213 A 6/1964 Edwards
3,141,595 A 7/1964 Edwards
3,208,631 A 9/1965 Edwards
3,237,834 A 3/1966 Davis et al.
3,262,625 A 7/1966 Russell et al.
3,290,198 A 12/1966 Lux et al.
3,333,515 A 8/1967 McGlynn
3,374,922 A 3/1968 Shelby
3,468,467 A 9/1969 Amberg
3,471,075 A 10/1969 Wolf
3,514,887 A 6/1970 Jacob
3,519,165 A 7/1970 Hawley
3,574,957 A 4/1971 Bello-Bridick
3,580,468 A 5/1971 McDevitt
3,591,047 A 7/1971 Buhle
3,696,987 A 10/1972 Schuff et al.
3,733,002 A 5/1973 Fujio
3,754,699 A 8/1973 Moore
3,759,437 A 9/1973 Amberg
3,766,882 A 10/1973 Babbitt, III
3,769,056 A 10/1973 Sincock
3,796,366 A 3/1974 Hahn
3,897,899 A 8/1975 Schuff et al.
3,908,523 A 9/1975 Shikaya
3,908,877 A 9/1975 Kosisky
3,919,368 A 11/1975 Seto
3,930,917 A 1/1976 Esakov et al.
3,951,266 A 4/1976 Brewer
3,955,020 A 5/1976 Cavanagh et al.
3,959,189 A 5/1976 Kitamori
3,983,392 A 9/1976 Armstrong
3,984,511 A 10/1976 Lammers
3,988,521 A 10/1976 Fumel et al.
4,007,670 A 2/1977 Albano et al.
4,008,347 A 2/1977 Amberg et al.
4,016,327 A 4/1977 Fumei et al.
4,024,951 A 5/1977 Green
4,039,098 A 8/1977 Stilts
4,040,537 A 8/1977 Edwards
4,052,161 A 10/1977 Atwood et al.
4,073,231 A 2/1978 Roser
4,088,250 A 5/1978 Schaefer
4,130,234 A 12/1978 Schmidt
4,134,492 A 1/1979 Lucas
4,168,353 A 9/1979 Kitamori
4,187,276 A 2/1980 Amberg
4,190,187 A 2/1980 Nelms
4,193,494 A 3/1980 Green
4,203,240 A 5/1980 Goodwin
4,206,249 A 6/1980 Suzuki et al.
4,206,845 A 6/1980 Christian
4,238,033 A 12/1980 Artzt
4,238,267 A 12/1980 Konstantin
4,261,501 A 4/1981 Watkins et al.
4,264,657 A 4/1981 Tollette
4,268,567 A 5/1981 Harmony
4,273,816 A 6/1981 Tollette
4,288,026 A 9/1981 Wilhelm
4,303,756 A 12/1981 Kajimura et al.
4,303,757 A 12/1981 Kajimura et al.
4,325,058 A 4/1982 Wagner et al.
4,332,635 A * 6/1982 Holbrook et al. ............. 156/256
4,347,934 A 9/1982 Goodman
4,359,160 A 11/1982 Myers et al.
4,368,818 A 1/1983 Day
4,383,422 A 5/1983 Gordon et al.
4,394,917 A 7/1983 Looser
4,398,650 A 8/1983 Holmes et al.
4,405,045 A 9/1983 Villa-Real
4,409,045 A * 10/1983 Busse ............................ 156/69
4,414,055 A 11/1983 Young
D272,794 S 2/1984 Dart
4,435,344 A 3/1984 Iioka
4,468,274 A 8/1984 Adachi
4,479,770 A 10/1984 Slat et al.
4,486,366 A 12/1984 Reddy
4,500,386 A 2/1985 Hoffman
4,518,639 A 5/1985 Phillips
4,519,428 A 5/1985 Moody
4,528,221 A 7/1985 Komatsuzaki et al.
4,534,391 A 8/1985 Ventimiglia et al.
4,551,366 A 11/1985 Maruhashi et al.
4,567,681 A 2/1986 Fumei
4,574,020 A 3/1986 Fosnaught
4,592,884 A 6/1986 Thomson
4,626,455 A 12/1986 Karabedian
4,639,207 A 1/1987 Slat et al.
D289,483 S 4/1987 Wetter
D289,499 S 4/1987 Drummond et al.
4,658,974 A 4/1987 Fujita
4,661,188 A 4/1987 Fumei
D291,040 S 7/1987 Dart
4,679,724 A 7/1987 Inagaki
4,680,000 A 7/1987 Nowicki et al.
4,684,036 A 8/1987 Brewer
4,685,583 A 8/1987 Noon
4,709,800 A 12/1987 Olsen
4,715,527 A 12/1987 Tsuzuki et al.
4,726,493 A 2/1988 Wallace et al.
4,727,667 A 3/1988 Ingle
4,731,147 A 3/1988 Mohn
4,737,209 A 4/1988 Tomashauser et al.
4,743,469 A 5/1988 Lehmann
4,747,509 A 5/1988 Florkiewicz et al.
4,753,365 A 6/1988 Seppala
4,793,891 A 12/1988 Freeman et al.
4,801,017 A 1/1989 Artusi
4,806,197 A * 2/1989 Harvey ......................... 156/449
4,818,461 A 4/1989 Batson et al.
4,832,774 A 5/1989 DiFrank et al.
4,832,775 A 5/1989 Park et al.
4,832,783 A 5/1989 Nechay et al.
4,834,641 A 5/1989 Keyser
4,877,119 A 10/1989 Hosking
4,877,391 A 10/1989 Batson et al.
4,878,970 A * 11/1989 Schubert et al. ................ 156/69
4,909,723 A 3/1990 Slat et al.
4,911,285 A 3/1990 Rogall et al.
4,944,825 A 7/1990 Gifford et al.
4,944,830 A 7/1990 Zodrow et al.
4,973,241 A 11/1990 Keyser
4,973,374 A 11/1990 Karlyn
4,976,803 A 12/1990 Tomashauer et al.
4,981,547 A 1/1991 Zodrow et al.
4,982,872 A 1/1991 Avery
4,983,238 A 1/1991 Yoshida et al.
4,993,580 A 2/1991 Smith
4,994,135 A 2/1991 Orlandi
5,004,518 A 4/1991 Zodrow
5,007,578 A 4/1991 Simone
5,017,261 A 5/1991 Zodrow et al.
5,021,116 A 6/1991 Milgram, Jr. et al.
5,022,235 A 6/1991 Grissom
5,025,981 A 6/1991 Schellenberg
5,037,499 A 8/1991 Bright et al.
5,043,130 A 8/1991 Fujio
5,044,922 A 9/1991 Plenzler et al.
5,045,255 A 9/1991 Kurz
5,062,917 A 11/1991 Zodrow
5,062,918 A 11/1991 Zodrow
5,076,613 A 12/1991 Kovacs
5,078,826 A 1/1992 Rogall
5,082,520 A 1/1992 West et al.
5,087,317 A 2/1992 Rogall
5,092,485 A 3/1992 Lee
5,104,306 A 4/1992 Gordon et al.
5,110,402 A 5/1992 Zodrow et al.
5,120,392 A 6/1992 Butkevich et al.
5,121,827 A 6/1992 Ribordy
5,129,984 A 7/1992 Tomashauser et al.
5,145,107 A 9/1992 Silver et al.
5,154,448 A 10/1992 Griffin et al.
5,160,570 A 11/1992 Dickey
5,163,608 A 11/1992 Block
5,167,755 A 12/1992 Zodrow et al.

| | | | |
|---|---|---|---|
| 5,174,851 A | 12/1992 | Zodrow et al. | |
| 5,185,053 A | 2/1993 | Tomashauser et al. | |
| 5,186,350 A | 2/1993 | McBride | |
| 5,188,696 A * | 2/1993 | Good, Jr. | 156/361 |
| 5,188,775 A | 2/1993 | Hornback et al. | |
| 5,191,979 A | 3/1993 | Nemeroff | |
| 5,201,984 A | 4/1993 | Bedin | |
| 5,203,490 A | 4/1993 | Roe | |
| 5,205,473 A | 4/1993 | Coffin, Sr. | |
| 5,213,858 A | 5/1993 | Tanner et al. | |
| 5,217,538 A * | 6/1993 | Buchholz et al. | 134/25.4 |
| 5,223,315 A | 6/1993 | Katsura et al. | |
| 5,226,585 A | 7/1993 | Varano | |
| 5,227,005 A | 7/1993 | Zodrow et al. | |
| 5,244,861 A | 9/1993 | Campbell et al. | |
| 5,259,529 A | 11/1993 | Coale | |
| 5,266,149 A | 11/1993 | Collette et al. | |
| 5,271,783 A | 12/1993 | Potter | |
| 5,301,802 A | 4/1994 | Nemeroff | |
| 5,308,693 A | 5/1994 | Ryle et al. | |
| 5,316,777 A | 5/1994 | Toyoda et al. | |
| 5,322,380 A | 6/1994 | Crocker | |
| 5,324,153 A | 6/1994 | Chess | |
| 5,362,436 A | 11/1994 | Wagner | |
| 5,363,982 A | 11/1994 | Sadlier | |
| 5,384,174 A | 1/1995 | Ward et al. | |
| 5,385,260 A | 1/1995 | Gatcomb | |
| 5,385,764 A | 1/1995 | Andersen et al. | |
| 5,454,484 A | 10/1995 | Chelossi | |
| 5,460,323 A | 10/1995 | Titus | |
| 5,467,891 A | 11/1995 | Perry | |
| 5,470,420 A | 11/1995 | Yokajty | |
| 5,478,422 A | 12/1995 | Bright et al. | |
| 5,490,631 A | 2/1996 | Iioka et al. | |
| 5,524,817 A | 6/1996 | Meier et al. | |
| 5,542,599 A | 8/1996 | Sobol | |
| 5,547,124 A | 8/1996 | Mueller | |
| 5,569,353 A | 10/1996 | Zodrow | |
| 5,580,409 A | 12/1996 | Andersen et al. | |
| 5,580,624 A | 12/1996 | Andersen et al. | |
| 5,586,087 A | 12/1996 | Silverson | |
| 5,605,597 A | 2/1997 | Plenzler | |
| 5,628,453 A | 5/1997 | MacLaughlin | |
| D381,558 S | 7/1997 | Schaefer et al. | |
| 5,660,326 A | 8/1997 | Varamo et al. | |
| D383,942 S | 9/1997 | Rench et al. | |
| 5,665,439 A | 9/1997 | Andersen et al. | |
| 5,685,480 A | 11/1997 | Choi | |
| 5,697,550 A | 12/1997 | Varano et al. | |
| 5,702,559 A | 12/1997 | Bright | |
| 5,705,237 A | 1/1998 | Andersen et al. | |
| 5,705,242 A | 1/1998 | Andersen et al. | |
| 5,706,948 A | 1/1998 | Hughes | |
| 5,713,403 A | 2/1998 | Clüsserath et al. | |
| 5,713,512 A | 2/1998 | Barrett | |
| 5,725,916 A | 3/1998 | Ishii et al. | |
| 5,752,653 A | 5/1998 | Razzaghi | |
| 5,753,308 A | 5/1998 | Andersen et al. | |
| RE35,830 E | 6/1998 | Sadlier | |
| 5,759,624 A | 6/1998 | Neale et al. | |
| 5,762,379 A | 6/1998 | Salmon et al. | |
| 5,765,716 A | 6/1998 | Cai et al. | |
| 5,766,401 A | 6/1998 | Campbell et al. | |
| 5,766,709 A | 6/1998 | Geddes et al. | |
| 5,769,311 A | 6/1998 | Morita et al. | |
| 5,775,577 A | 7/1998 | Titus | |
| 5,792,536 A | 8/1998 | Whipp | |
| 5,805,969 A | 9/1998 | Elsermans et al. | |
| 5,808,681 A | 9/1998 | Kitajima | |
| 5,809,674 A | 9/1998 | Key | |
| 5,820,016 A | 10/1998 | Stropkay | |
| 5,839,581 A | 11/1998 | Vagedes | |
| 5,840,139 A | 11/1998 | Geddes et al. | |
| 5,842,633 A | 12/1998 | Nurse | |
| 5,853,965 A | 12/1998 | Haydock et al. | |
| 5,857,615 A | 1/1999 | Rose | |
| 5,862,977 A | 1/1999 | Hirano | |
| 5,866,282 A | 2/1999 | Bourdelais et al. | |
| 5,868,310 A | 2/1999 | Leszczynski | |
| 5,874,205 A | 2/1999 | Bourdelais et al. | |
| 5,879,496 A | 3/1999 | Bright et al. | |
| 5,882,474 A | 3/1999 | Gomes et al. | |
| 5,884,421 A | 3/1999 | Key | |
| 5,888,643 A | 3/1999 | Aylward et al. | |
| 5,888,683 A | 3/1999 | Gula et al. | |
| 5,888,714 A | 3/1999 | Bourdelais et al. | |
| 5,897,722 A | 4/1999 | Bright | |
| 5,908,590 A * | 6/1999 | Yoshimi et al. | 264/45.4 |
| 5,911,904 A | 6/1999 | Shih et al. | |
| 5,934,501 A | 8/1999 | Wright et al. | |
| 5,940,009 A | 8/1999 | Loy et al. | |
| 5,950,917 A | 9/1999 | Smith | |
| 5,952,068 A | 9/1999 | Neale et al. | |
| 5,964,400 A | 10/1999 | Varano et al. | |
| 5,968,616 A | 10/1999 | Kakemura et al. | |
| 5,974,843 A | 11/1999 | Burkholder | |
| 5,975,336 A | 11/1999 | Hart | |
| 5,976,655 A | 11/1999 | Sykes | |
| 5,993,705 A | 11/1999 | Grishchenko et al. | |
| 5,996,887 A | 12/1999 | Cai et al. | |
| 6,007,759 A | 12/1999 | Ten Tje et al. | |
| 6,022,570 A | 2/2000 | Richmond | |
| 6,030,476 A | 2/2000 | Geddes et al. | |
| 6,032,826 A | 3/2000 | Libit et al. | |
| 6,039,682 A | 3/2000 | Dees et al. | |
| 6,050,319 A | 4/2000 | Hinton | |
| 6,053,352 A | 4/2000 | Cai | |
| 6,058,985 A | 5/2000 | Petri et al. | |
| 6,063,564 A | 5/2000 | Ishikawa et al. | |
| 6,066,375 A | 5/2000 | Shanton | |
| 6,066,594 A | 5/2000 | Gunn et al. | |
| 6,068,182 A | 5/2000 | Tokunaga | |
| 6,085,970 A | 7/2000 | Sadlier | |
| 6,089,180 A | 7/2000 | Nichols, Jr. | |
| D429,446 S | 8/2000 | Toussant et al. | |
| 6,109,518 A | 8/2000 | Mueller et al. | |
| 6,116,503 A | 9/2000 | Varano | |
| 6,126,584 A | 10/2000 | Zadravetz | |
| 6,127,439 A | 10/2000 | Berghmans et al. | |
| 6,129,653 A | 10/2000 | Fredricks et al. | |
| 6,136,396 A | 10/2000 | Gilmer | |
| 6,138,862 A | 10/2000 | Tai | |
| 6,139,665 A | 10/2000 | Schmelzer et al. | |
| 6,140,614 A | 10/2000 | Padamsee | |
| 6,142,331 A | 11/2000 | Breining et al. | |
| 6,152,363 A | 11/2000 | Rule, Jr. | |
| 6,160,027 A | 12/2000 | Crevecoeur et al. | |
| D436,295 S | 1/2001 | Furman et al. | |
| 6,186,394 B1 | 2/2001 | Dees et al. | |
| 6,193,098 B1 | 2/2001 | Mochizuki et al. | |
| D439,472 S | 3/2001 | Wang | |
| 6,196,454 B1 | 3/2001 | Sadlier | |
| 6,212,803 B1 | 4/2001 | Key | |
| 6,213,309 B1 | 4/2001 | Dadisho | |
| 6,224,954 B1 | 5/2001 | Mitchell et al. | |
| 6,242,540 B1 | 6/2001 | Crevecoeur et al. | |
| 6,253,995 B1 | 7/2001 | Blok et al. | |
| 6,257,485 B1 | 7/2001 | Sadlier et al. | |
| 6,260,756 B1 | 7/2001 | Mochizuki et al. | |
| 6,267,837 B1 | 7/2001 | Mitchell et al. | |
| D446,687 S | 8/2001 | Furman et al. | |
| 6,277,454 B1 | 8/2001 | Neale et al. | |
| 6,286,709 B1 | 9/2001 | Hudson | |
| 6,286,754 B1 | 9/2001 | Stier et al. | |
| 6,287,247 B1 | 9/2001 | Dees et al. | |
| 6,308,883 B1 | 10/2001 | Schmelzer et al. | |
| 6,319,590 B1 | 11/2001 | Geddes et al. | |
| 6,328,557 B1 | 12/2001 | Grishchenko et al. | |
| 6,364,149 B1 | 4/2002 | Smith | |
| 6,364,201 B1 | 4/2002 | Varano | |
| 6,378,766 B2 | 4/2002 | Sadlier | |
| 6,386,756 B1 | 5/2002 | Rice | |
| 6,416,829 B2 | 7/2002 | Breining et al. | |
| 6,422,456 B1 | 7/2002 | Sadlier | |
| 6,423,169 B1 | 7/2002 | Cobb | |
| 6,439,368 B1 | 8/2002 | Kortge | |
| 6,474,390 B1 | 11/2002 | Vandevoorde | |
| 6,474,499 B2 | 11/2002 | Donelson et al. | |

| | | | |
|---|---|---|---|
| 6,482,481 | B1 | 11/2002 | Fredricks et al. |
| 6,488,794 | B1 | 12/2002 | Bright et al. |
| 6,491,214 | B2 | 12/2002 | Plummer et al. |
| 6,508,902 | B2 | 1/2003 | Lind |
| 6,516,548 | B2 | 2/2003 | Lage et al. |
| 6,536,657 | B2 | 3/2003 | Van Handed |
| 6,546,958 | B1 | 4/2003 | Parker et al. |
| 6,554,154 | B1 | 4/2003 | Chauhan et al. |
| 6,565,934 | B1 | 5/2003 | Fredricks et al. |
| 6,572,016 | B2 | 6/2003 | Saveliev et al. |
| D477,751 | S | 7/2003 | Chuang |
| 6,586,075 | B1 | 7/2003 | Mitchell et al. |
| 6,601,728 | B1 | 8/2003 | Newkirk et al. |
| 6,607,800 | B1 | 8/2003 | Brandt et al. |
| 6,620,281 | B1 | 9/2003 | Sommers |
| 6,644,846 | B2 | 11/2003 | Willat |
| 6,648,217 | B2 | 11/2003 | Schein |
| 6,652,936 | B1 | 11/2003 | Bright et al. |
| 6,663,926 | B1 | 12/2003 | Okushita et al. |
| 6,663,927 | B2 | 12/2003 | Breining et al. |
| 6,676,586 | B2 | 1/2004 | Breining et al. |
| 6,703,090 | B2 | 3/2004 | Breining et al. |
| 6,729,534 | B2 | 5/2004 | Van Handed |
| 6,740,373 | B1 | 5/2004 | Swoboda et al. |
| 6,811,843 | B2 | 11/2004 | DeBraal et al. |
| 6,814,253 | B2 | 11/2004 | Wong |
| D500,343 | S | 12/2004 | McRobbie |
| 6,844,041 | B2 | 1/2005 | Squier et al. |
| 6,849,147 | B2 | 2/2005 | Havard et al. |
| 6,852,381 | B2 | 2/2005 | Debraal et al. |
| 6,877,504 | B2 | 4/2005 | Schreff et al. |
| 6,908,949 | B2 | 6/2005 | Arch et al. |
| 6,919,111 | B2 | 7/2005 | Swoboda et al. |
| 6,926,197 | B2 | 8/2005 | Hed et al. |
| 7,021,594 | B2 | 4/2006 | Exler |
| 7,081,286 | B2 | 7/2006 | Benim et al. |
| 7,108,906 | B2 | 9/2006 | Benim et al. |
| D531,854 | S | 11/2006 | Bresler |
| D537,677 | S | 3/2007 | Bresler |
| D537,748 | S | 3/2007 | Bulgari |
| 7,536,767 | B2 | 5/2009 | Hollis et al. |
| 7,552,841 | B2 | 6/2009 | Hollis et al. |
| 2001/0013391 | A1 | 8/2001 | Amrine |
| 2001/0013537 | A1 | 8/2001 | Sadlier |
| 2001/0038014 | A1 | 11/2001 | Donelson et al. |
| 2001/0042729 | A1 | 11/2001 | Gale |
| 2001/0050287 | A1 | 12/2001 | Namba et al. |
| 2002/0041046 | A1 | 4/2002 | Hartjes et al. |
| 2002/0043555 | A1 | 4/2002 | Mader |
| 2002/0121456 | A1 | 9/2002 | Mannion et al. |
| 2002/0134831 | A1 | 9/2002 | Saveliev et al. |
| 2002/0144769 | A1 | 10/2002 | DeBraal et al. |
| 2002/0172784 | A1 | 11/2002 | DeBraal et al. |
| 2002/0172818 | A1 | 11/2002 | DeBraal et al. |
| 2002/0182347 | A1 | 12/2002 | DeBraal et al. |
| 2003/0003249 | A1 | 1/2003 | Benim et al. |
| 2003/0003251 | A1 | 1/2003 | DeBraal et al. |
| 2003/0015582 | A1 | 1/2003 | Handel |
| 2003/0021921 | A1 | 1/2003 | DeBraal et al. |
| 2003/0041489 | A1 | 3/2003 | Murphy et al. |
| 2003/0108696 | A1 | 6/2003 | Frisk et al. |
| 2003/0116576 | A1 | 6/2003 | Lang-Boecker |
| 2003/0121963 | A1 | 7/2003 | Van Handel |
| 2003/0134061 | A1 | 7/2003 | Benim et al. |
| 2003/0134073 | A1 | 7/2003 | Sellars |
| 2003/0146533 | A1 | 8/2003 | Gornell |
| 2003/0146549 | A1 | 8/2003 | Dunlap et al. |
| 2003/0157224 | A1 | 8/2003 | Westerhof et al. |
| 2003/0207059 | A1 | 11/2003 | Benim et al. |
| 2003/0228336 | A1 | 12/2003 | Gervasio |
| 2003/0234255 | A1 | 12/2003 | Hagopian et al. |
| 2004/0013830 | A1 | 1/2004 | Nonomura et al. |
| 2004/0015582 | A1 | 1/2004 | Pruthi |
| 2004/0037980 | A1 | 2/2004 | DeBraal |
| 2004/0055189 | A1 | 3/2004 | Giraud |
| 2004/0060212 | A1 | 4/2004 | Murphy et al. |
| 2004/0060840 | A1 | 4/2004 | Williams et al. |
| 2004/0064983 | A1 | 4/2004 | Joseph |
| 2004/0096601 | A1 | 5/2004 | Raymond |
| 2004/0112949 | A1 | 6/2004 | Hed et al. |
| 2004/0121101 | A1 | 6/2004 | Tang et al. |
| 2004/0185235 | A1 | 9/2004 | Emery et al. |
| 2004/0197524 | A1 | 10/2004 | Rockford et al. |
| 2004/0238989 | A1 | 12/2004 | DeBraal et al. |
| 2004/0244242 | A1 | 12/2004 | Maliner et al. |
| 2005/0003122 | A1 | 1/2005 | DeBraal et al. |
| 2005/0024858 | A1 | 2/2005 | Johnson |
| 2005/0227029 | A1 | 10/2005 | Dart et al. |
| 2005/0236468 | A1 | 10/2005 | Sadlier |
| 2006/0005917 | A1 | 1/2006 | Alvarez |
| 2006/0038001 | A1 | 2/2006 | Stepanek, Jr. |
| 2006/0124718 | A1 | 6/2006 | Matty |
| 2006/0131316 | A1 | 6/2006 | Bresler |
| 2006/0131317 | A1 | 6/2006 | Bresler |
| 2006/0144915 | A1 | 7/2006 | Sadler |
| 2006/0177410 | A1 | 8/2006 | Gervasio |
| 2006/0177411 | A1 | 8/2006 | Gervasio |
| 2006/0189030 | A1 | 8/2006 | Chambers et al. |
| 2006/0283855 | A1 | 12/2006 | Hollis et al. |
| 2007/0006962 | A1 | 1/2007 | Hollis et al. |
| 2007/0042144 | A1 | 2/2007 | Teensma et al. |
| 2007/0107187 | A1 | 5/2007 | Hollis et al. |

FOREIGN PATENT DOCUMENTS

| | | |
|---|---|---|
| DE | 2330767 | 6/1973 |
| DE | 4409952 | 2/1995 |
| DE | 29611301 | 10/1996 |
| EP | 0 395 585 | 10/1990 |
| EP | 0 511 562 | 11/1992 |
| EP | 0 254 446 | 1/1998 |
| EP | 1 065 040 | 1/2001 |
| EP | 1 155 971 | 11/2001 |
| FR | 993 163 | 8/1949 |
| FR | 2.206.240 | 6/1974 |
| FR | 2 229 612 | 12/1974 |
| FR | 2.397.987 | 2/1979 |
| FR | 2481229 | 10/1981 |
| GB | 0666115 | 2/1952 |
| GB | 0865024 | 4/1961 |
| GB | 0865025 | 4/1961 |
| GB | 0866801 | 5/1961 |
| GB | 1291371 | 1/1970 |
| GB | 1351099 | 4/1974 |
| GB | 1391371 | 4/1975 |
| GB | 1441666 | 7/1976 |
| GB | 1545578 | 5/1979 |
| GB | 1545579 | 5/1979 |
| GB | 1575806 | 10/1980 |
| GB | 2130471 | 6/1984 |
| GB | 2172880 | 10/1986 |
| GB | 2352612 | 2/2001 |
| GB | 2363776 | 1/2002 |
| JP | 52148384 | 12/1977 |
| JP | 1999/179810 | 7/1999 |
| WO | WO 90/13708 | 11/1990 |
| WO | WO 94/04330 | 3/1994 |
| WO | WO 95/07648 | 3/1995 |
| WO | WO 95/15849 | 6/1995 |
| WO | WO 97/07034 | 2/1997 |
| WO | WO 00/37322 | 6/2000 |
| WO | WO 01/17893 | 3/2001 |
| WO | WO 01/85420 | 11/2001 |
| WO | WO 01/85421 | 11/2001 |
| WO | WO 2004/058490 | 7/2004 |
| WO | WO 2006/065849 | 6/2006 |
| WO | WO 2006/066036 | 6/2006 |

OTHER PUBLICATIONS

International Search Report for PCT/US06/18366 dated Aug. 14, 2008.

Insulair Cup Brochure, printed from www.insulair.com on Apr. 5, 2006, available prior to May 2005.

Jul. 31, 2008 Office Action for U.S. Appl. No. 11/305,809.

KL 2090/60 Label Operation Manual, written by KHS, published in 2004.

KL 2090/60 Label Operation Manual—Encode Disassembly and Maintenance, written by KHS, published in 2004.

Applied Plastic Label—Training Manual, written by KHS, available prior to May 2005.

KHS-APL Maintenance Change Out Procedures, written by KHS, available prior to May 2005.

* cited by examiner

REINFORCED PLASTIC FOAM CUP, METHOD OF AND APPARATUS FOR MANUFACTURING SAME

PRIORITY CLAIM

This application is a divisional of, claims priority to and the benefit of U.S. patent application Ser. No. 11/305,617, filed on Dec. 15, 2005, which claims priority to and the benefit of U.S. Provisional Patent Application Ser. No. 60/685,192, filed on May 27, 2005, the entire contents of which are incorporated by reference herein.

CROSS REFERENCE TO RELATED APPLICATIONS

This application relates to the following co-pending, commonly owned applications: "REINFORCED FOAM CUP, METHOD OF AND APPARATUS FOR MANUFACTURING SAME," Ser. No. 12/642,405, "APPARATUS AND METHOD FOR MANUFACTURING REINFORCED CONTAINERS," Ser. No. 12/717,728.

BACKGROUND

Drinking cups are commonly used in the consumption of beverages and other products. Every day, millions of such cups are distributed by fast food restaurants, coffee shops and convenience stores for single use purposes. These cups are usually disposed of after a single use.

One type of known disposable cup is a conventional plastic foam cup, such as a beaded polystyrene foam cup. A conventional plastic foam cup, generally illustrated in FIGS. 1 and 2, is generally indicated by numeral 10. The conventional plastic foam cup 10 includes a resilient, frustoconical body 12. The body is open at a first or top end 14 and closed at a second or bottom end 16. The top end has a greater diameter than the bottom end. The frustoconical body is designed to facilitate stacking a plurality of cups together for transportation and dispensing purposes. The body includes a tapered side wall 18 having an inner face or surface 20 and an outer face or surface 22 that extends from the top end to the bottom end. The inner face or surface of the tapered side wall may include at least one interior shelf which facilitates stacking of a plurality of the cups. When the cup is positioned in an upright position, the tapered side wall 18 is typically angled offset from a vertical plane at a suitable angle in the range of two degrees to fifteen degrees. The tapered side wall 18 includes an outwardly formed or extending lip 24. The outwardly formed lip is suitably shaped such that an annular mounting portion of a drinking cup lid (not shown) can be attached to the formed lip to secure the drinking cup lid to the top of the cup. The outwardly formed lip is sometimes utilized to hold the cup in place prior to the cup being dispensed from a conventional cup dispenser.

One method of forming these conventional plastic foam cups includes adding expanded polystyrene beads (which were previously modified with a suitable foaming agent) into a mold or cavity. Steam is injected into the mold or cavity which causes the polystyrene beads to expand to form the cup. The formed cup is subsequently removed from the mold or cavity. However, it should be appreciated that other suitable methods of forming a conventional plastic foam cup, including any suitable injection molding technique, are known.

Conventional plastic foam cups have outstanding heat-insulating properties which make them particularly useful for serving hot beverages, such as coffee, hot tea, soups and hot chocolate. These cups enable a person to hold the cup without burning themselves and also tend to keep the beverage hot. Conventional plastic foam cups also have outstanding cold-insulating properties which make them particularly useful for serving cold food or beverages, such as milk shakes, ice cream and chilled beverages. These cups tend to keep the food or beverage cold for extended periods of time. Such conventional plastic foam cups cost relatively less to manufacture than paper or plastic based cups and are more leak resistant than cups which are formed from more than one member as described below. However, the outer surfaces of conventional plastic foam cups do not provide the tactile feel of paper-based cups nor do such cups facilitate high-quality graphics to be printed on the outer surfaces of such plastic foam cups Other known insulated disposable cups for hot or cold beverages are formed from paper. Paper cups are fabricated from a paper body member which is bonded to a bottom paper panel member having an upper surface and a bottom surface, wherein the joined portions of the bottom panel member and body member form a seal. Paper-based cups include an inner lining which covers the inner surface of the body and the upper surface of the bottom end, wherein the inner lining is effective to prevent penetration of liquid into the paper during use. However, because these cups are formed from two members (i.e., the body member and the bottom panel member), these cups are more prone to leaking along the seam where the two members are joined. Conventional paper cups have an outer surface which provides a comfortable tactile feel but have very poor heat-insulating qualities. For example, paper cups are often too hot to handle for a period of time after being filled with a hot beverage. Beverage servers and consumers commonly nest two or more paper-based cups together or add an insulating sleeve to provide insulation for hot drinks such as hot coffee, hot tea and hot chocolate. This is undesirable because it increases the number of cups or sleeves used and costs additional money. Double cupping can also make a filled cup more unstable or tipsy.

To solve these problems, it has been proposed to attach paper to a plastic foam cup. One known method of applying paper to a plastic foam cup is to spot glue portions of the inner face of a stationary piece of paper with a suitable adhesive and bringing a cup in contact with the stationary paper to attach the paper to the plastic foam cup. This results in substantial portions of the paper not including adhesive. Due to the inconsistent and incomplete placement of the adhesive on the paper, wrinkles are formed when the paper is applied to or otherwise wrapped around the cup. Such wrinkles are undesirable for a manufacturer and aesthetically displeasing to consumers.

Another known method includes applying a film to a plastic foam cup and heat shrinking the film on the cup when the cup is formed. Such "in-mold" method includes integrating the film with the material of the cup during the cup manufacturing process. Such integration includes stretching the film around the material which will form the cup and subsequently heating the material and film to shrink the film to adhere to the material. While this cup includes the desired insulation properties of a plastic foam cup, this method is relatively expensive.

Accordingly, a need exists to provide a disposable drinking cup with the insulation properties of a plastic foam cup and the tactile feel and high quality graphic printing properties of a paper-based cup to provide an enhanced drinking experience for a person. Furthermore, a need exists to provide an apparatus, system and method for manufacturing such a disposable drinking cup.

The various known machines, systems and methods for affixing one or more labels to beverage containers do not solve these needs. For instance, U.S. Pat. Nos. 4,709,800; 4,729,81; 4,731,147; 4,743,469; 4,911,285; 4,944,825; 4,944,830; 4,950,350; 4,973,374; 4,981,547; 4,994,135; 5,004,518; 5,017,261; 5,021,116; 5,037,499; 5,062,917; 5,062,918; 5,078,826; 5,082,520; 5,087,317; 5,110,402; 5,120,392; 5,121,827; 5,129,984; 5,160,570; 5,167,755; 5,174,851; 5,185,053; 5,188,696; 5,201,984; 5,217,538; 5,227,005; 5,271,783; 5,569,353; 5,713,403; 5,882,474; and 6,050,319 describe known machines, systems and components for applying one or more labels to beverage containers. These patents do not provide solutions to the above mentioned problems The reinforced cup and the cup reinforcing machines, apparatus, systems and methods disclosed herein represent, at least in part, improvements of one or more of the machines, systems and methods disclosed in such patents.

SUMMARY

The present disclosure relates in general to a reinforced plastic foam cup, and more particularly to a disposable plastic foam cup with an attached reinforcing member and to apparatus, methods and supplies for manufacturing the same.

Generally, in one embodiment, the reinforced plastic foam cup includes a reinforcing member attached to a substantial portion of the outer surface of the tapered side wall of the body of the reinforced plastic foam cup. The substantial portion of the tapered side wall which the reinforcing member is attached to will thus include a plastic foam layer, an adhesive layer and a rigid material layer. Compared to a non-reinforced plastic foam cup which only includes a plastic foam layer, the reinforced plastic foam cup with a multi-layered tapered side wall (i.e., the three layers of the plastic foam layer, the adhesive layer and the rigid material layer) provides a substantial increase in the rigidity of the reinforced plastic foam cup. Accordingly, the reinforced plastic foam cup provides the insulation properties of a plastic foam cup and the tactile feel of a paper-based cup.

In one embodiment, the base cup (i.e., the pre-reinforced plastic foam cup) is a conventional plastic foam cup, such as a cup formed from beaded polystyrene or any other suitable material. More specifically, the base or pre-reinforced plastic foam cup includes a resilient, frustoconical body. The body is open at a first or top end and closed at a second or bottom end. The top end has a greater diameter than the bottom end. The body includes a tapered side wall having an inner face or surface and an outer face or surface. The tapered side wall extends from the bottom end of the body to the top end of the body at a suitable angle offset from a vertical plane. The cup also includes an outwardly formed lip extending from the tapered side wall. The outwardly formed lip is suitably shaped such that the annular mounting portion of an appropriately shaped and sized drinking cup lid may be attached to the formed lip to secure the drinking cup lid to the top of the base cup. In one alternative embodiment as further described below, the conventional plastic foam cup has been modified to be handled by the cup reinforcing system described below. These modifications generally include: increasing the height of side wall below the bottom wall of the cup, increasing the angle of the inner surface of the tapered side wall of the cup below and adjacent to the bottom wall, and increasing the width of the outwardly extending lip at the top end of the cup.

In one embodiment, a reinforcing member or reinforcer includes a body formed from a malleable, flexible material, such as a suitable paper, a suitable plastic, a suitable composite material or any other suitable material. While this material is flexible, it has properties which provide rigidity and durability when attached to the base cup. Thus, it is sometimes referred to herein as a rigid material. In one embodiment, the body is defined by an annular, concavely shaped top edge, an annular, convexly shaped bottom edge, an angled front or leading edge and an angled rear or trailing edge. In one embodiment, for reasons described below, a portion of the front or leading edge is vertically or substantially vertically disposed. In this embodiment, the vertical or substantially vertical portion of the front edge is clearly distinguishable from the remainder of the front edge of the reinforcing member and the rear edge of the reinforcing member which are each respectively angled offset from a vertical plane. It should be appreciated that the angling of a substantial portion of the front edge and the entire rear edge of the reinforcing member provides an enhanced fit of the reinforcing member when attached to the outer surface of the tapered side wall of the base cup. In another embodiment, as further described below, a portion of the trailing edge is vertically or substantially vertically disposed. In this embodiment, the vertical portion of the trailing edge is clearly distinguished from the remainder of the trailing or rear edge of the reinforcing member.

In one embodiment, an inner face or surface of the body of the reinforcing member is completely or substantially completely coated with a pressure sensitive adhesive. That is, the entire or substantially the entire inner surface is coated with a pressure sensitive adhesive. An outer face of the body of the reinforcing member may be blank or may include high quality visual content, such as graphics, text and/or images printed or otherwise formed thereon. As described in the process below, in one embodiment, the inner face of the reinforcing member is applied to and adheres to (by way of the adhesive) all or a substantial portion of the outer surface of the tapered side wall of the base cup. The base cup coupled with the adhered to reinforcing member form a reinforced plastic foam cup. The reinforced plastic foam cup with a multi-layered tapered side wall provides a substantial increase in the rigidity over a conventional plastic foam cup and over a conventional cup with paper attached by spot gluing methods. The reinforced plastic foam cup further provides a suitable branding area where high quality graphics, such as a company's logo or suitable marketing indicia, may be printed and subsequently viewed by a person. It should be appreciated that since the inner surface of the reinforcing member is completely or substantially completely covered or coated with the pressure sensitive adhesive in the preferred embodiment, the entire reinforcing member will adhere to the tapered side wall of the base cup, thus avoiding the formation of wrinkles in the reinforcing member, adding strength or stiffness to the base cup and adding a tactile feel to the entire or substantially the entire outer surface of the base cup. In one embodiment, as described below, the reinforcing member is attached to the based cup in an overlapping manner.

In one embodiment, the method or process of manufacturing the above-described reinforced plastic foam cup generally includes determining a center point of the top edge and bottom edge of the reinforcing member, wherein the center point corresponds with the trough of the concavely shaped top edge of the reinforcing member and also the apex of the convexly shaped bottom edge of the reinforcing member. The method includes positioning a base or pre-reinforced plastic foam cup in an upside-down position and also positioning the reinforcing member adjacent to the cup at an angle (offset from a vertical plane) which corresponds with the angle (offset from a vertical plane) of the tapered side wall of the base or pre-reinforced plastic foam cup. This is done as the cup moves on a cup conveyer system and the reinforcing member moves or is dispensed by a dispenser. The method includes initially attaching the moving reinforcing member to the tapered side wall of the moving cup along a vertical axis which runs through the determined center point of the top edge and bottom edge of the reinforcing member. In one embodiment, the method includes sequentially attaching a first remaining unattached portion of the reinforcing member (i.e., the portion extending from the center vertical axis to the trailing edge) and a second remaining unattached portion of the reinforcing member (i.e., the portion extending from center vertical axis to the leading edge) to the tapered side wall of the cup to form the reinforced plastic foam cup.

More specifically, in one embodiment, the method of manufacturing the reinforced plastic foam cup includes placing a base cup (i.e., a pre-reinforced plastic foam cup) face down or resting on the open top end on a cup conveyer system of a cup reinforcing system or apparatus. The method includes supplying and dispensing reinforcing members from a reinforcing member dispenser. In one embodiment, the reinforcing member dispenser feeds the reinforcing member until the cup reinforcing system determines that a vertical axis which runs through a center point of the top edge and bottom edge of the reinforcing member is aligned with the tapered side wall of the base cup. In this embodiment, due to the angling of the tapered side wall of the cup and the relatively planar reinforcing member, the release liner (on which the reinforcing member is releasably attached to) is positioned at a suitable angle which corresponds with the angle of the tapered side wall of the base cup and thus when the reinforcing member is separated from the release liner, the reinforcing member is positioned at a suitable angle which corresponds with the angle of the tapered side wall of the base cup.

In one embodiment, a sensor of the cup reinforcing system determines the location or position of the reinforcing member as the reinforcing member dispenser feeds the reinforcing member through the cup reinforcing system. Based on this determined position of the reinforcing member (and other suitable information such as the speed which the reinforcing member dispenser is feeding the reinforcing member), a processor of the cup reinforcing system, such as a microprocessor, a microcontroller-based platform, a suitable integrated circuit or one or more application-specific integrated circuits (ASIC's), determines or calculates when the reinforcing member is moved into a position in which the centered vertical axis of the reinforcing member is aligned with the tapered side wall of the base cup. The sensor detects the location of the substantially vertical portion of the front or leading edge of the reinforcing member to determine the relative position of the reinforcing member. In one embodiment, the sensor is positioned such that the sensor detects the exact location of each reinforcing member immediately prior to that reinforcing member being affixed to a base cup. In this embodiment, positioning the sensor at such a position provides for substantially increased accuracy in the placement of the reinforcing member on the base cup which, as described in more detail below, provides for a proper engagement between the reinforcing member and the cup. In alternative embodiments, any suitable timing mechanism may be used to accomplish this alignment process. It should be appreciated that any suitable mechanism or indicator, whether attached to or printed on the reinforcing member, may be utilized to locate the centered vertical axis of the reinforcing member. In different embodiments, such mechanisms include any suitable notch, notches, mark or markings on the reinforcing member, any suitable radio-frequency identification indicator, any suitable visible indicator (such as a barcode) or any suitable invisible or not readily visible indicator.

At the point in the process when the centered vertical axis of the reinforcing member is aligned with the wall of the base cup, the inner face of the reinforcing member (which is completely or substantially completely coated with a pressure sensitive adhesive) is initially attached to the cup along the centered vertical axis. As described above, the reinforcing member is situated at an angle which corresponds with the angle of the tapered side wall of the base cup and thus the reinforcing member is attached to the base cup at an angle which corresponds with the angle of the tapered side wall of the base cup. It should be appreciated that after the reinforcing member is initially attached to the cup along the centered vertical axis, the leading and trailing edges of the cup remain unattached or are otherwise free.

After the centered vertical axis of the reinforcing member is attached to the cup, the cup and the attached reinforcing member continue along the cup conveyer system and the remainder of the reinforcing member is attached to the wall of the base cup. In one embodiment, the cup is rotated in a first direction to attach a first remaining portion of the reinforcing member (i.e., the portion extending from the centered vertical axis to the trailing edge) to the cup. Subsequently, the cup is rotated in a second, opposite direction to attach a second remaining portion of the reinforcing member (i.e., the portion extending from the centered vertical axis to the leading edge) to the cup. Such a process results in a reinforced plastic foam cup with substantially increased rigidity properties when compared to a non-reinforced plastic foam cup. Such a process of attaching the reinforcing member along the centered vertical axis of the reinforcing member mathematically reduces the likelihood of error than if the reinforcing member was first attached to the cup along a non-centered vertical axis. It should be appreciated that, as discussed below, other suitable rotation patterns may be employed in accordance with the cup reinforcing system disclosed herein.

In one embodiment, the cup reinforcing system or apparatus includes a cup conveyor system and one or more reinforcing member dispensers. The cup conveyor system is configured to receive each pre-reinforced cup, transport and space each of such received cups into an appropriate position for attachment of a reinforcing member and remove each cup from the cup reinforcing system after the attachment of a reinforcing member to that cup. Each reinforcing member dispenser is configured to transport the reinforcing members into the appropriate positions for attachment with the transported cups and thus to attach each reinforcing member, along a centered vertical axis of the reinforcing member, to the wall of one of the cups at an angle which corresponds with the angle of the tapered side wall of the cup.

More specifically, one embodiment of the cup conveyor system generally includes a cup dispenser, a cup feeder, a cup spacer, a cup mover, and a cup remover. As described in more detail below, a pre-reinforced or base cup enters the cup reinforcing system via the cup dispenser which dispenses cups, one at a time, from a supply of nested cups. The cup travels via the cup feeder to the cup spacer, which properly spaces the cups at pre-determined distances apart, and then to the cup mover. The cup mover moves each cup into the appropriate alignment with the reinforcing member dispenser. A reinforcing member is attached or affixed to the cup, along its centered vertical axis, by the reinforcing member dispenser. After the reinforcing member is attached to the cup at the centered vertical axis, the cup mover rotates the cup to attach the leading and trailing edges of the reinforcing member to the rest of the cup. The reinforced cup is then removed from the cup reinforcing system via the cup remover. It should be appreciated that any suitable cup conveyor system and any suitable reinforcing member dispenser which attaches a reinforcing member to the tapered side wall of a base cup along the centered vertical axis of the reinforcing member and subsequently attaches the remaining portions of the reinforcing member to the tapered side wall of the base cup may be implemented in accordance with the cup reinforcing system disclosed herein.

In one embodiment, a base cup enters the cup reinforcing system via a dual cup dispenser. The dual cup dispenser includes a frame which supports at least two guide members which are each configured to hold a stack of nested base cups from a suitable supply. Each guide member is associated with a plurality of threaded cup dispensing screws. In operation, the plurality of threaded cup dispensing screws rotate to engage the lips of the nested base cups to separate the base cups, one at a time, from their respective nested stack. The separated base cups fall, face down, from the cup dispenser onto the cup feeder.

The cup feeder includes a frame which supports a plurality of adjacently arranged movable conveyor belts. In one embodiment, the conveyor belts directly below the guide members of the cup dispenser each define a plurality of apertures or holes. In another embodiment, in addition to the conveyor belts directly below the guide members of the cup dispenser defining a plurality of apertures or holes, one or more of the conveyor belts not directly below the guide members of the cup dispenser also each define a plurality of apertures or holes. The cup feeder is suitably connected to a vacuum or negative pressure source which causes air to flow from an area above the conveyor belts, through the holes in the conveyor belts to the vacuum or negative pressure source connected to the frame of the cup feeder. Such air flow causes each separated base cup to be pulled downwardly by the vacuum or negative pressure, in a face down position, from the cup dispenser onto the cup feeder. It should be appreciated that providing vacuum or negative pressure on the relatively light-weight base cups prevents the base cups from tipping over when they are de-nested and dropped from the cup dispenser the cup feeder.

The base cup travels, via the conveyor belts of the cup feeder, to a cup spacer. The cup spacer includes a frame which supports an in-feed screw or spacer screw and at least one in-feed star-wheel which each define a plurality of spaced apart cup pockets. The spacer screw sequentially separates and spaces the base cups from the cup feeder for transportation to the in-feed star-wheel(s). The spaced-apart cup pockets of the in-feed star-wheel(s) hold and maintain the spacing of the base cups as they are transported to a cup mover or turntable.

The cup mover or turntable includes a plurality of cup holding stations spaced-apart around the circumference of the turntable. Each individual cup holding station is configured to receive a base cup from an in-feed star-wheel of the cup spacer and to be able to rotate the base cup a full 360 degrees. After a base cup is positioned on a cup holding station of the turntable by the in-feed star wheel of the cup spacer, a spring biased centering bell supported by a rotatable superstructure engages the bottom of the upside down cup to hold the cup in place on the holding station.

In one embodiment, the cup mover aligns the base cup into an appropriate alignment with a reinforcing member dispenser and the reinforcing member is attached or affixed to the cup. In one embodiment, each reinforcing member dispenser includes one or more reinforcing member supply roll holders configured to hold a supply roll of reinforcing members which include a plurality of reinforcers sequentially releasably attached to an elongated release liner. The reinforcing member dispenser includes at least one and preferably a plurality of drive rollers configured to drive or pull the release liner. The reinforcing member dispenser also includes at least one and preferably a plurality of guides and tensioners, such as guide rollers, configured to guide and maintain suitable amounts of tension on the release liner. The reinforcing member dispenser includes a release liner slack accumulator configured to provide a designated area where slack in the release liner accumulates to facilitate the alignment of each reinforcing member to each cup and at least one sensor for determining the exact location of each reinforcing member immediately prior to that reinforcing member being attached to a cup. The reinforcing member dispenser also includes a release liner separator for separating the reinforcing members from the release liner and a release liner accumulation roller configured to hold the release liner after separation from the reinforcing members.

In one embodiment, the release liner slack accumulator is an elongated substantially u-shaped member which provides a designated area wherein slack in the release liner may accumulate. In this embodiment, due to the need to accurately apply the reinforcing members to the tapered side wall of the cup along the centered vertical axis of the reinforcing member, the processor of the cup reinforcing system must often adjust the speed which the reinforcing members are moving immediately prior to attachment to insure that the cups moving on the turntable and the reinforcing members dispensed by the reinforcing dispenser come into contact at the appropriate time and location such that the centered vertical axis of each reinforcing member is applied to each cup on a constant basis with a margin of error of less than plus or minus 0.1 inches. In other words, providing an area where slack can accumulate enables the processor of the cup reinforcing system to adjust the speed at which the liner (and thus the reinforcing members) is fed through the reinforcing member dispenser without otherwise affecting the feed of the release liner from the supply of release liner. This configuration accordingly facilitates the exact positioning of each and every reinforcing member.

In one embodiment, after the base cup is reinforced by the reinforcing member, the reinforced cup is removed from the cup reinforcing system via a cup remover. The cup remover includes one or more out-feed star-wheels which transport the reinforced cup to an out-feed reinforced up conveyor apparatus. The out-feed reinforced cup conveyor apparatus transports each of the reinforced cup to a cup positioner, such as a cup tipper, which positions or tips the reinforced cup onto its side (downside leading). The tipped cup is then vacuum pulled via a cup exhaust system to a stack of nested reinforced cups. It should be appreciated that any suitable apparatus for removing the cup may be implemented in accordance with the cup reinforcing system disclosed herein.

It is therefore an advantage of the present apparatus and method to provide a disposable plastic foam drinking cup with a substantially improved tactile feel, substantially increased rigidity, and substantially increased durability due to a completely affixed reinforcing member.

A further advantage of the present apparatus and method is to provide a disposable plastic foam drinking cup with high quality graphics printed on the outside wall of the cup to enhance the drinking experience for a person.

A further advantage of the present apparatus and method is to provide a disposable plastic foam drinking cup with a wrinkle-free reinforcing member that is relatively inexpensive to manufacture.

Additional features and advantages are described in, and will be apparent from, the following Detailed Description and the figures.

DETAILED DESCRIPTION

The present disclosure relates in general to a reinforced drinking cup and more particularly to a disposable plastic foam reinforced drinking cup and a method of and apparatus for manufacturing the same. The reinforced drinking cup is particularly suitable for carrying or transporting hot beverages, such as coffee, tea and hot chocolate or other products.

Figure 1:
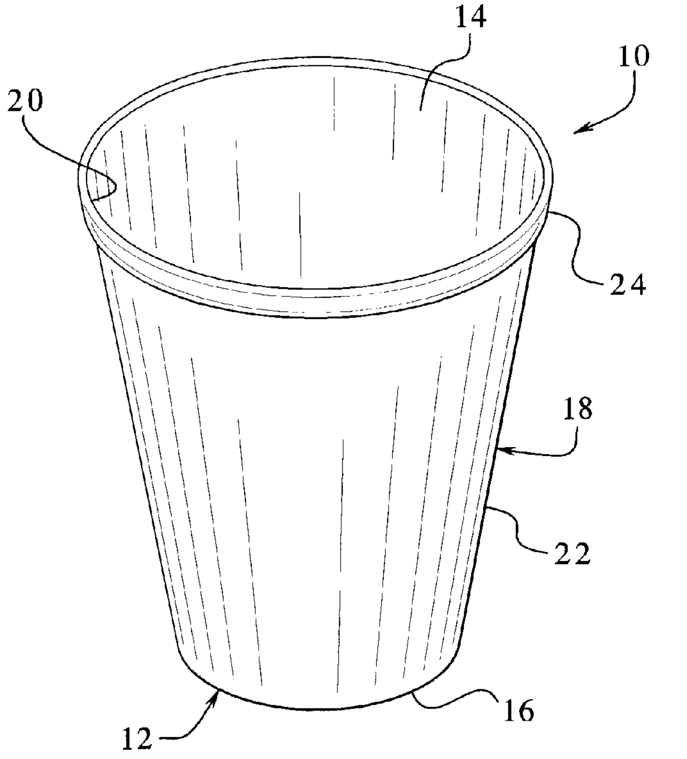
FIG. 1 is a front perspective view of a conventional plastic foam cup.
Figure 2:
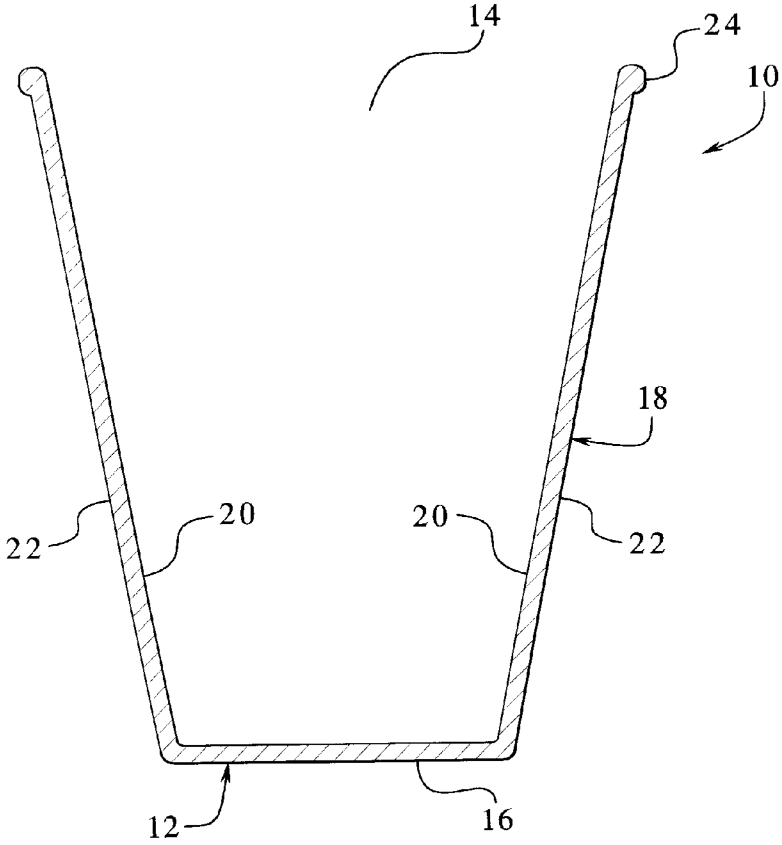
FIG. 2 is a cross-sectional side view of the conventional plastic foam cup of FIG. 1.
Figure 3:
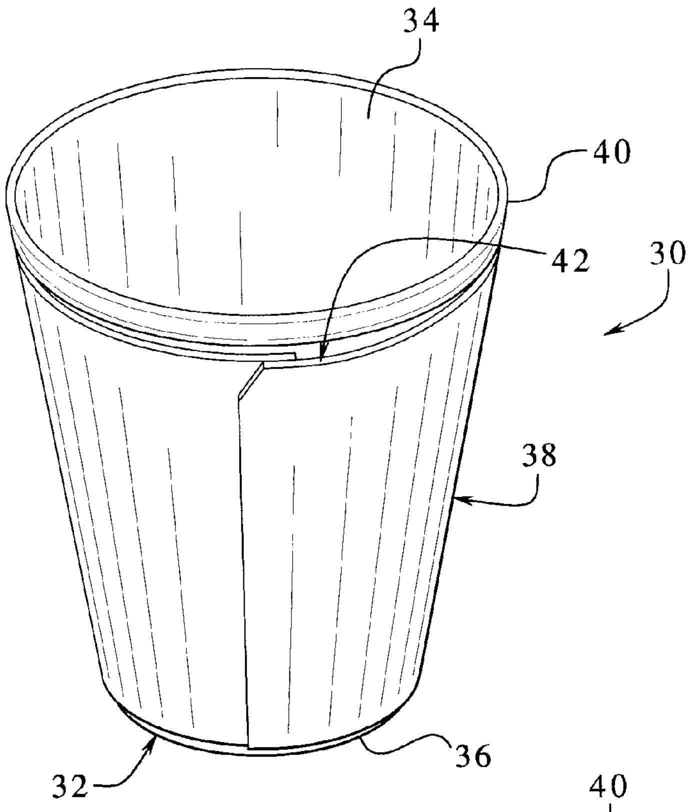
FIG. 3 is a front perspective view of one embodiment of a reinforced plastic foam cup disclosed herein.
Figure 4:
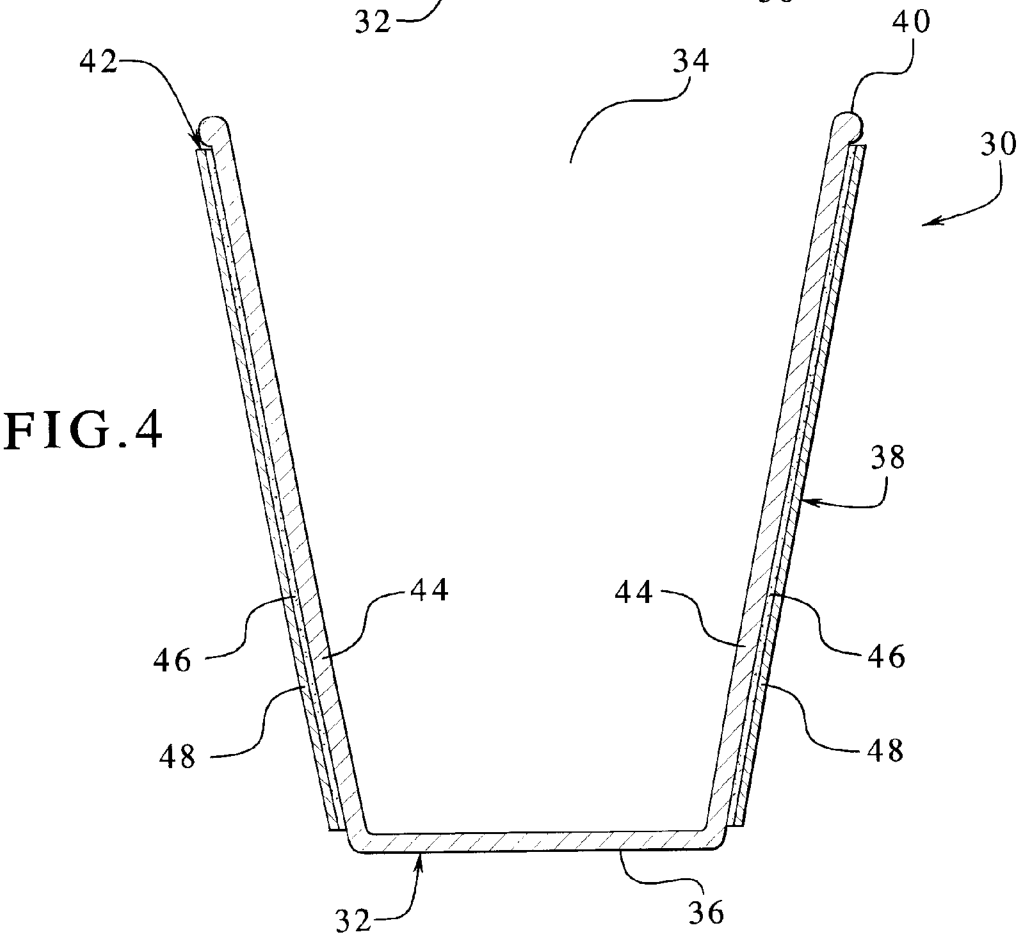
FIG. 4 is a cross-sectional side view of the reinforced plastic foam cup of FIG. 3.

Referring now to FIGS. 3 and 4, a reinforced plastic foam cup 30 of one embodiment disclosed herein is formed from the process of reinforcing a base cup (such as a conventional plastic foam cup described above) with a reinforcing member as described below. The reinforcing cup 30 includes a body 32 which defines an open top end 34 and a closed bottom end 36, wherein the top end has a greater diameter than the bottom end. The body includes a tapered side wall 38 that extends from the bottom end to the top end. The top end of the body includes an outwardly formed lip 40, however the cup does not need to have a formed lip. It should be appreciated that the plastic foam base cup may be formed from any suitable material, such as beaded polystyrene. In another embodiment, the base cup includes a paper based cup suitably coated or otherwise laminated with one or more layers of polystyrene.

Unlike a conventional plastic foam base cup, a reinforcing member 42 is attached to almost all of or a substantial portion of the outer surface of the tapered side wall 38 to provide increased tactile feel, support and rigidity to the tapered side wall. Accordingly, as best seen in FIG. 4, the tapered side wall 38 of the reinforced plastic foam cup 30 includes a plastic foam layer 44, a pressure sensitive adhesive layer 46 and a rigid material layer 48 which provides a better tactile feel. Compared to a non-reinforced plastic foam cup which only includes a plastic foam layer, the reinforced plastic foam cup with the multi-layered tapered side wall (i.e., the plastic foam layer 44, the adhesive layer 46 and the rigid material layer 48) provides a substantial increase in the tactile feel and rigidity of the reinforced plastic foam cup. Accordingly, the reinforced plastic foam cup provides a disposable cup with the insulation properties of a plastic foam cup and also the tactile feel of a paper-based cup. Such reinforced plastic foam cup costs less than a paper-based cup with comparable insulation properties (i.e., such as a nested paper-based cup). Moreover, as described in one embodiment below, when graphics are printed on the outer face of the rigid material of the reinforcing member, the reinforced plastic foam cup further provides a disposable cup with the high-quality graphic presentation properties of a paper-based cup.

Figure 5:
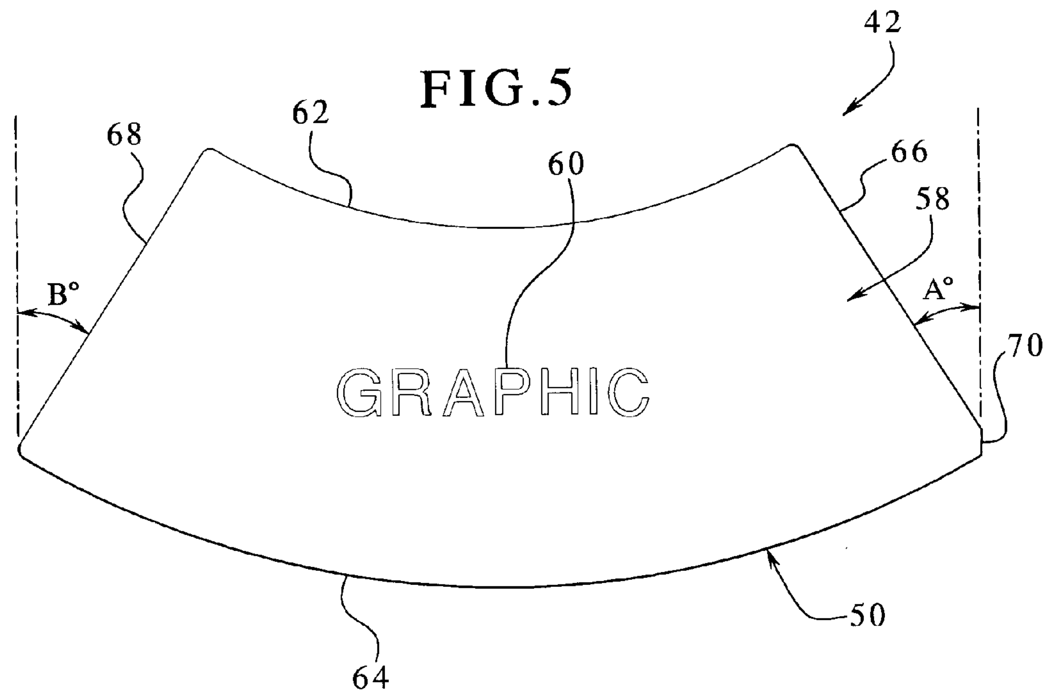
FIG. 5 is a top plan view of the outside face of one embodiment of a reinforcing member disclosed herein.
Figure 6:
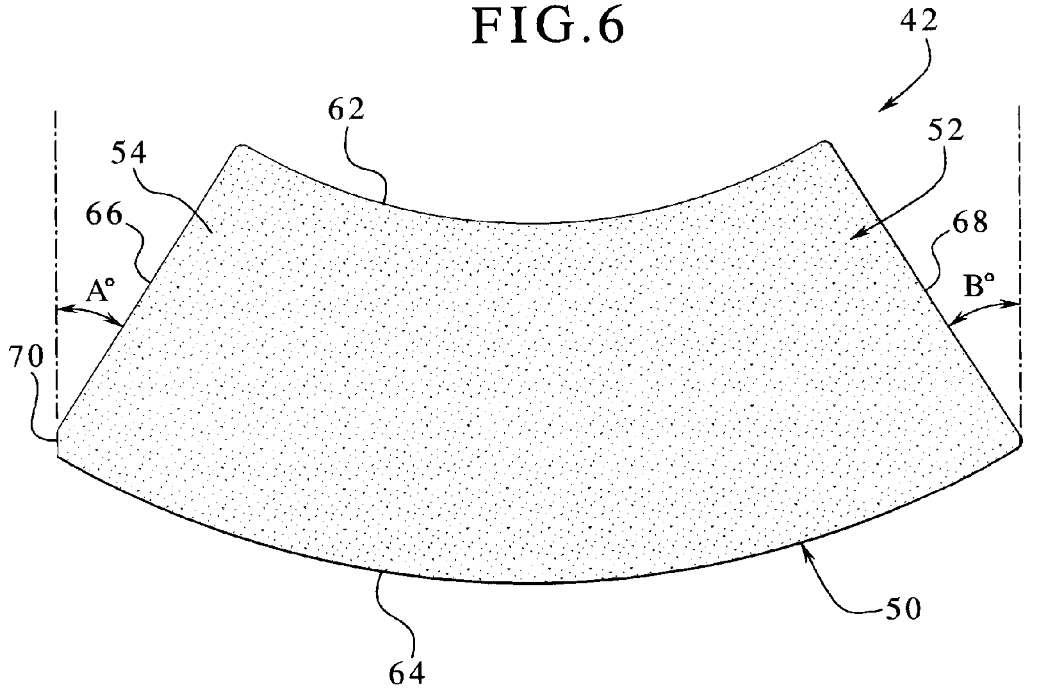
FIG. 6 is a bottom plan view of the inside face of the reinforcing member of FIG. 5.
Figure 7:
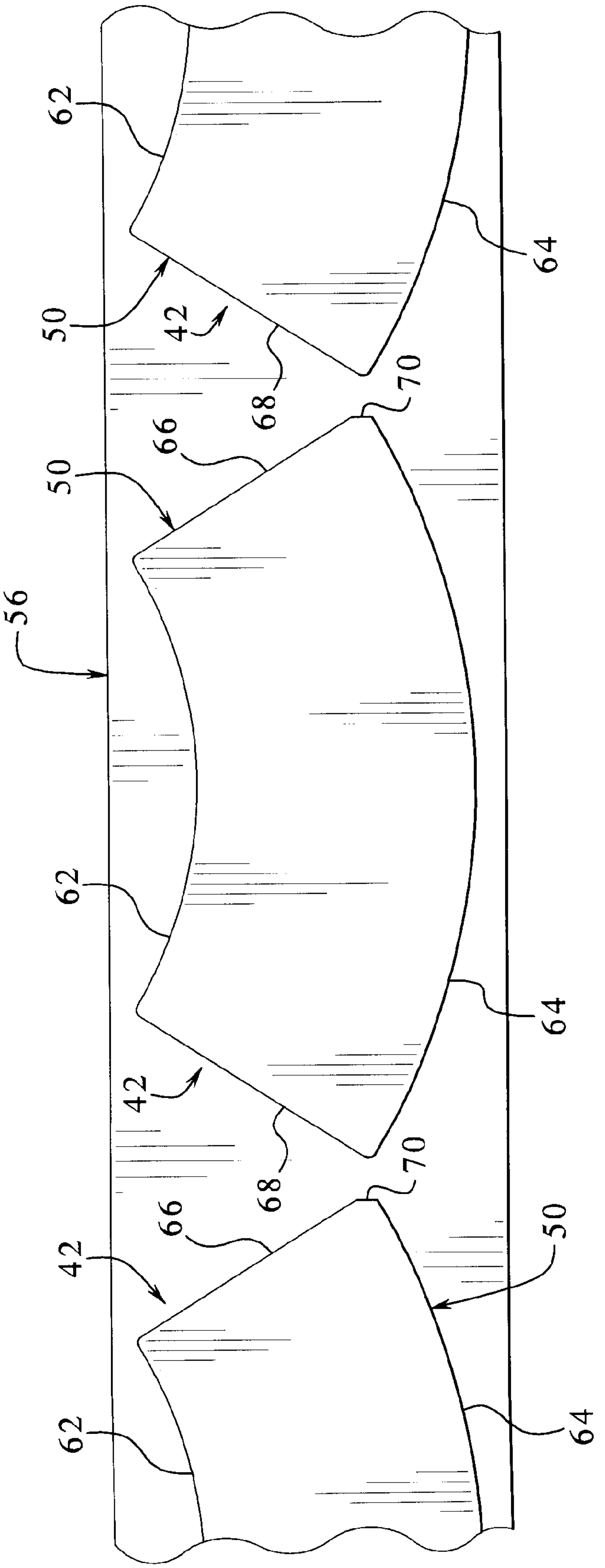
FIG. 7 is a top plan view of a plurality of reinforcing members sequentially positioned on an elongated release liner.

Referring now to FIGS. 5 to 7, in one embodiment, a reinforcing member or reinforcer 42 includes a body 50 formed from a malleable, rigid material, such as a suitable paper, a suitable plastic stock, a suitable composite material or any other suitable material. The body 50 is substantially planar or flat with a thickness in the range 1.5 millimeters to 8.0 millimeters, and in one preferred embodiment a thickness in the range of approximately 2.7 millimeters to 4.0 millimeters. As best illustrated in FIG. 6, in one embodiment, an inner face or surface 52 of the flat body 50 of the reinforcing member 42 is completely or substantially completely coated with an adhesive and preferably a pressure sensitive adhesive 54. It should be appreciated that any suitable adhesive or bonding agent which completely or substantially completely coats the inner face of the reinforcing member may be employed. As seen in FIG. 7, in one embodiment, the adhesive coating of the reinforcing member 42 is releasably attached to a suitable elongated release liner 56 which enables the reinforcing member to be handled without the adhesive exposed. In this embodiment, as described in more detail below, a plurality of reinforcing members 42 are sequentially positioned linearly along a single release liner 56. The release liner 56 may be made of any suitable material, such as a suitable plastic, paper or any combination thereof. For example, the release liner is an approximately forty pound craft paper.

In one embodiment, as illustrated in FIG. 5, an outer face or surface 58 of the flat body 50 includes one or more suitable branding areas 60 where high quality graphics, such as a company's logo or suitable marketing graphics, text and/or images are printed thereon. In one embodiment, a laminate material or a protective coating (not shown) is applied to the outer face over the layer(s) of ink to protect and/or enhance the printed matter.

In one embodiment, the flat body 50 is defined by a curved or annular edge 62, a curved or annular edge 64, an angled front or leading edge 66 and an angled rear or trailing edge 68. In one embodiment, the edge 62 of the reinforcing member is suitably concavely shaped and the edge 64 is suitably convexly shaped, wherein a trough of the concavely shaped edge and an apex of the convexly shaped edge reside in the same vertical plane. In one embodiment, the length of the edge 62 is less than the length of the edge 64 such that the leading edge 66 is angled offset from a vertical plane at a suitable angle (A degrees) and the trailing or rear edge 68 is also angled offset from a vertical plane at a suitable angle (B degrees). A sensing edge 70 which includes a portion of the leading edge adjacent to edge 64 extends vertically or substantially vertically. As described in more detail below, the sensing edge is utilized in determining the exact location of the reinforcing member as well as preventing leakage of the adhesive when a plurality of reinforcing members releasably attached to a release liner are wound into a supply roll.

Figure 5A:
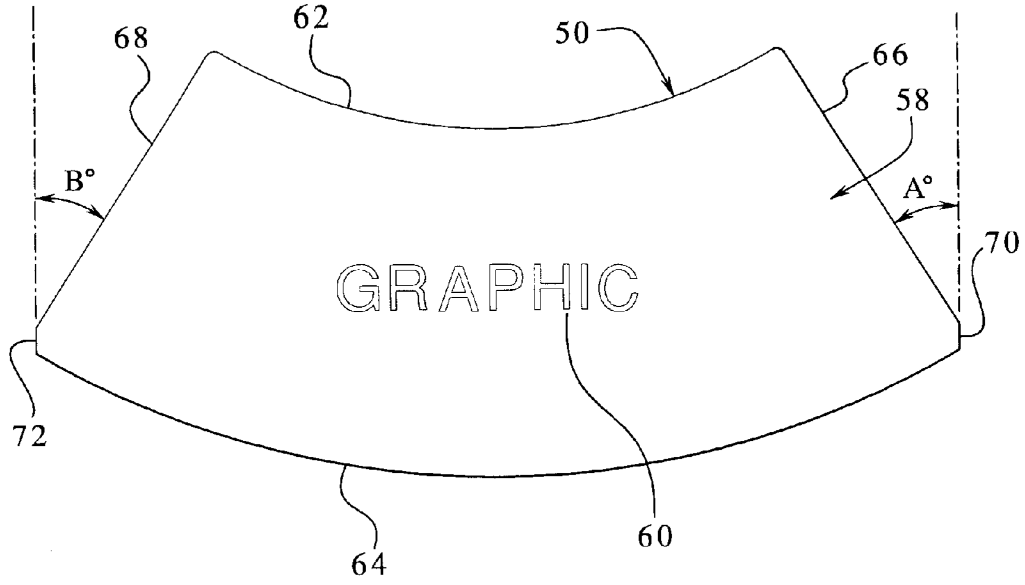
FIG. 5A is a top plan view of the outside face of an alternative embodiment of a reinforcing member disclosed herein.
Figure 6A:
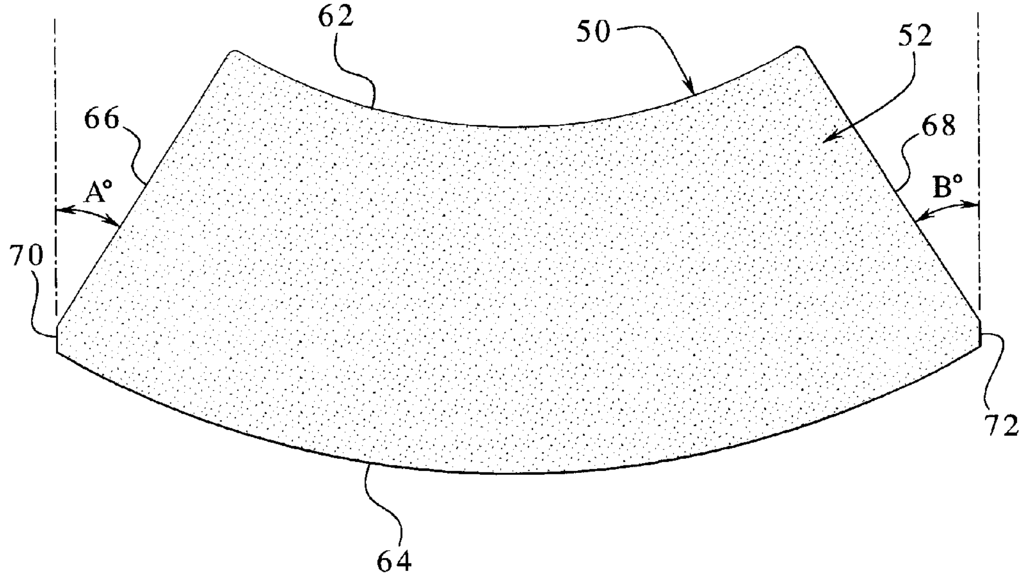
FIG. 6A is a bottom plan view of the inside face of the reinforcing member of FIG. 5A.
Figure 5B:
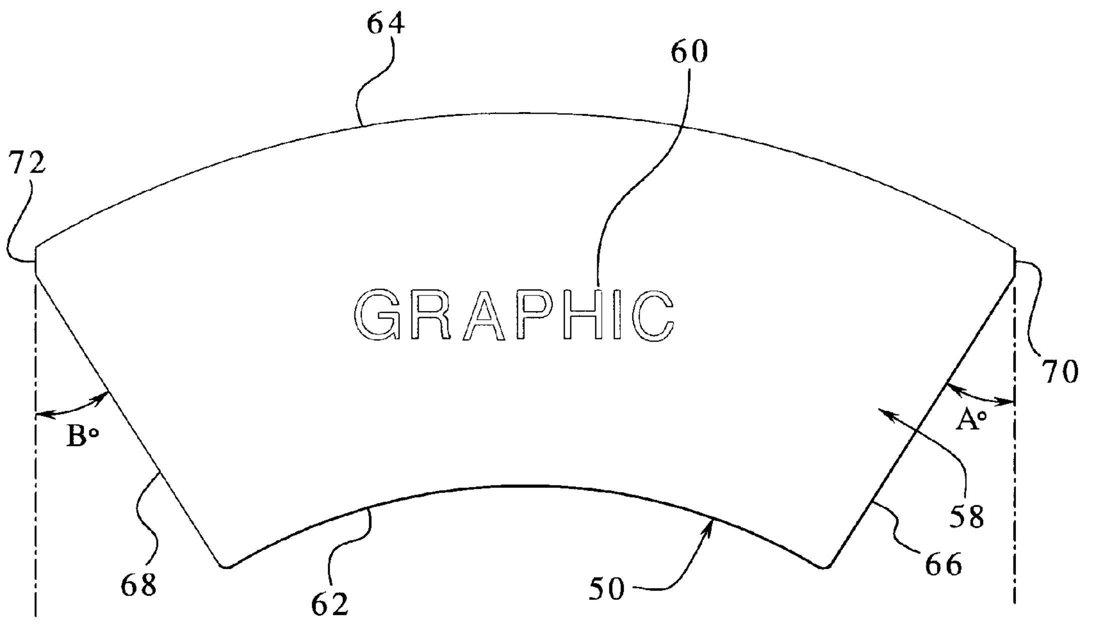
FIG. 5B is a top plan view of the outside face of another alternative embodiment of a reinforcing member disclosed herein.
Figure 7A:
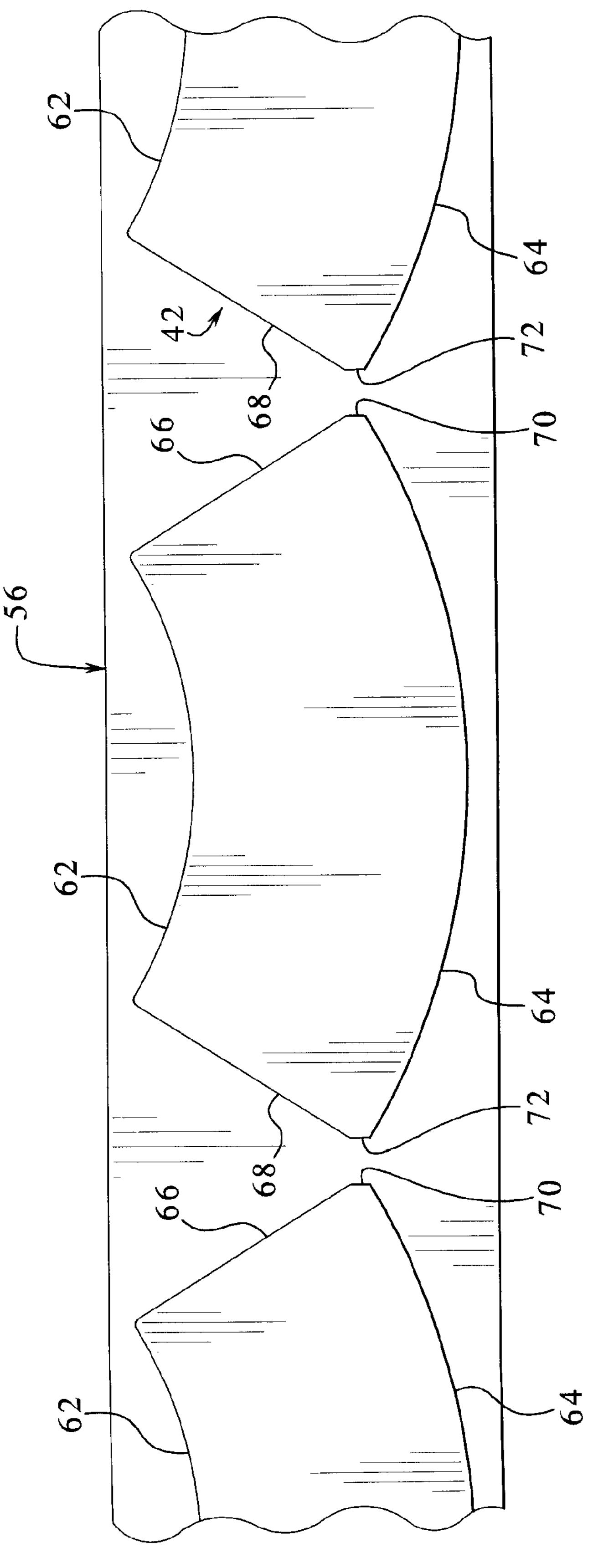
FIG. 7A is a top plan view of a plurality of reinforcing members of FIG. 5A sequentially positioned on an elongated release liner.

In another embodiment, as seen in FIGS. 5A, 6A and 7A, in addition to a sensing edge 70 (i.e., a portion of the leading edge adjacent to edge 64 extending vertically or substantially vertically), the reinforcing member includes an adhesive relief edge 72. The adhesive relief edge is a vertically or substantially vertically extending portion of the trailing edge adjacent to edge 64 of the reinforcing member. In one embodiment, the sensing edge and the adhesive relief edge are the same length or substantially the same lengths. In another embodiment, the sensing edge and the adhesive relief edge are different lengths or substantially different lengths. It should be appreciated that the reinforcing members are displayed in an upside down position to match the upside down cups which they will engage with as described below. Accordingly, as best seen in FIG. 5B, the graphics 60 printed on the reinforcing member may printed in any suitable configuration.

It should be appreciated that when a plurality of reinforcing members are positioned linearly along the elongated release liner to form a stock or supply roll of reinforcing members and the release liner is wound about a central cylindrical tube into a roll, a relatively significant amount of pressure is placed on one or more of the wound reinforcing members, especially on the inner reinforcing members which are wound at greater angles (because of roll has a smaller diameter at such points). This pressure tends to cause the adhesive coating on such wound reinforcing members to leak from the point where the leading edge and the curved or annular bottom edge intersect and/or the point where the trailing edge and the curved or annular bottom edge intersect. Leaking of the adhesive coating from these points may damage one or more of the wound reinforcing members and/or build-up on the release liner separator or separation plate (as described below). This leaking adhesion may also prevent the reinforcing member from properly adhering to the cup in the desired manner. In one embodiment of the present disclosure, the sensing edge and the adhesive relief edge each redistribute the formed pressure from these respective points on the reinforcing member to an extended portion of the reinforcing member. This redistribution relieves the pressure which forms and thus reduces or prevents the leaking of the adhesive coating from one or more of the wound reinforcing members.

It should be appreciated that the dimensions of the reinforcing member will be specific to the specifications of the base cup. Therefore, the respective angles of the leading and trailing edges of the reinforcing member, the shape of the top and bottom edges, the length between the leading edge and the trailing edge or any other suitable dimensions of the reinforcing member will be based on the size of the base cup, the angle of the tapered side wall of the base cup or any other specification of the base cup. It should be further appreciated that when the reinforcing member is initially attached to the cup, as described below, the sensing edge 70 is: (i) perpendicular or substantially perpendicular to the bottom edge of the cup; and (ii) parallel to the centered vertical axis of the reinforcing member. Such a configuration provides an absolute reference point for the cup reinforcing system to determine the location of the reinforcing member.

For example, in one embodiment, if the base cup is a twelve ounce cup, the reinforcing member is configured such that the angle between the concave edge and leading edge is approximately ninety degrees, the angle between the concave edge and trailing edge is approximately ninety degrees, the angle between leading edge and the sensing edge is approximately one-hundred-fifty degrees, the angle between the trailing edge and adhesive relief edge is approximately one-hundred-fifty degrees, the angle between the convex edge and the sensing edge is approximately one-hundred-twenty degrees, and the angle between the convex edge and the adhesive relief edge is approximately one-hundred-twenty degrees.

In another example, if the base cup is a sixteen ounce cup, the reinforcing member is configured such that the angle between the concave edge and leading edge is approximately ninety degrees, the angle between the concave edge and trailing edge is approximately ninety degrees, the angle between leading edge and the sensing edge is approximately one-hundred-fifty-five degrees, the angle between the trailing edge and adhesive relief edge is approximately one-hundred-fifty-five degrees, the angle between the convex edge and the sensing edge is approximately one-hundred-fifteen degrees, and the angle between the convex edge and the adhesive relief edge is approximately one-hundred-fifteen degrees.

In another example, if the base cup is twenty ounce cup, the reinforcing member is configured such that the angle between the concave edge and leading edge is approximately ninety degrees, the angle between the concave edge and trailing edge is approximately ninety degrees, the angle between leading edge and the sensing edge is approximately one-hundred-sixty degrees, the angle between the trailing edge and adhesive relief edge is approximately one-hundred-sixty degrees, the angle between the convex edge and the sensing edge is approximately one-hundred-ten degrees, and the angle between the convex edge and the adhesive relief edge is approximately one-hundred-ten degrees.

Figure 8:
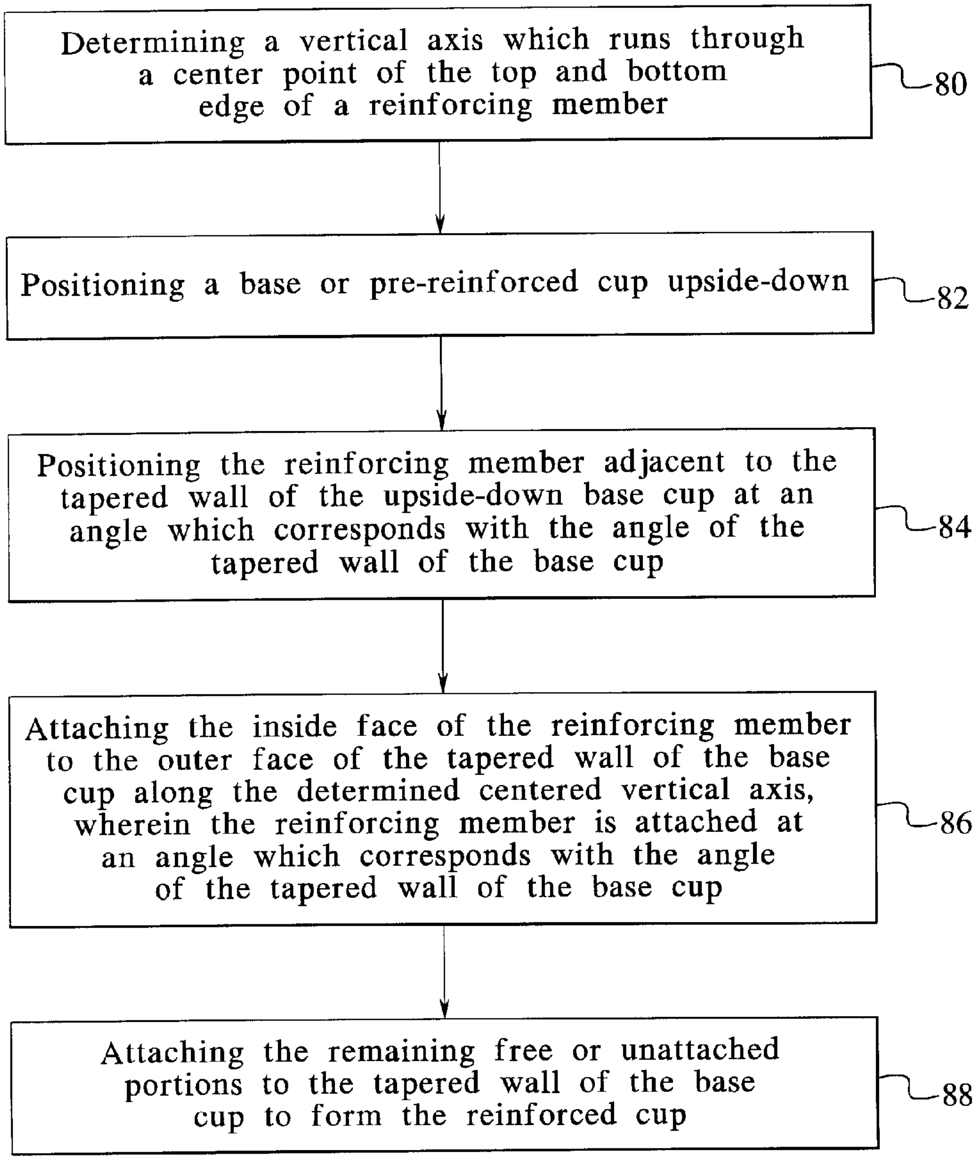
FIG. 8 is a schematic block diagram illustrating one embodiment of a method of manufacturing the reinforced plastic foam cup of FIG. 3 disclosed herein.

In general, as illustrated in FIG. 8, the method or process of manufacturing the above-described reinforced plastic foam cup includes determining a vertical axis which runs through a center point of the top and bottom edge of the reinforcing member as indicated in block 80. The method includes positioning the base or pre-reinforced plastic foam cup upside-down and positioning the reinforcing member adjacent to the tapered side wall of the upside-down base cup at an angle which corresponds with the angle of the tapered side wall of the base cup as indicated in blocks 82 and 84. At the point when both the base cup and the reinforcing member move into position, as indicated in block 86, the inside face of the reinforcing member is attached to the outer face of the tapered side wall of the base cup along the determined centered vertical axis, wherein the reinforcing member is attached at an angle which corresponds with the angle of the tapered side wall of the base cup. After attaching the center of the reinforcing member to the tapered side wall of the base cup, the cup with the reinforcing member continues to move on the cup conveyer and the remaining free or unattached portions are sequentially or simultaneously attached to the tapered side wall as indicated in block 88. It should be appreciated that such angling of the reinforcing member provides that as the remaining unattached portions or sections of the reinforcing member are attached to the tapered side wall of the base cup, the reinforcing member will completely adhere to the tapered side wall of the base cup.

Figure 9:
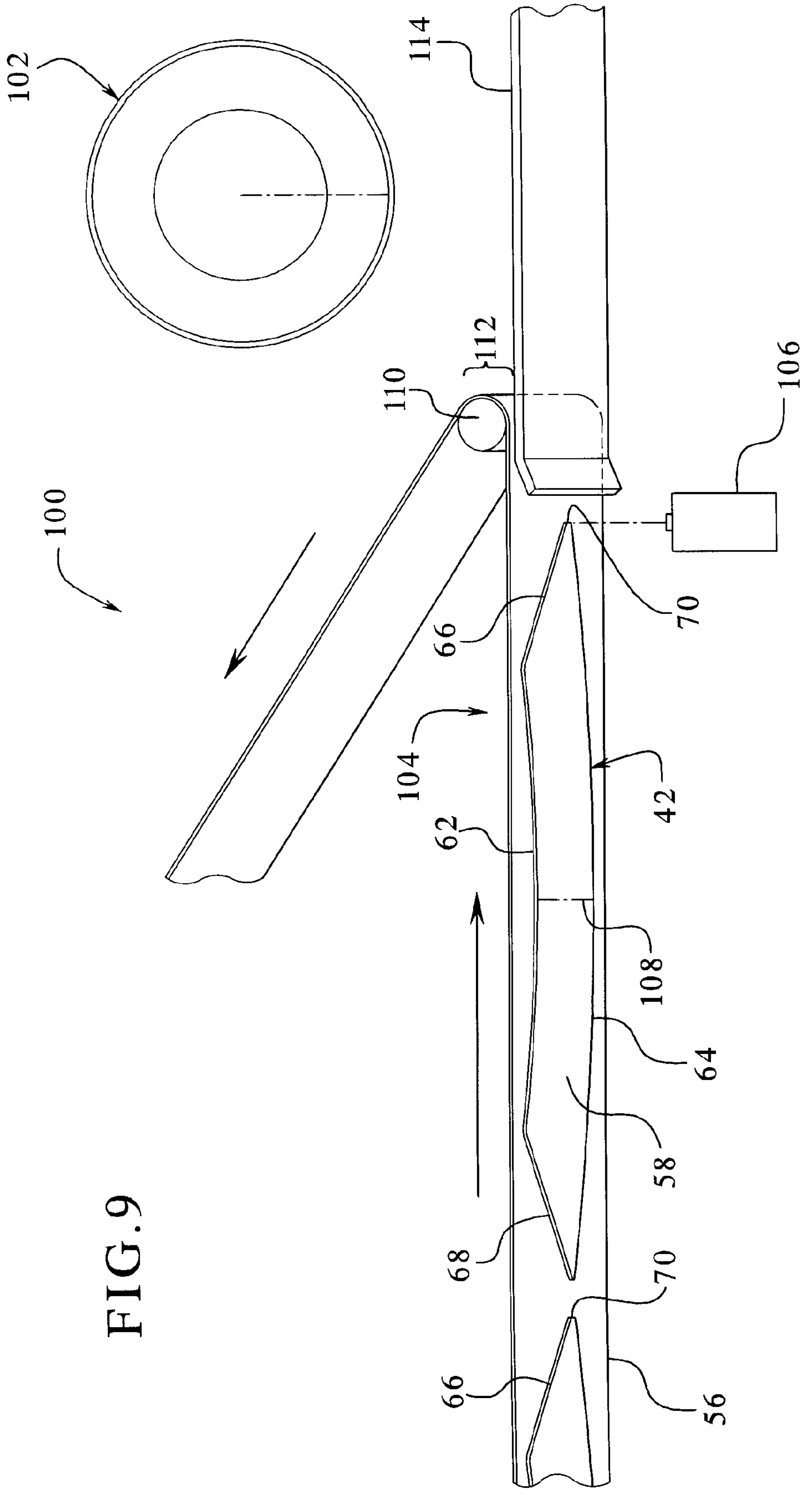
FIG. 9 is a diagrammatic top plan view of one embodiment of a cup reinforcing system disclosed herein, illustrating a pre-reinforced plastic foam cup separate from a reinforcing member.

More specifically, as diagrammatically seen in FIG. 9, in one embodiment, the method or process of manufacturing or sequentially reinforcing at least one and preferably a plurality of individual plastic foam cups includes utilizing a processor controlled cup reinforcing system or apparatus 100. In one embodiment, the cup reinforcing system includes a cup conveyer system which moves the cup into the attachment position and transports or moves one or more base or pre-reinforced plastic foam cups 102 throughout the cup reinforcing system 100 in a conventional manner. The cup reinforcing system further includes at least one reinforcing member dispenser 104 operable to sequentially feed each reinforcing member toward the attachment position for attachment to the individual base cup 102. The cup reinforcing system also includes a suitable sensor 106 operable to determine the location of each reinforcing member, wherein based on such determined location, the cup reinforcing system 100 aligns a centered vertical axis 108 of the reinforcing member 42 with the tapered side wall of an individual base cup 102. Accordingly, a system or apparatus for attaching a reinforcing member to a cup includes a cup conveyor system, a reinforcing member dispenser (i.e., a device for centering and affixing or attaching the reinforcing member to the outer surface of the tapered side wall of the cup). It should be appreciated that any suitable cup reinforcing system may be implemented in accordance with the disclosed process of reinforcing a plastic foam cup In one embodiment, as further described and illustrated below, the cup conveyer includes one or more individual cup positions wherein each individual cup position includes a rotationally mounted cup holding turntable with a suitable cup positioning device to suitable position the cup at a set position on the cup holding turntable. The cup holding turntable is also operable to rotate the cup a full 360 degrees in clockwise and counterclockwise directions. In one embodiment, the cup positioning device includes a frictional engagement member or mandrel which frictionally engages the inner face of the wall of the base cup to fix the cup in the suitable position on the turntable. In operation, a base cup 102 is placed face down (i.e., resting on the open top end) on the cup conveyer system and the cup is moved into a position that facilitates engagement with the reinforcing member.

Figure 10:
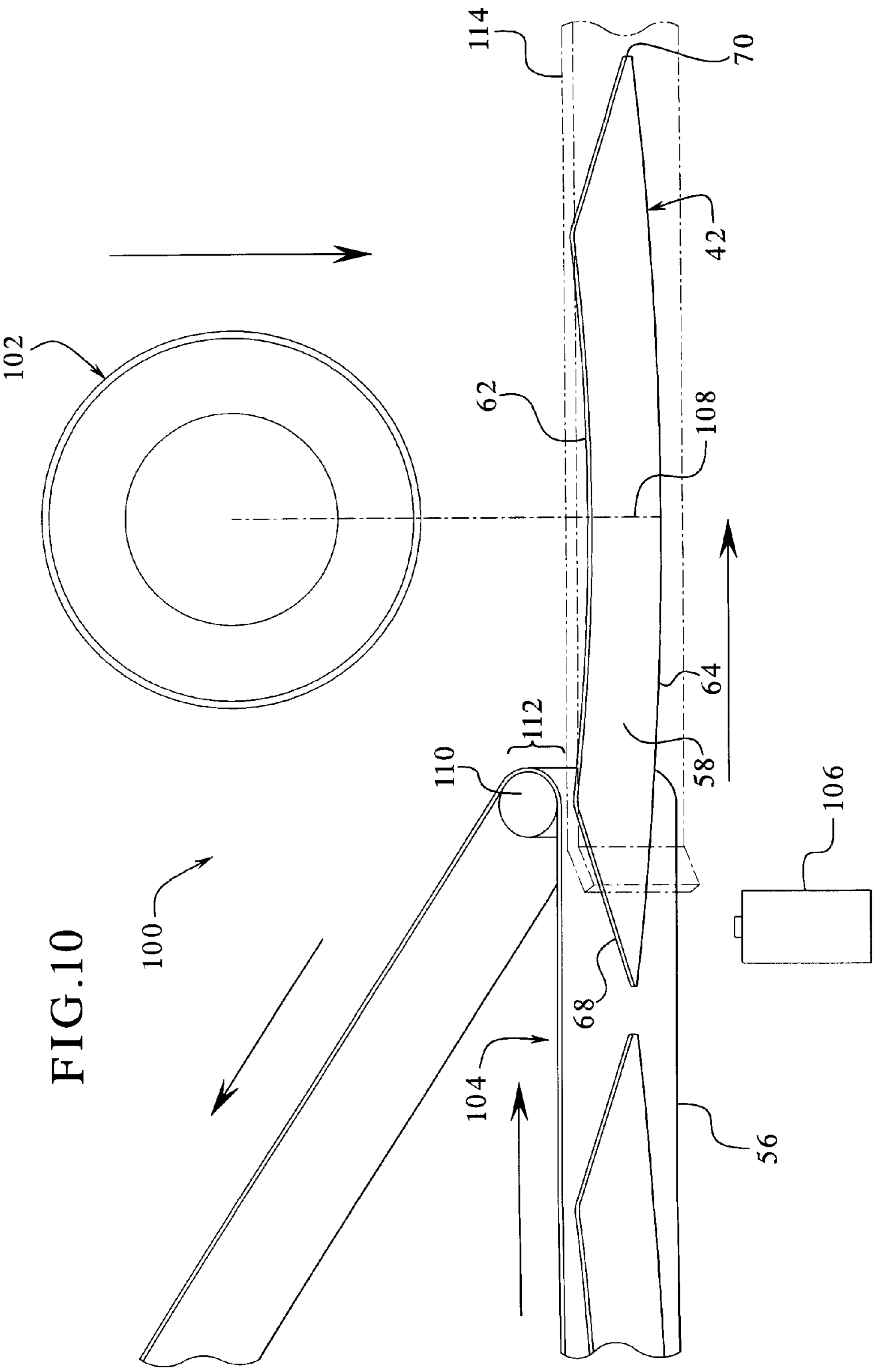
FIG. 10 is a diagrammatic top plan view of the cup reinforcing system of FIG. 9, illustrating the pre-reinforced plastic foam cup and the reinforcing member moving into an engagement position.

In one embodiment, as illustrated in FIGS. 9 and 10, the reinforcing member dispenser 104 is operable (via one or more suitable rollers 110) to feed the reinforcing member in the direction of a face down base cup. In one embodiment, the reinforcing member dispenser 104 is configured or shaped to define or include a release liner separation section 112. In this embodiment, based on the orientation of the reinforcing member 42 relative to the release liner separation section 112, the reinforcing member 42 will separate from the release liner 56 (which protects the pressure sensitive adhesive) when the reinforcing member is fed through the release liner separation section 112. In one embodiment, the cup reinforcing system also includes one or more reinforcing member application pad(s) 114 which operate to guide the reinforcing member and prevent the reinforcing member from shifting positions after a portion of the reinforcing member 42 separates from the release liner 56.

Figure 11:
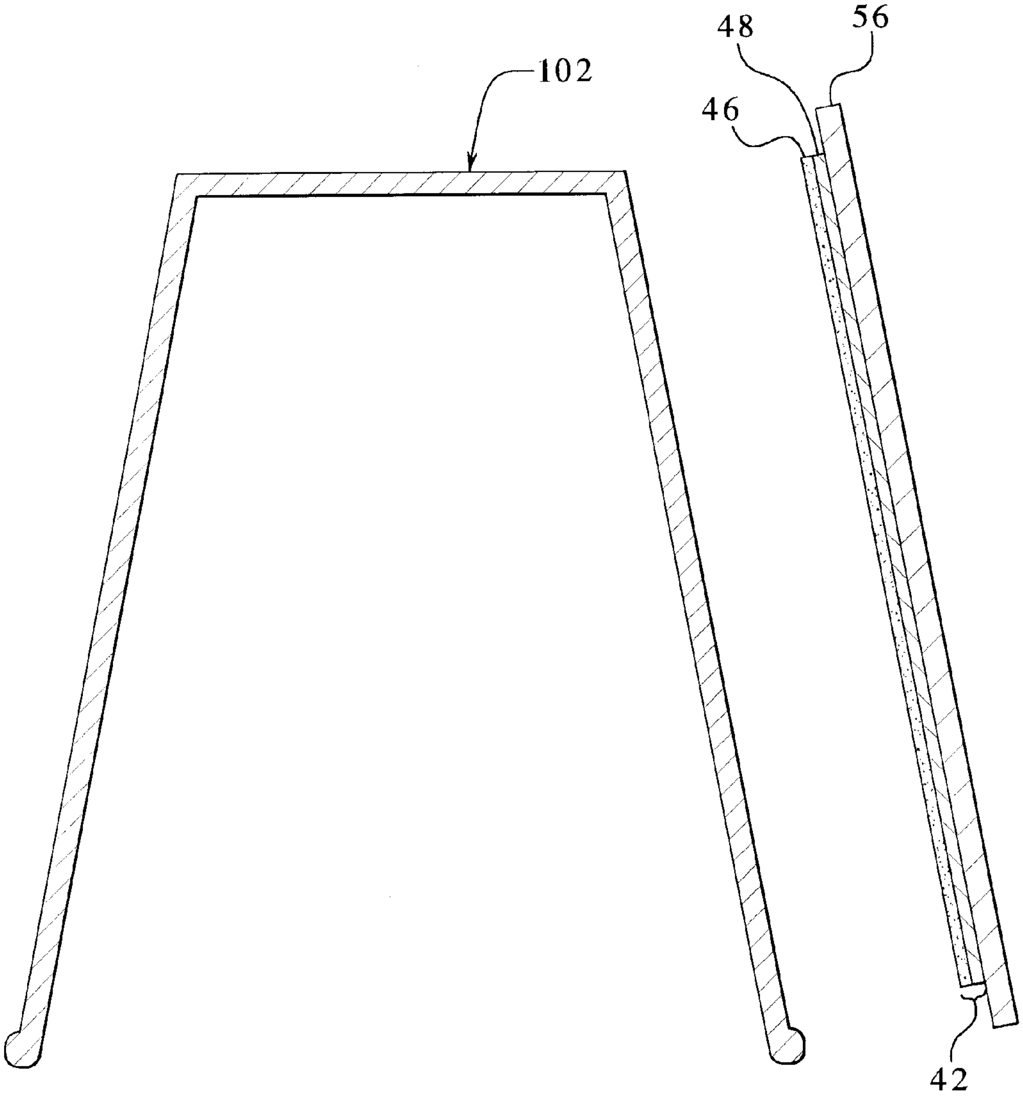
FIG. 11 is a cross-sectional side view of the separated pre-reinforced plastic foam cup and reinforcing member of FIG. 10.

As best seen in FIG. 11, in one embodiment, the reinforcing member dispenser is operable to feed the release liner 56 (which the reinforcing member is releasably attached to) toward the base cup 102 at a suitable angle offset from a vertical plane which corresponds with the angle (also offset from a vertical plane) of the tapered side wall of the base cup. In this embodiment, when the reinforcing member 42 separates from the release liner 56, the reinforcing member will be positioned at a suitable angle which corresponds with the angle of the tapered side wall of the base cup 102. In one embodiment, the reinforcing member engages the tapered side wall of the base cup at a suitable angle offset from a vertical plane while both the cup and the reinforcing member are moving. As described in more detail below, such angling provides that the reinforcing member will completely adhere to the tapered side wall of the base cup.

Referring back to FIGS. 9 and 10, as described above, the cup reinforcing system also includes at least one sensor 106 for determining or verifying the location or position of the reinforcing member 42 relative to the position of the base cup 102. In one embodiment, the sensor detects the location of the substantially vertical portion or sensing edge 70 of the front or leading edge of the reinforcing member 42 to determine the relative position of the reinforcing member. Based on this determined position of the reinforcing member 42 and any other suitable information (such as the speed the cup is moving, the speed the reinforcing member is being fed through the reinforcing member dispenser, the length of the reinforcing member and the diameter of the cup), the processor of the cup reinforcing system determines or calculates when the reinforcing member 42 is moved into a position in which a centered vertical axis 108 of the reinforcing member 42 is aligned with the tapered side wall of the base cup 102. In this embodiment, the centered vertical axis 108 is the vertical axis that runs through both the trough of the concavely shaped top edge 62 of the reinforcing member and the apex of the convexly shaped bottom edge 64 of the reinforcing member.

In one embodiment, at least one sensor is positioned or placed such that the sensor detects the exact location of each reinforcing member immediately prior to that reinforcing member being affixed to a base cup. In this embodiment, positioning the sensor at such a position provides for increased accuracy in the placement of the reinforcing member on the base cup which, as described in more detail below, provides for a proper engagement between the reinforcing member and the cup. In alternative embodiments, the alignment process is controlled by suitable timing mechanisms wherein one or more sensors are utilized to verify that the timing mechanisms are correct. In the illustrated embodiment, the sensor senses the sensing edge. However, it should be appreciated that the sensor could sense another suitable reinforcing member position indicator.

Figure 12:
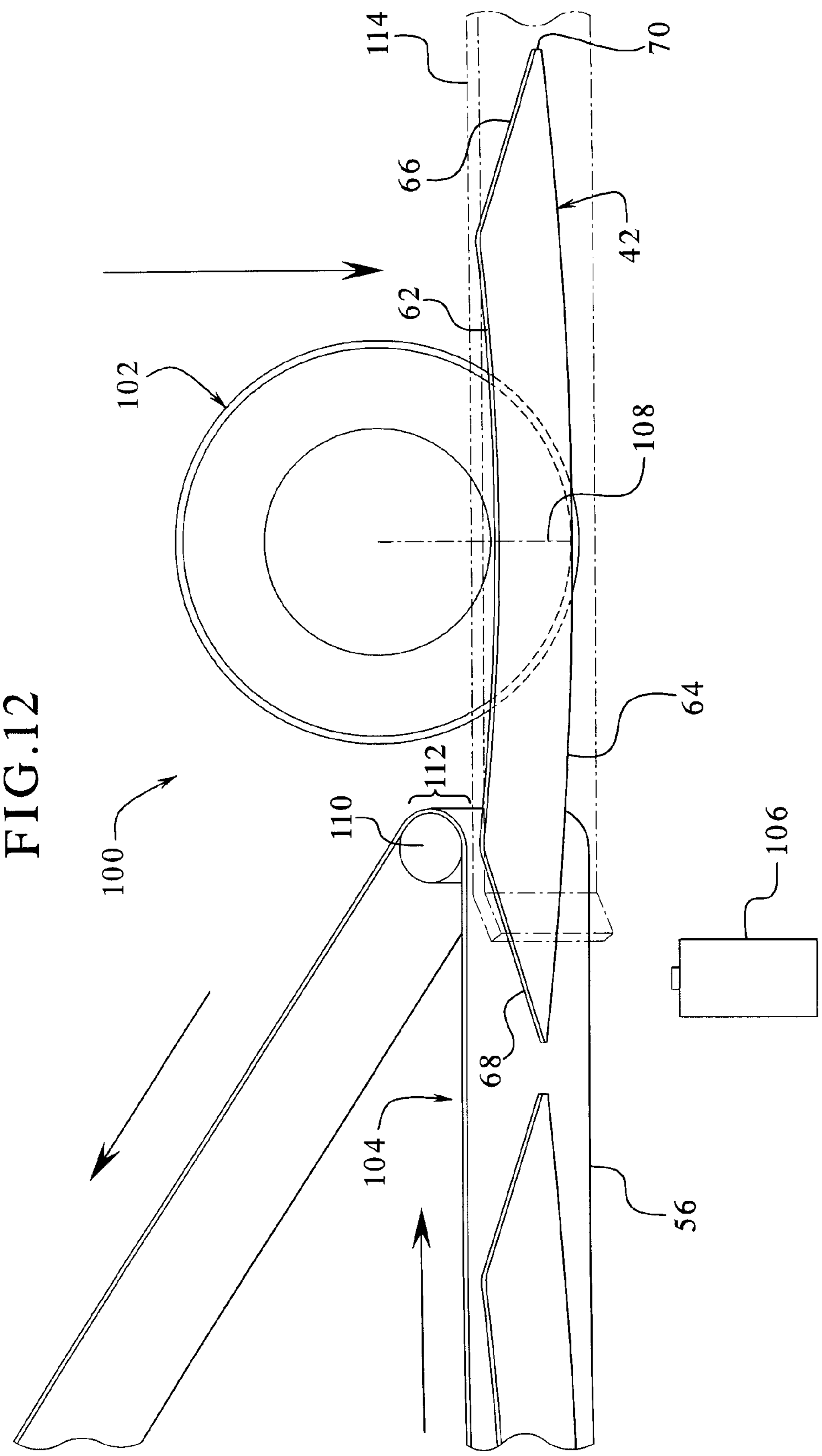
FIG. 12 is a diagrammatic top plan view of the cup reinforcing system of FIG. 9, illustrating a centered vertical axis of the reinforcing member aligned with the tapered side wall of the pre-reinforced plastic foam cup.
Figure 13:
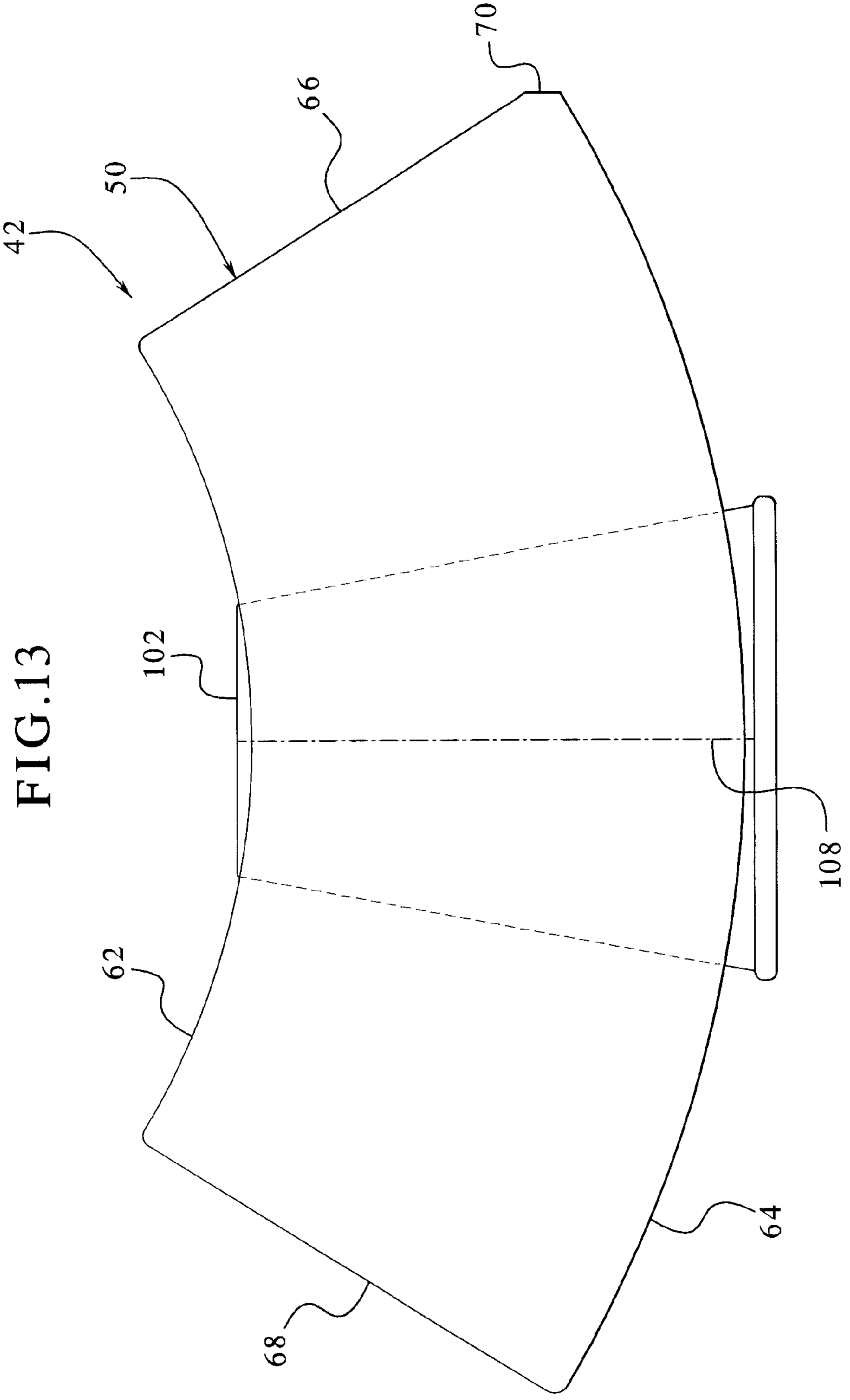
FIG. 13 is a side view of the pre-reinforced plastic foam cup aligned with the centered vertical axis of the reinforcing member.
Figure 14:
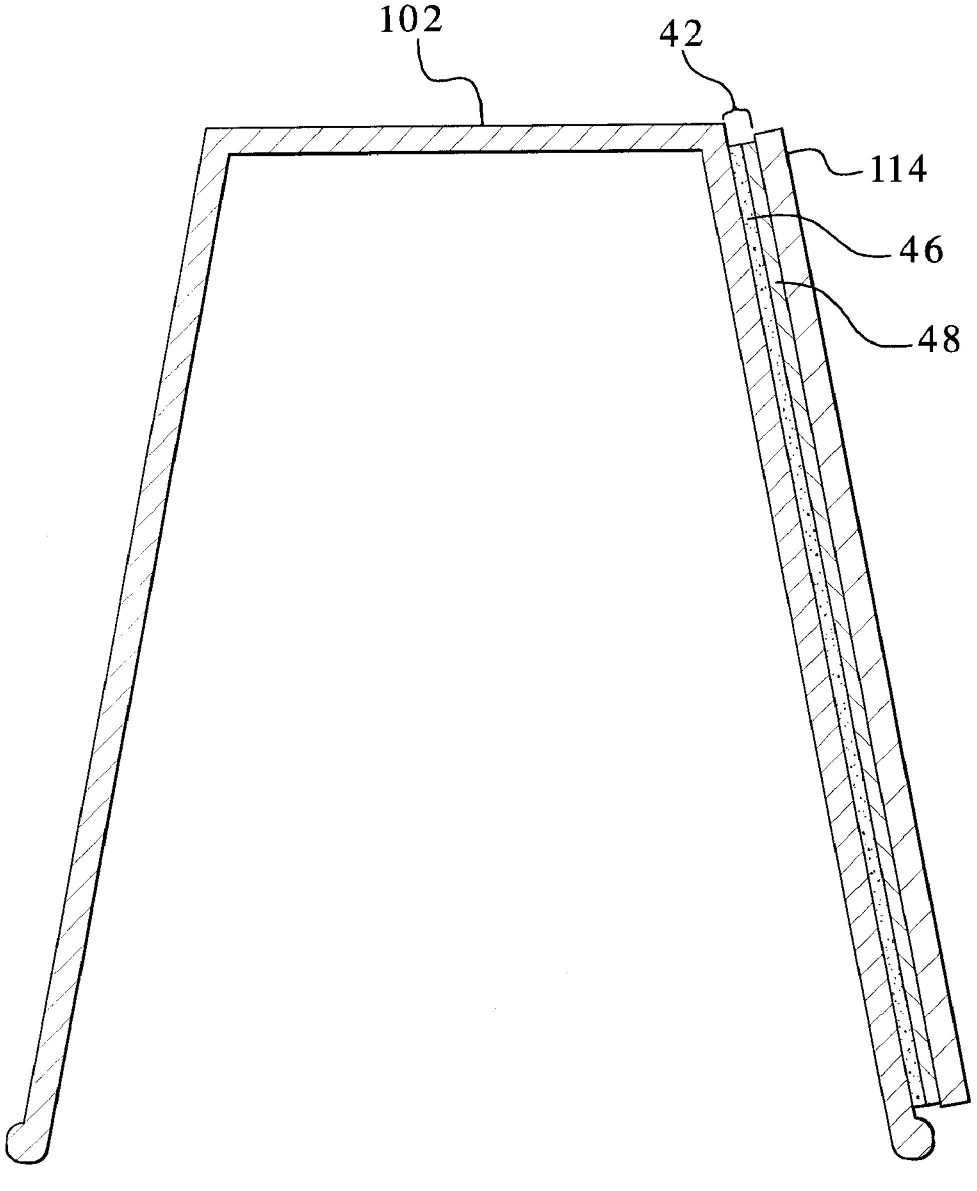
FIG. 14 is a cross-sectional side view of the reinforcing member engaging the tapered side wall of the plastic foam cup.

As seen in FIGS. 12, 13 and 14, in one embodiment, the processor of the cup reinforcing system causes the cup conveyer to move the cup 102 into the attachment position and causes the reinforcing member dispenser 104 to feed the reinforcing member 42 into the attachment position where the centered vertical axis 108 of the reinforcing member 42 is aligned with the tapered side wall of the base cup 102, and causes the inner face 52 of the reinforcing member 42 (which is completely or substantially completely coated with a pressure sensitive adhesive 54) to be initially attached to the tapered side wall of the cup along the centered vertical axis (as best seen in FIG. 13). In this embodiment, it should be appreciated that both the cup and the reinforcing member are moving prior to and through the point of attachment of the reinforcing member to the outer surface of the tapered side wall of the cup. In one embodiment, the cup conveyer moves the base cup into a position which engages the reinforcing member application pad 114, such that the tapered side wall of the cup presses against or engages the reinforcing member application pad to cause the reinforcing member 42 (which is positioned between the tapered side wall and the reinforcing member application pad 114) to engage the tapered side wall of the cup 102 as best seen in FIG. 14.

As described above and best seen in FIG. 14, the reinforcing member 42 is situated at an angle which corresponds with the angle of the tapered side wall of the cup and thus the reinforcing member is attached to the base cup at an angle which corresponds with the angle of the wall of the base cup. Moreover, as seen in FIG. 13, after the reinforcing member is initially attached to the cup along the centered vertical axis of both the reinforcing member and the cup, the leading edge 66 and trailing edge 68 of the reinforcing member remain unattached or are otherwise free. It should be appreciated that because the cup is placed open end down, the top edge 62 of the reinforcing member adheres to the tapered side wall at (or substantially adjacent to) the bottom end of the cup and the bottom edge 64 of the reinforcing member adheres to the tapered side wall at (or substantially adjacent to) the top, open end of the cup. It should be further appreciated that based on manufacturing tolerances, the reinforcing member may be attached to the cup slightly offset from the centered vertical axis of the reinforcing member, and in one embodiment in a range of plus or minus three degrees.

Figure 15:
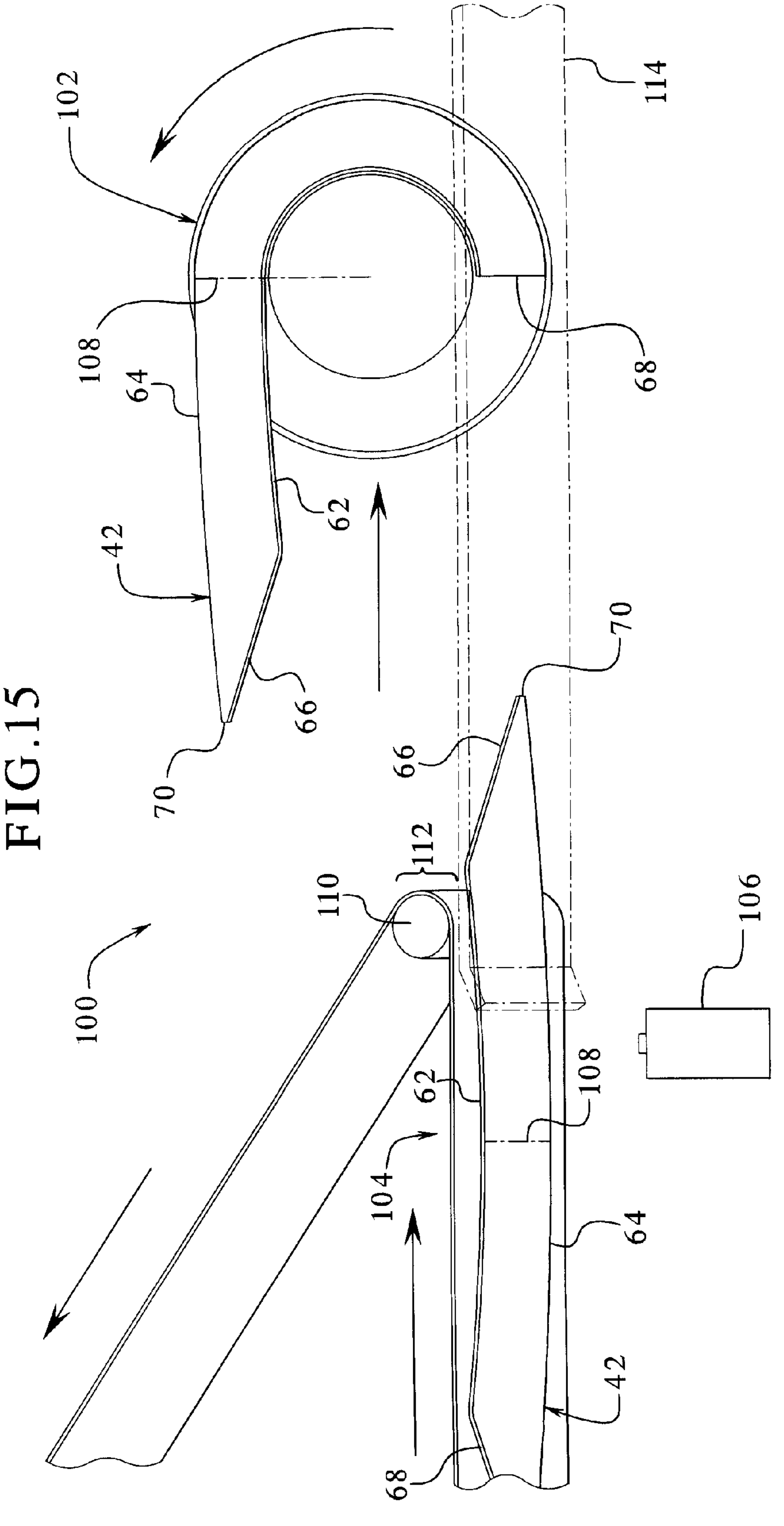
FIG. 15 is a diagrammatic top plan view of the cup reinforcing system of FIG. 9, illustrating a first portion of the reinforcing member attached to the cup and a second portion of the reinforcing member not attached to the plastic foam cup.
Figure 16:
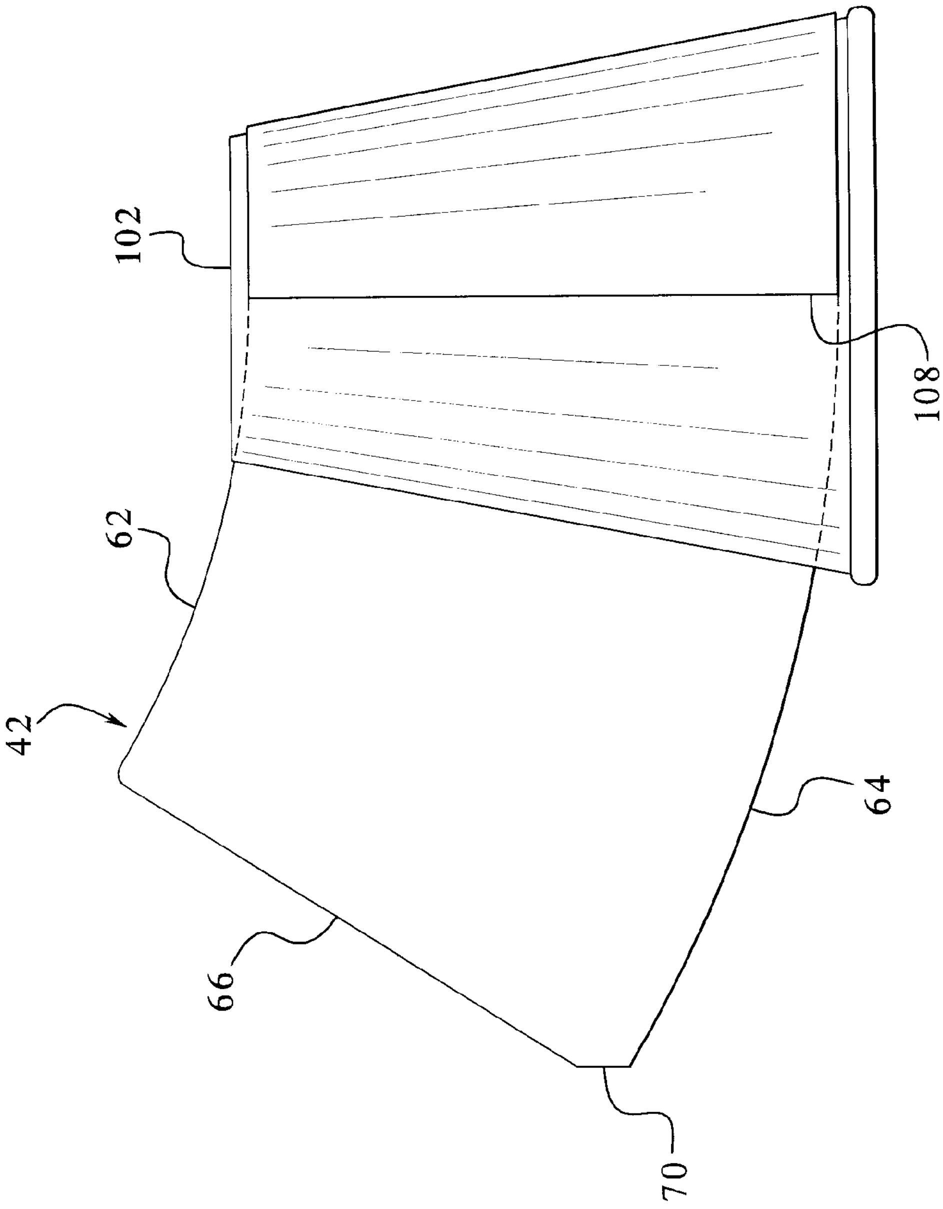
FIG. 16 is a side view of the partially attached reinforcing member of FIG. 15.

As illustrated in FIG. 15, after the reinforcing member 42 is attached to the tapered side wall of the cup 102 along the centered vertical axis 108 of the reinforcing member, the cup reinforcing system 100 is operable to cause the remaining unattached portions of the reinforcing member to engage and attach to the tapered side wall of the cup. In one embodiment, utilizing the turntable on which the cup resides, the cup rotates 180 degrees in a first direction. As the cup is rotating, the tapered side wall of the cup 102 presses against or engages the reinforcing member application pad 114 to cause a first portion or section of the reinforcing member to engage and thus, due to the pressure sensitive adhesive coating 54 on the reinforcing member 42, attach to the tapered side wall of the cup. In one embodiment, the first portion or section includes the portion of the reinforcing member 42 which extends from the centered vertical axis 108 to the trailing edge 68. Accordingly, as seen in FIG. 16, after the first section of the reinforcing member is attached to the tapered side wall of the cup, a second section of the reinforcing member remains unattached or is otherwise free.

Figure 17:
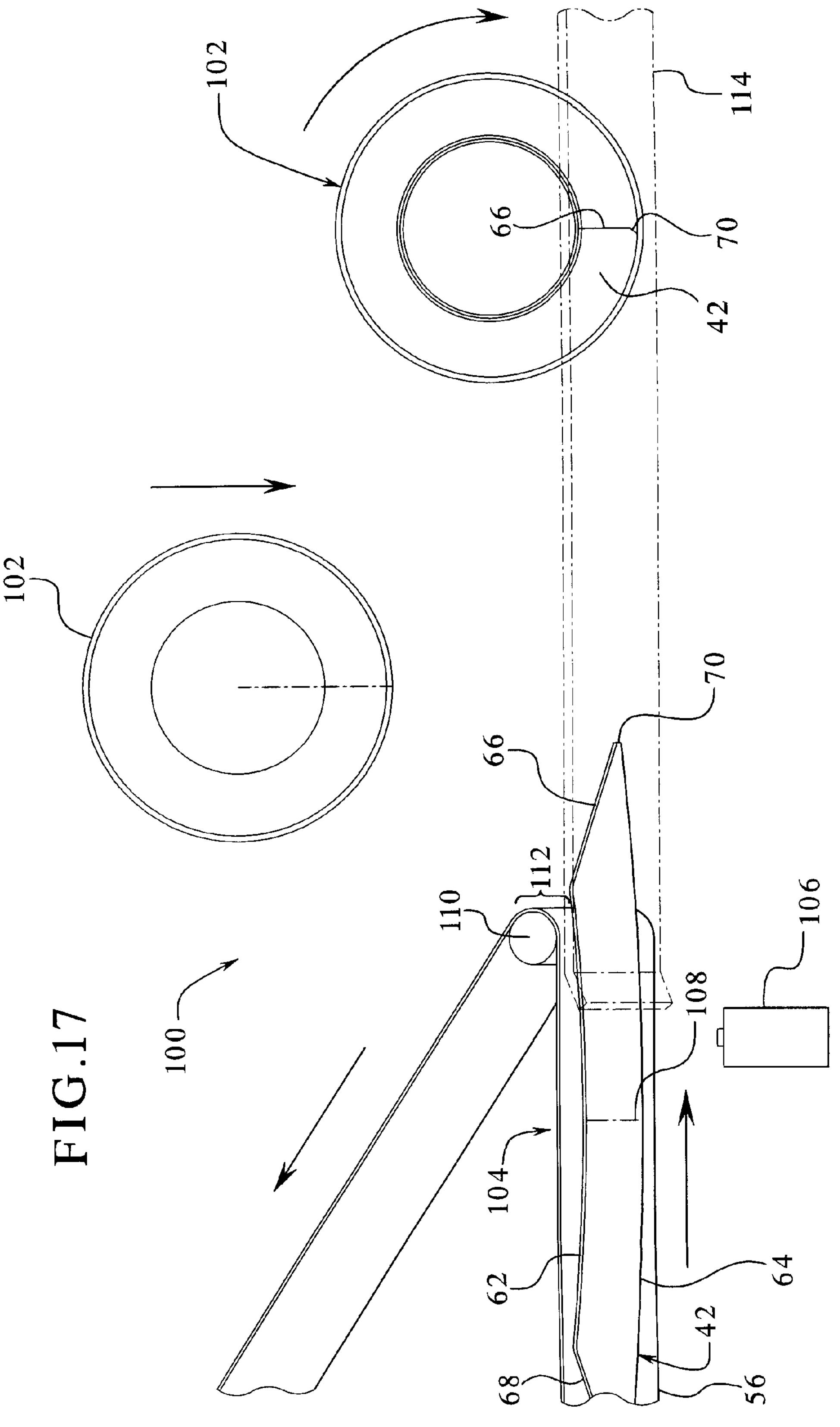
FIG. 17 is a diagrammatic top plan view of the cup reinforcing system of FIG. 9, illustrating the reinforcing member full attached to the plastic foam cup to form the reinforced plastic foam cup of FIG. 3.

As seen in FIG. 17, in one embodiment, following a rotation of the cup in a first direction, the cup is then rotated 360 degrees in an opposite, second direction. As the cup is rotating, the tapered side wall of the cup presses against or engages the reinforcing member application pad 114 to cause the second portion or section of the reinforcing member to engage and attach to the tapered side wall of the cup. In one embodiment, the second portion or section includes the portion of the reinforcing member 42 which extends from the centered vertical axis to the leading edge. As described above, the shape or configuration of the reinforcing member coupled with the shape or configuration of the cup provides that as the remaining portions of the reinforcing member are attached to the cup, the reinforcing member will affix to the tapered side wall of the cup in the desired configuration (i.e., the cup pulls to the reinforcing member and the reinforcing member pulls to the cup). The reinforced plastic foam cup provides a disposable drinking cup with the insulation properties of a plastic foam cup and the tactile feel and high quality graphic printing properties of a paper-based cup to provide an enhanced drinking experience for a person.

In one alternative embodiment, the cup reinforcing system may be configured with a plurality of reinforcing member application pads which are positioned on opposite sides of the cup such that the cup is rotated 180 degrees in a first direction to attach the first portion of the reinforcing member to the cup, followed by rotating the cup 180 degrees in the second direction to attach the second portion of the reinforcing member to the cup. After the rotation in the second direction, the reinforcing member is completely adhered to the base cup and the reinforced plastic foam cup 30 described above (and illustrated in FIGS. 3 and 4) is formed. It should be appreciated that any suitable apparatus for or method of attaching the reinforcing member to the tapered side wall along the centered vertical axis may be implemented in accordance with the present disclosure.

It should be appreciated that in one embodiment, as seen in FIG. 17, the cup reinforcing system is operable to sequentially reinforce one or more individual cups. In this embodiment, one or more cups are each placed face down and suitably spaced apart on the cup conveyer. Moreover, one or more reinforcing members are positioned linearly along a single release liner and wrapped in a supply roll. The supply roll is threaded about the reinforcing member dispenser to provide a continuous feed of reinforcing members.

In another embodiment (not shown), the cup is placed on the cup conveyer resting on its closed bottom end. In another embodiment (not shown), the reinforcing member dispenser is positioned such that the reinforcing member engages the tapered side wall of the cup situated in a vertical plane. Accordingly, in this embodiment, the cup conveyer is configured at a suitable angle to provide that the tapered side wall of the cup engages the reinforcing member in the vertical plane as well. In another embodiment, the cup conveyer is suitably angled and the cup is transported throughout the cup reinforcing system at such an angle. In these embodiments, the reinforcing member dispenser and/or the reinforcing member application pads are accordingly adjusted to any suitable angle to account for the angle of the cup and/or reinforcing member to insure that the reinforcing member is initially affixed to the tapered side wall of the cup at an angle which corresponds with the tapered side wall of the cup.

Figure 18A:
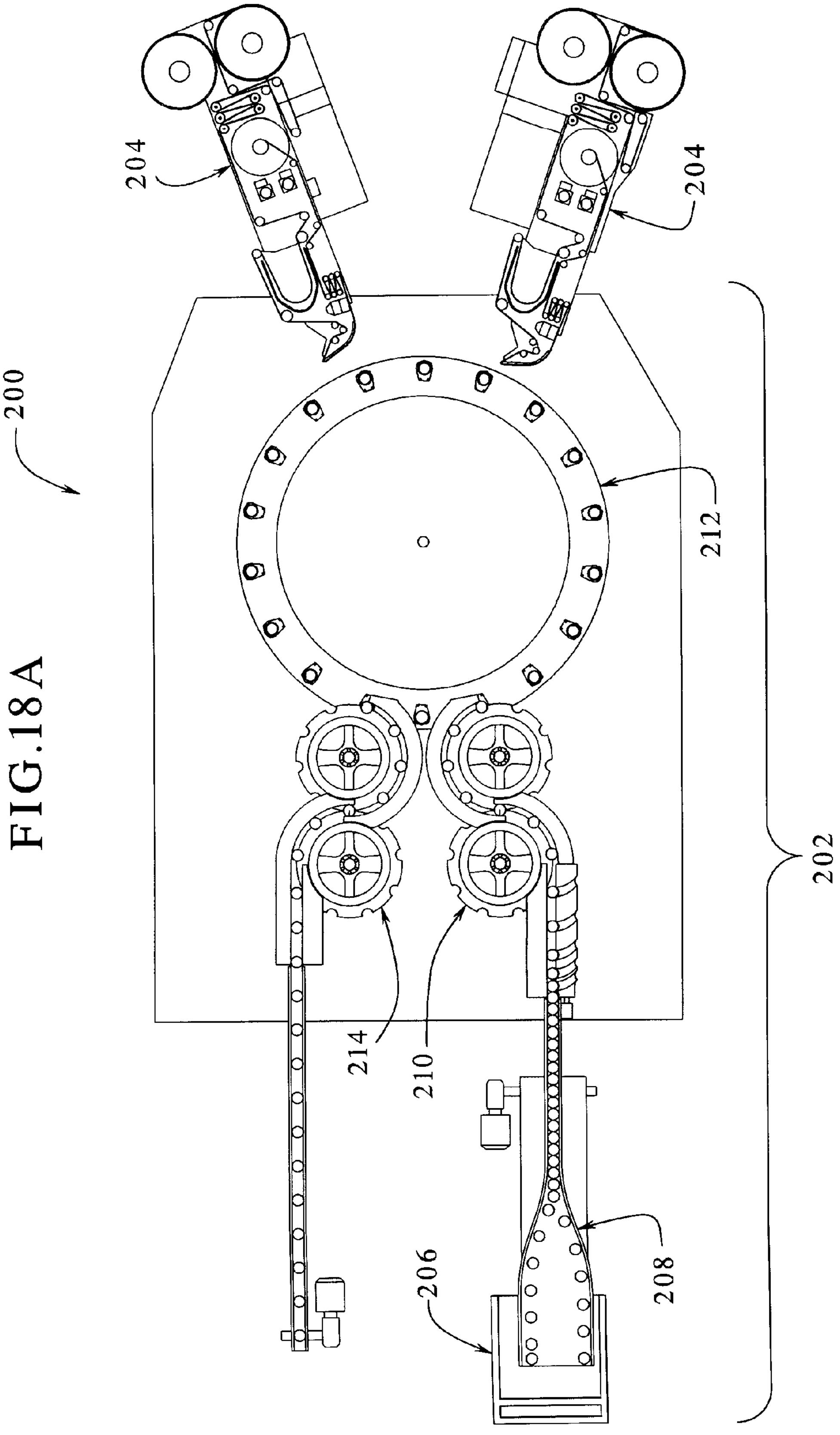
FIG. 18A is a diagrammatic top plan view of one embodiment of the cup reinforcing system disclosed herein.
Figure 18B:
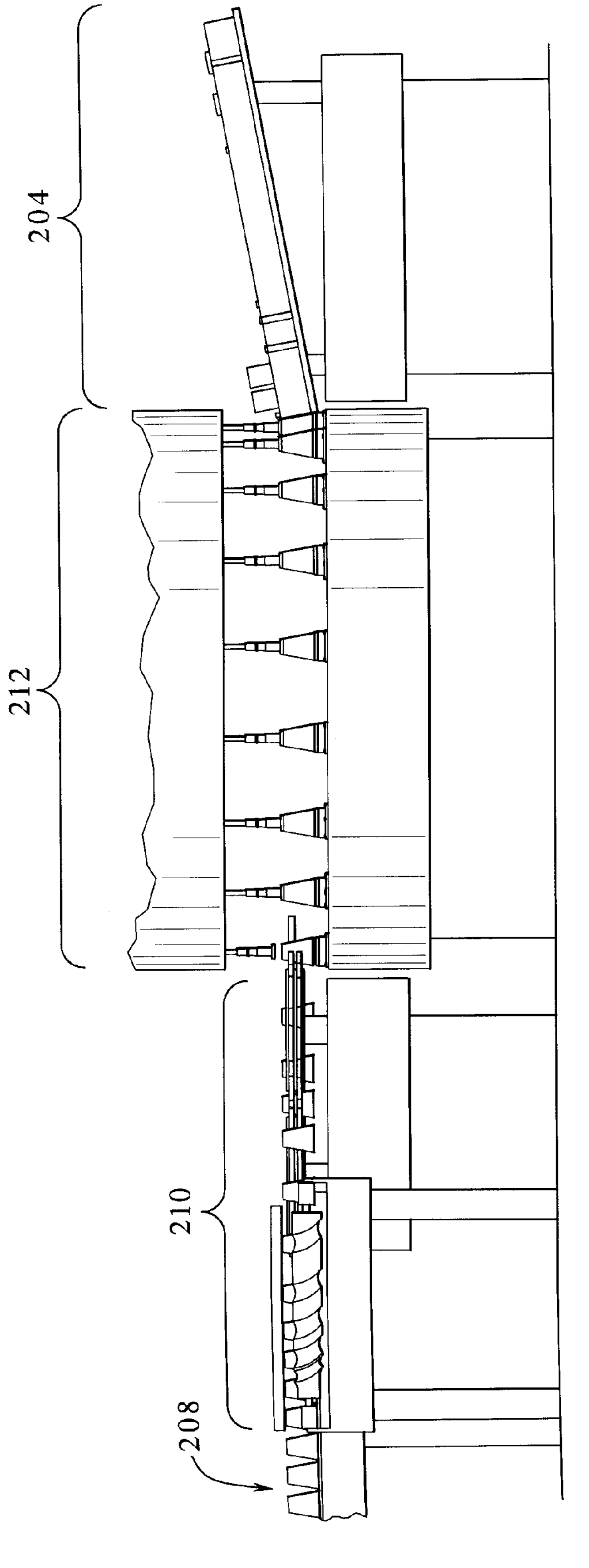
FIG. 18B is a diagrammatic side view of the cup reinforcing system of FIG. 18A.

Referring now to FIGS. 18A to 43F, various embodiments of the cup reinforcing system or apparatus disclosed herein are illustrated and generally indicated by numeral 200. As illustrated in FIGS. 18A and 18B, the cup reinforcing system 200 generally includes a cup conveyor system 202 and one or more reinforcing member dispensers 204*a* and 204*b* (referred to generally as 204). The cup conveyor system is configured to receive each pre-reinforced cup, transport and space such received cups into an appropriate position for attachment of a reinforcing member and remove each cup from the cup reinforcing system after the attachment of a reinforcing member to that cup. Each reinforcing member dispenser 204 is configured to transport each reinforcing member into the appropriate position for attachment with the transported cups and attach each reinforcing member, along a centered vertical axis of the reinforcing member, to the wall of one of the upside down positioned cups at an angle which corresponds with the angle of the tapered side wall of the cup.

Figure 36:
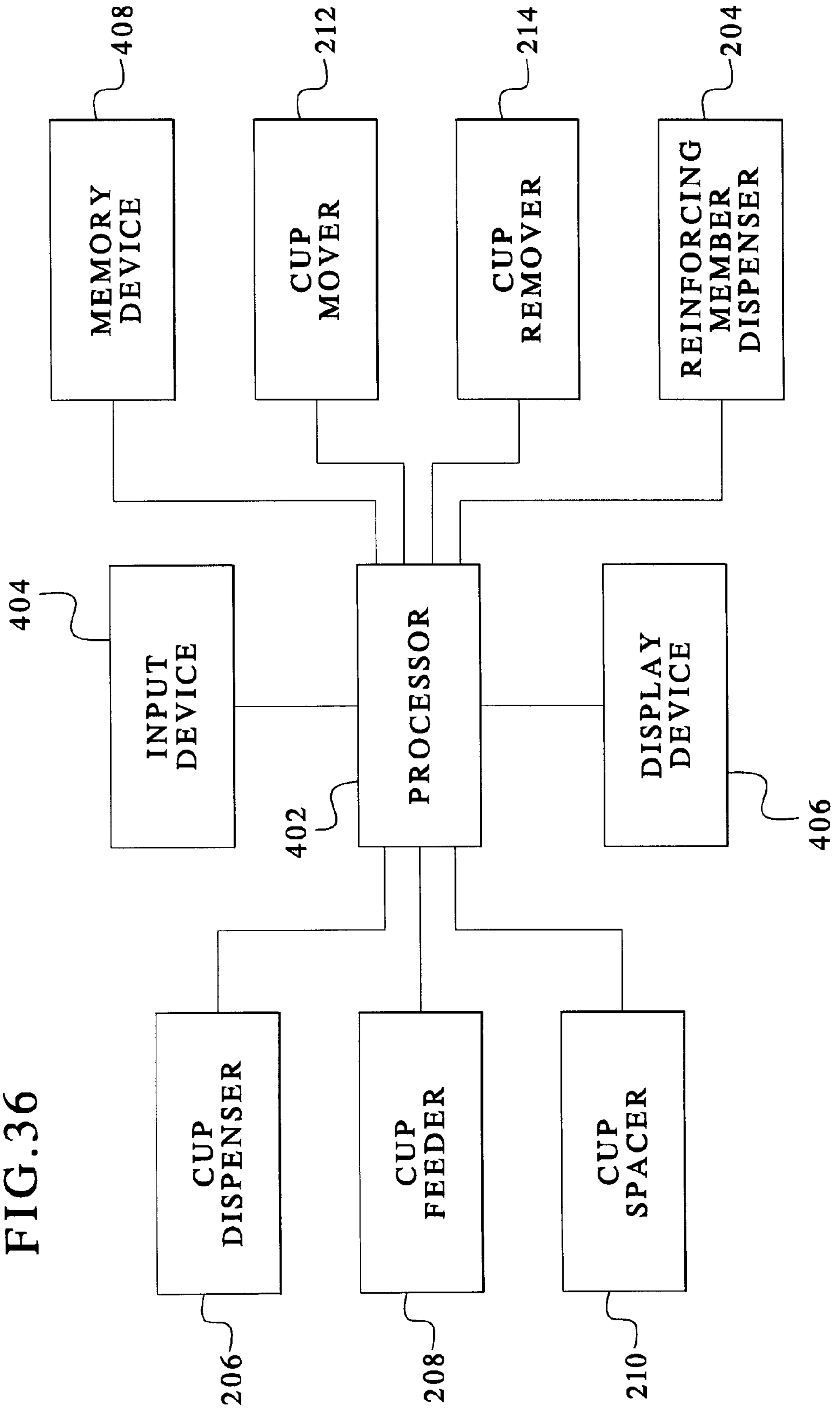
FIG. 36 is a schematic block diagram of an electronic configuration of one embodiment of the cup reinforcing system disclosed herein.

More specifically, the cup conveyor system includes a cup dispenser 206, a cup feeder 208, a cup spacer 210, a cup mover 212, and a cup remover 214. As generally illustrated in FIG. 36, the processor 402 of the cup reinforcing system is in communication with and programmed to control the cup dispenser 206, the cup feeder 208, the cup spacer 210, the cup mover 212, the cup remover 214, and the reinforcing member dispenser 204. The processor is also in communication with and programmed to control at least one input device or control panel 404, such as a touch screen or one or more suitable switches or buttons, for enabling a user to operate the cup reinforcing system and at least one display device 406 for displaying suitable information to a user of the cup reinforcing system. The input device enables a user to input appropriate commands and/or suitable information to the processor of the cup reinforcing system. For example, a user utilizes at least one input device to initiate and shut-off the cup reinforcing system, provide information regarding the exact specifications of the cups and/or reinforcing members, input the speed to move the cups throughout the cup reinforcing system, and input the angle to set the reinforcing member dispenser relative to the cup mover. In another embodiment, one or more of the functions described above may be manually adjusted utilizing one or more mechanical or other suitable devices. For example, the angle to set the reinforcing member dispenser relative to the cup mover may be manually adjusted utilizing one or more individual hand cranks.

The processor is in communication with or operable to access or to exchange signals with at least one data storage or memory device 408. The memory device stores program code and instructions, executable by the processor, to control the cup reinforcing system. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the cup reinforcing system disclosed herein. In one embodiment, part or all of the program code and/or operating data described above can be stored in a detachable or removable memory device, including, but not limited to, a suitable cartridge, disk, CD ROM, DVD or USB memory device. The processor and memory device may sometimes be collectively referred to herein as a "computer" or "controller."

As described in more detail below, a pre-reinforced or base cup enters the cup reinforcing system via the cup dispenser 206 from a supply of nested cups. The cup travels via the cup feeder 208 to the cup spacer 210 and then to the cup mover 212. The cup mover 212 aligns the cup into the appropriate alignment with the reinforcing member dispenser 204 and the reinforcing member is attached or affixed to the cup by the reinforcing member dispenser 204. The reinforced cup is removed from the cup reinforcing system via the cup remover 214. It should be appreciated that any other suitable cup conveyor system and any suitable reinforcing member dispenser which attaches a reinforcing member to the tapered side wall of a base cup along the centered vertical axis of the reinforcing member and subsequently attaches the remaining portions of the reinforcing member to the tapered side wall of the base cup may be implemented in accordance with the cup reinforcing system disclosed herein.

Figure 19:
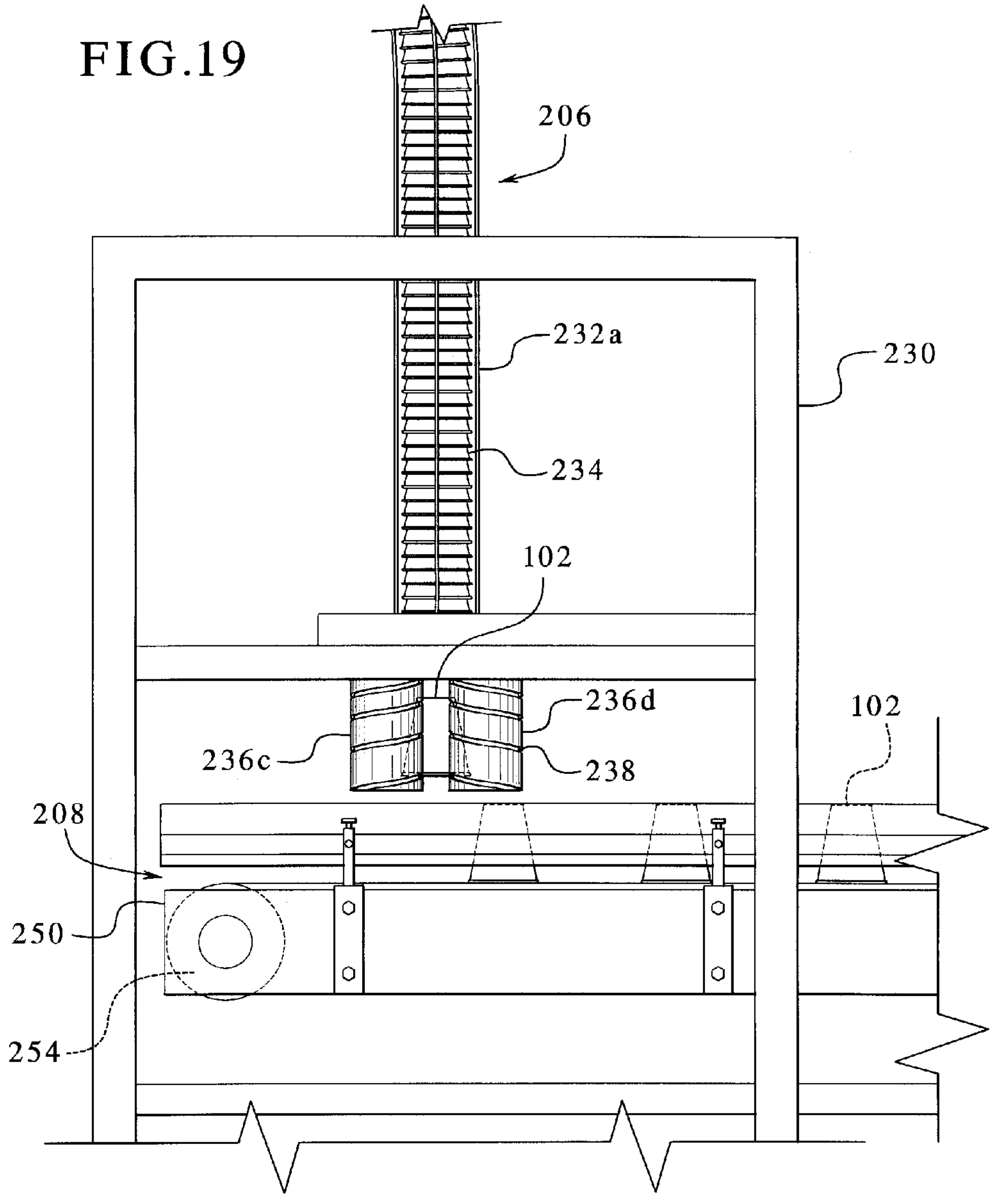
FIG. 19 is a side view of the dual cup dispenser, the cup conveyor and the vacuum chamber of one embodiment of the cup reinforcing system disclosed herein.
Figure 20:
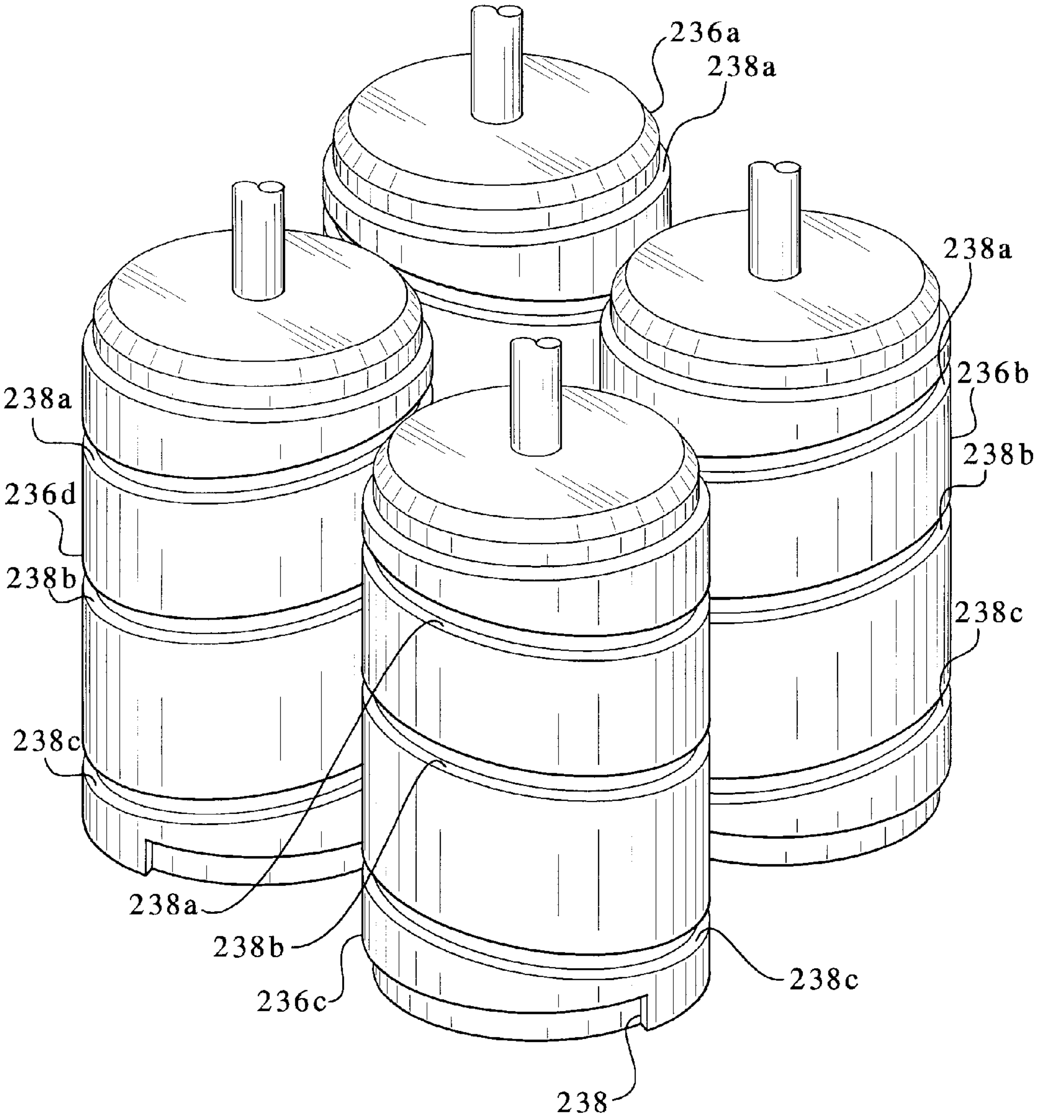
FIG. 20 is a front perspective view of one set of cup dispensing screws of the dual cup dispenser of FIG. 19.
Figure 21:
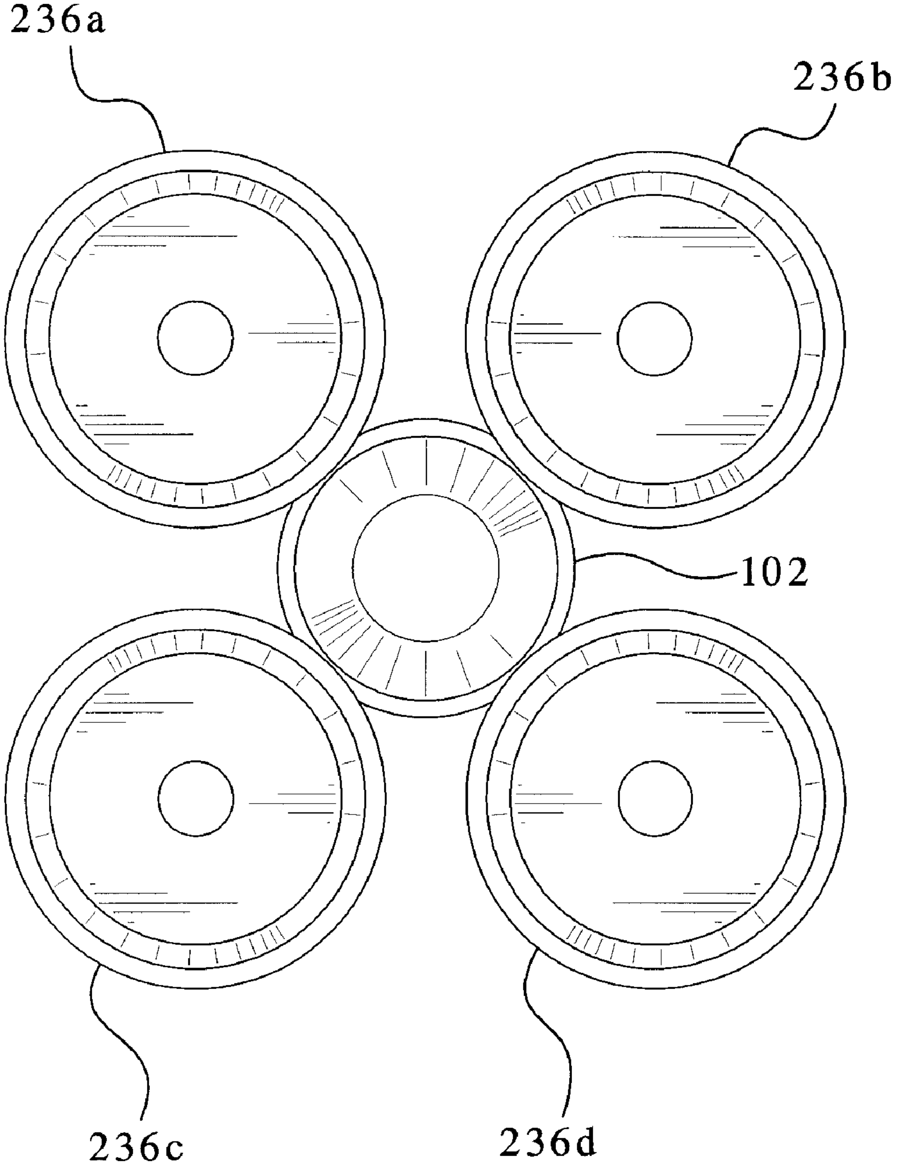
FIG. 21 is a top plan view of a set of cup dispensing screws of the dual cup dispenser engaging a cup.

As seen in FIGS. 19 to 22, the cup dispenser 206 of the cup reinforcing system includes a frame 230 which supports two independent, offset guide members 232*a* and 232*b* (referred to generally as 232). Each guide member is configured to hold a stack of nested pre-reinforced or base cups 234*a* and 234*b* (referred to generally as 234) in upside down positions above the cup feeder 206. Each guide member 232 is associated with at least one and preferably a plurality of or set of vertically or substantially vertically disposed co-acting cup dispensing screws or cup de-nesters 236*a*, 236*b*, 236*c* and 236*d* (referred to generally as 232 and as best seen in FIGS. 20 and 21) made of any suitable smooth surfaced, non-abrasive material with self-lubrication properties, such as any suitable plastic, for example a DELRIN® plastic manufactured by E. I. DU PONT DE NEMOURS AND COMPANY.

Each cup dispensing screw 236 has internally extending threading 238 on its outer surface. The threads are suitably sized and angled to correlate to the top lips of the upside down positioned base cups 102 held by the guide members 232. The cup dispensing screws 236 are each movably connected or coupled to at least one actuator 240, such as a motor or other suitable movement generating device controlled by the cup reinforcing system processor which causes each cup dispensing screw 236 to rotate in the appropriate direction at a suitable speed.

In operation, as best seen in FIGS. 19 and 21, the internal threading located at or near the top 238*a* of each rotating cup dispensing screw 236 engage a portion of the outwardly extending lip 24 of a first nested upside down cup held by one of the guide members 232. Each cup dispensing screw rotates to pull the first cup, via the top threading 238*a* of each cup dispensing screw which engages the cup lip 24, from the nested set of cups 234. As each cup dispensing screw 236 continues to rotate, the cup lip 24 of the first cup is passed to the threading located at or near the middle 238*b* of each rotating cup dispensing screw and then to the threading located at or near the bottom 238*c* of each rotating cup dispensing screw to slowly and consistently pull the first cup further away from the nested set of cups 234. As the first cup is passed from the top threading 238*a* of each cup dispensing screw to the middle threading 238*b*, the top threading 238*a* engages the lip 24 of a second nested upside down cup to pull the second cup, via the top threading 238*a* engaging the lip of the second cup, from the nested set of cups 234. This process continues to separate each nested cup from the set of nested, upside-down cups loaded into the cup dispenser 206. In other words, the rotating threads of the cup dispensing screws co-act to separate each engaged cup, one at a time, from the nested stack of pre-reinforced upside down cups. After being de-nested, each separated cup 102 proceeds to drop down to the cup feeder 208 located directly below the cup dispenser 206.

In one alternative embodiment, the cup dispenser includes more than two independent, offset guide members. In this embodiment, each guide member holds a stack of nested pre-reinforced cups and is further associated with at least one and preferably a plurality of vertically disposed cup dispensing screws as described above. In another alternative embodiment, one guide member is configured to hold a plurality of stacks of nested pre-reinforced cups above a plurality of different locations of the cup feeder. In this embodiment, the guide member is associated with at least one and preferably a plurality of vertically disposed cup dispensing screws for each held stack of pre-reinforced cups. In another alternative embodiment, one guide member is configured to hold one stack of nested pre-reinforced cups above a single location of the cup feeder. In this embodiment, the guide member is associated with at least one and preferably a plurality of vertically disposed cup dispensing screws for the held stack of pre-reinforced cups. It should be appreciated that any suitable apparatus or method for loading one or more pre-reinforced cups onto the cup feeder may be implemented in accordance with the cup reinforcing system disclosed herein. It should be further appreciated that the cup dispenser disclosed herein may be located at any suitable position upstream from the reinforcing member dispenser described below.

As seen in FIGS. 19 and 22 to 24, the cup feeder 208 of the cup conveyor system includes a frame 250 which supports a plurality of rows of adjacently positioned conveyor belts 252*a* to 252*e* (referred to generally as 252). The conveyor belts are suitably movably connected or coupled to at least one actuator, such as a motor or other suitable movement generating device 254 which causes the conveyor belts to move at any suitable speed in a conventional manner.

It should be appreciated that static electricity can build up by rapid movement of plastic foam cups. The use of multiple guide members 232 and multiple cup dispensing screws 236 reduces the likelihood of static electricity buildup in the cup reinforcing system disclosed herein. That is, the use of multiple guide members and multiple cup dispensing screws reduces the number of cups each individual guide member/cup dispensing screw must dispense per minute. This reduced number of cups directly correlates to a reduction in the speed which cups must be transported throughout the cup reinforcing system and such a reduction in speed reduces the amount of static electricity buildup.

Figure 22:
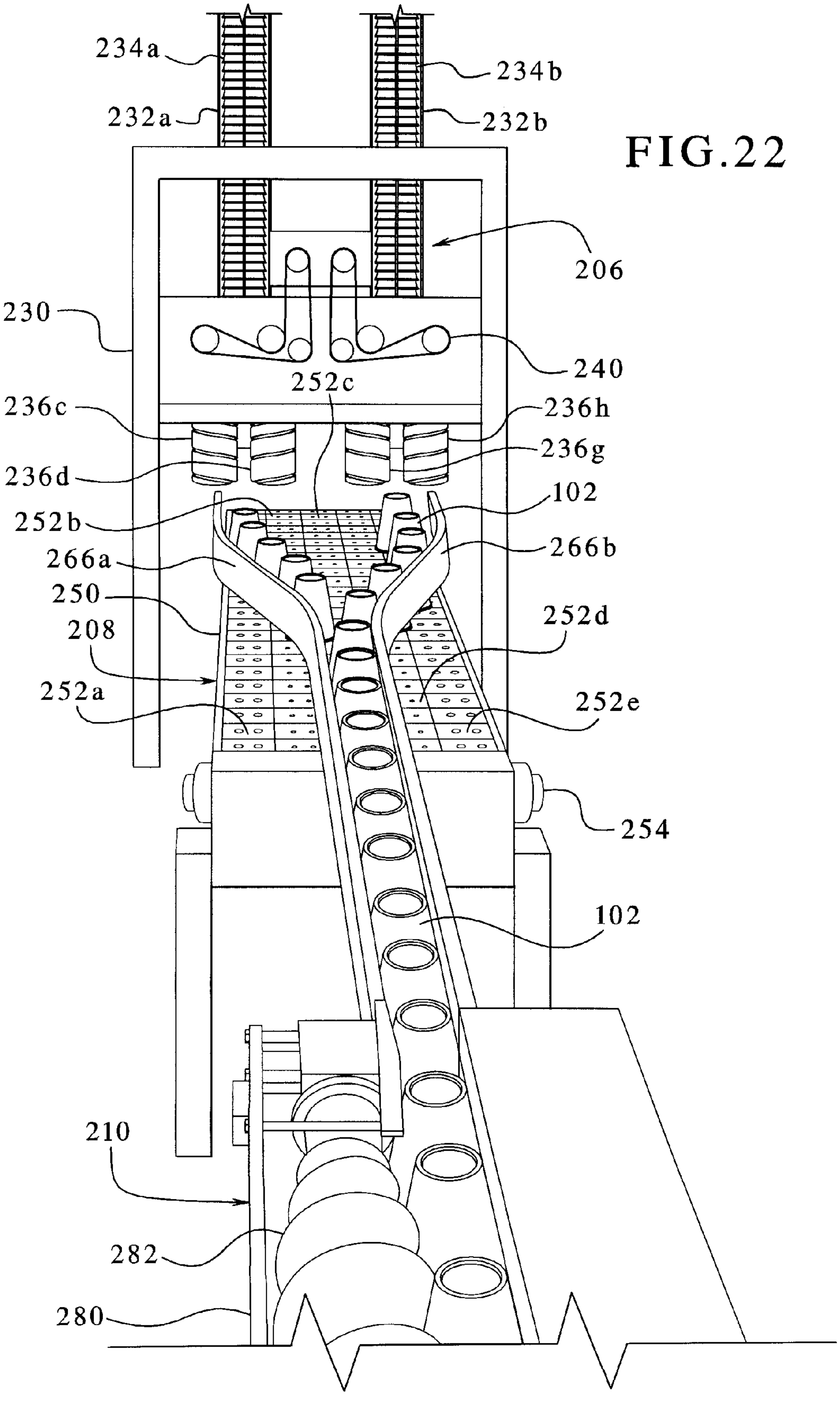
FIG. 22 is a front perspective view of the dual cup dispenser, the cup conveyor, the vacuum chamber and the spacing screw of one embodiment of the cup reinforcing system disclosed herein.
Figure 24A:
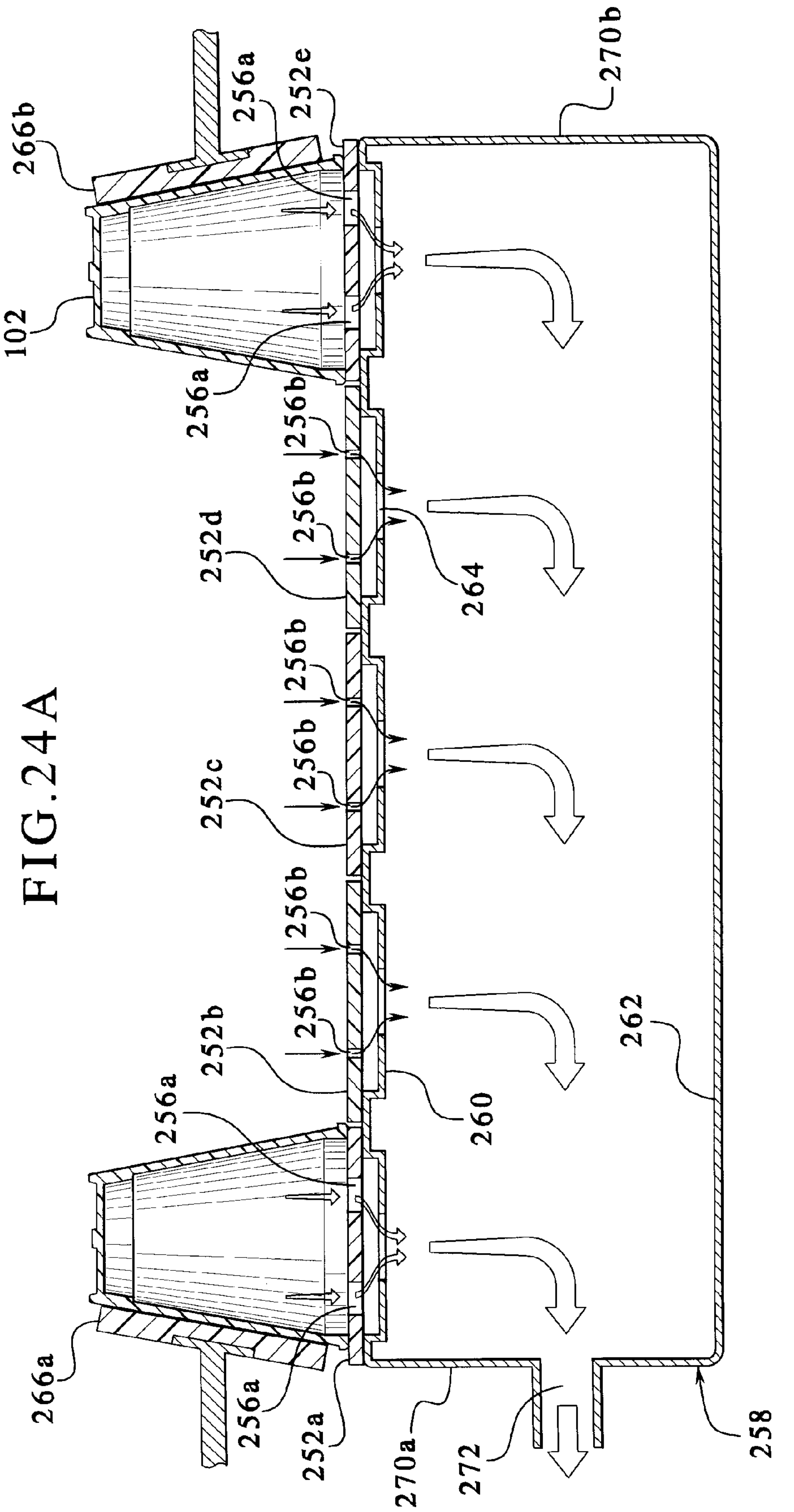
FIG. 24A is a schematic side view of the vacuum box of FIG. 22, illustrating the flow of air from an area above the plurality of conveyor belts, entering the vacuum chamber via the plurality of air inlets and exiting the vacuum chamber via the air outlet.
Figure 24B:
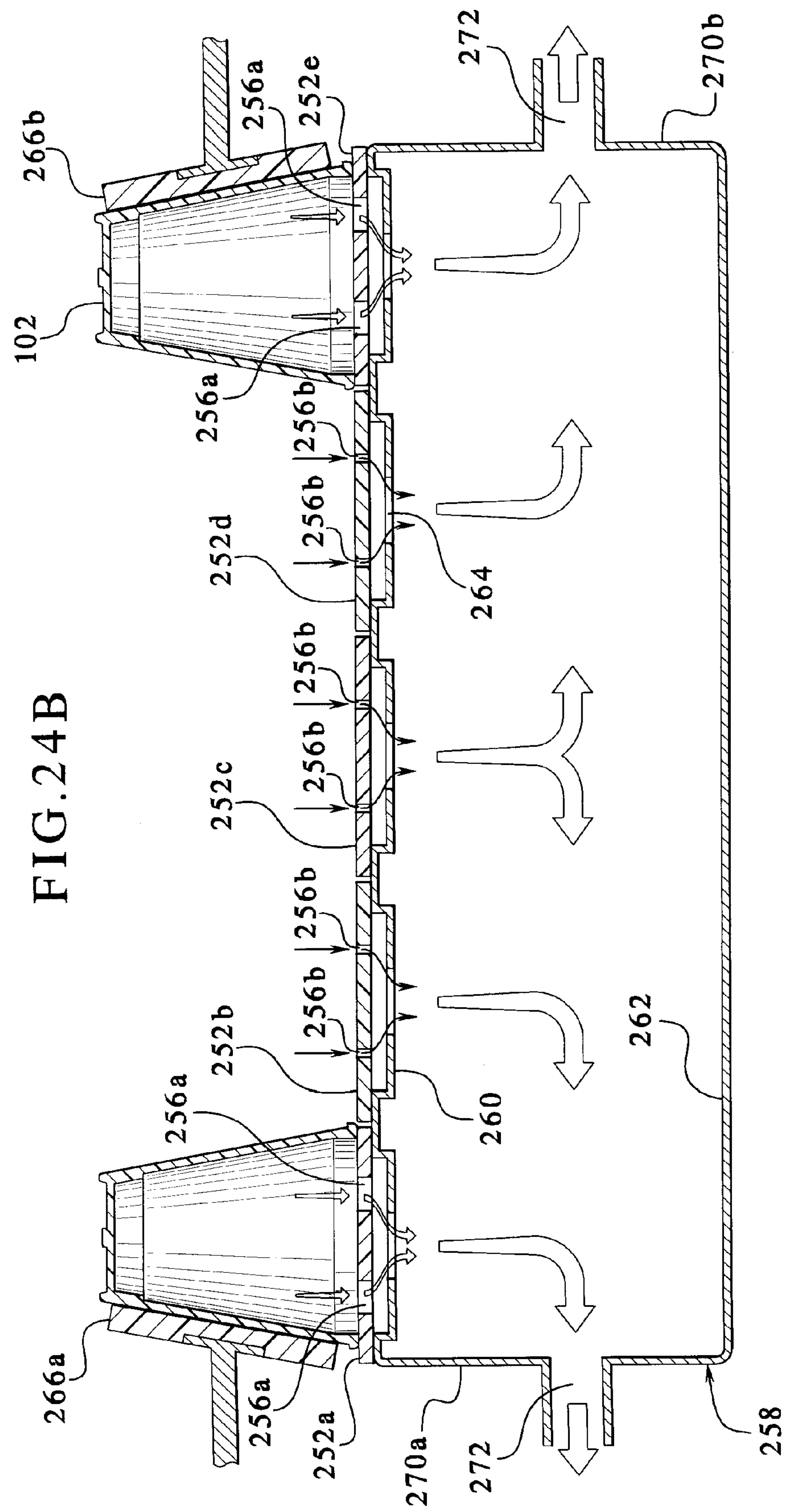
FIG. 24B is a schematic side view of an alternative embodiment of a vacuum box, illustrating the flow of air from an area above the plurality of conveyor belts, entering the vacuum chamber via the plurality of air inlets and exiting the vacuum chamber via a plurality of air outlets.

In one embodiment, one, more or each of the conveyor belts 252 define one or more apertures or holes 256 through which air flows as described below. As best illustrated in FIGS. 22, 24A and 24B, the conveyor belts which are positioned or aligned beneath or under the offset guide members 232*a* and 232*b*, in this case conveyor belts 252*a* and 252*e*, define larger diameter apertures or holes 256*a* than the apertures or holes 256*b* of the conveyor belts which are not positioned under the offset guide members, in this case conveyor belts 252*b*, 252*c* and 252*d*. It should be appreciated that any suitable number of holes, of any suitable diameter and of any suitable shape (such as elongated oval shaped holes) which allows an adequate amount of air flow as described below, may be implemented in accordance with the cup reinforcing system disclosed herein.

Figure 23:
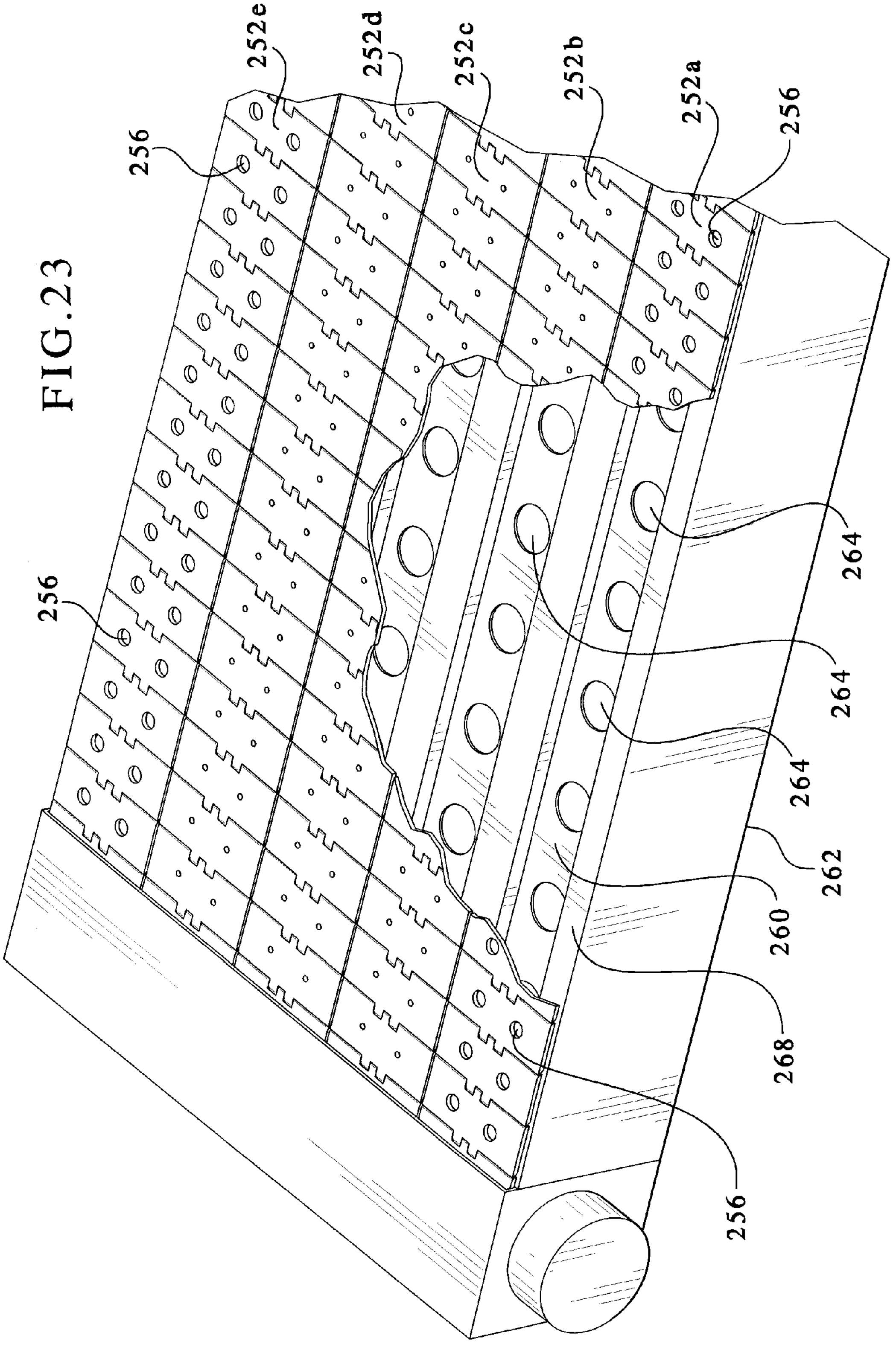
FIG. 23 is a partially cross-sectional perspective view of the vacuum chamber of FIG. 22, illustrating the plurality of adjacent conveyor belts and the plurality of air inlets.

As illustrated in FIGS. 23, 24A and 24B, the frame 250 of the cup feeder 208 supports a vacuum chamber, box or housing 258. The vacuum box 258 includes a top wall or surface 260 and a spaced apart bottom wall or surface 262. The top wall defines a plurality of apertures or air inlets 264. The vacuum box includes spaced apart side walls 268, wherein the top of each side wall is connected to the top wall and the bottom of each side wall is connected to the bottom wall. The vacuum box also includes spaced apart end walls 270*a* and 270*b*, wherein the top of each end wall is connected to the top wall, the bottom of each end wall is connected to the bottom wall, one side of each end wall is connected to one side wall and the other side of each end wall is connected to the other side wall. At least one side wall of the vacuum box (side wall 270*a* of FIG. 24A and side walls 270*a* and 270*b* of FIG. 24B) each defines one or more apertures or air outlets 272 which are connected, via suitable air communication lines, to one or more vacuum or negative pressure sources (not shown). That is, the vacuum chamber is in fluid communication with a suitable vacuum or negative pressure source.

Figure 24C:
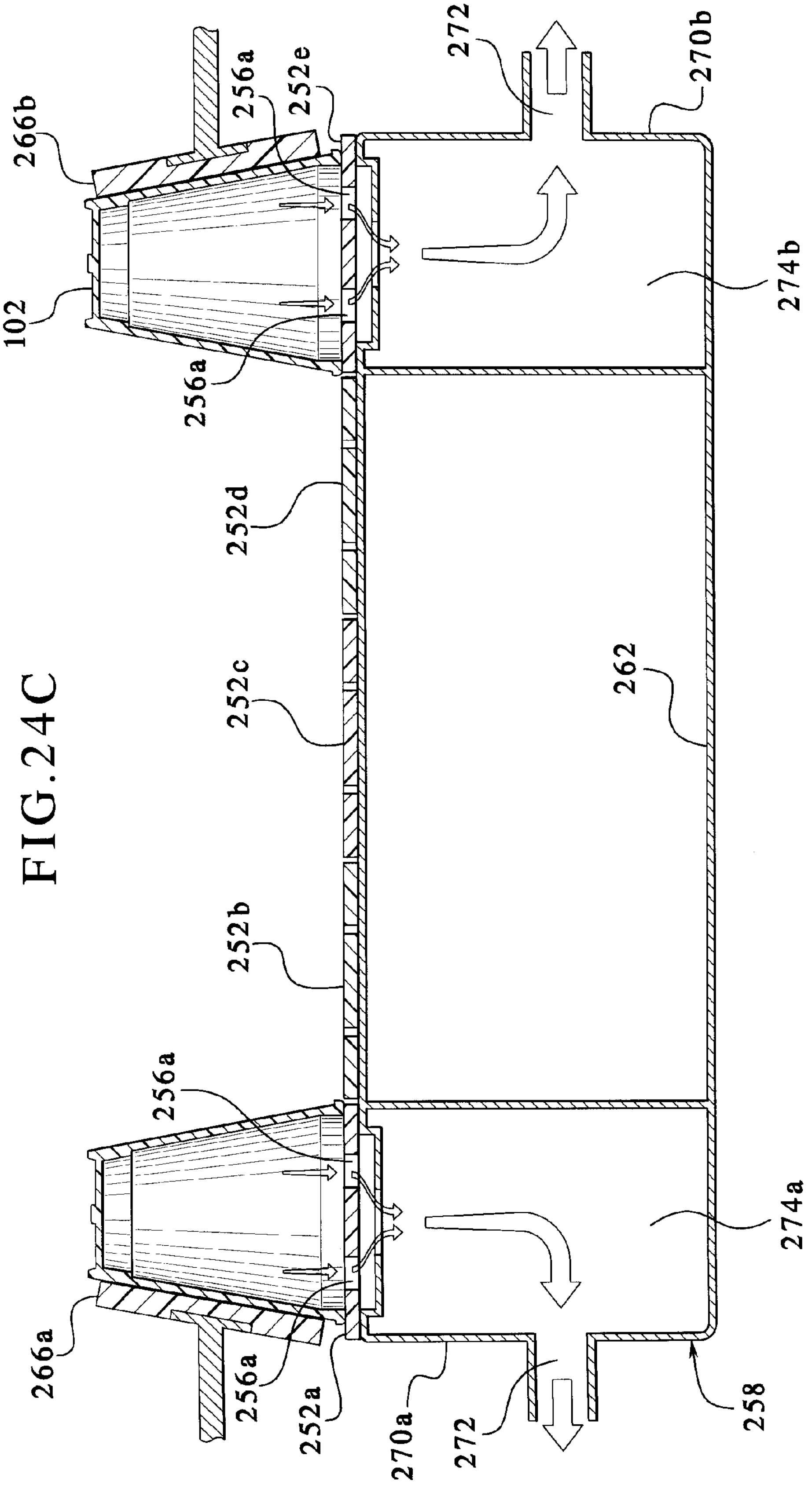
FIG. 24C is a schematic side view of an alternative embodiment of a vacuum box, illustrating the flow of air from an area above the plurality of conveyor belts, entering a plurality of air flow members via the plurality of air inlets and exiting the air flow members via a plurality of air outlets.

In one alternative embodiment, as seen in FIG. 24C, the frame 250 of the cup feeder includes two air flow members 274*a* and 274*b* spaced below the offset guide members of the cup dispenser. In this embodiment, each air flow member is connected to a vacuum or negative pressure source which pulls each base cup from the cup dispenser. It should be appreciated that in this embodiment, air only flows through the larger diameter holes in the conveyor belt (located directly above the air flow member) and not through the smaller diameter holes, if any, in the conveyer belt not located directly above the air flow member.

As specifically illustrated in FIG. 24, the vacuum source provides negative air flow from the area above the conveyer belts 252, through the holes 264 of the conveyer belts, the air inlets 256 of the top surface 260 of the vacuum box and the defined air outlet 272 of the vacuum box to the vacuum source. In operation, each separated base cup is pulled downwardly by the vacuum pressure, in a face down position, from the cup dispenser 206 onto the cup feeder 208. It should be appreciated that positioning the larger apertures 256*a* of certain of the conveyer belts under the offset guide members 232 of the cup dispenser 206 provides for an increased amount of air to flow from above the conveyor belts 252, through the larger apertures 256*a* and to the vacuum source (not shown) near the location where the cup dispenser 206 drops the cups 102. It should be further appreciated that vacuum pressure applied to the cups provides that the relatively light-weight base cups (as opposed to a heavier bottle) do not tip over when they are dropped from the cup dispenser 206 to the cup feeder 208.

The cup reinforcing system is configured to move the cups along the conveyor belts at a relatively slow speed when compared to the speeds which bottles are moved though a bottle labeling system. That is, while bottles of a bottle labeling system are typically labeled at approximately one-thousand bottles per minute, the disclosed cup reinforcing system applies reinforcing members to base cups at less than half the rate of such bottle labeling systems. As mentioned above, such a reduction in the speed which the cups are moving through the cup reinforcing system eliminates static electricity buildup often caused by rapid movement of plastic foam cups.

As seen in FIGS. 22 and 24, the cup feeder 208 includes at least two opposing spaced-apart elongated guide rails or guide tracks 266*a* and 266*b* (referred to generally as 266) supported by the frame 250 of the cup feeder. The guide rails 266 are angled offset from a vertical plane at a suitable angle to match the angle of the tapered side walls of the cups transported by the conveyor belts 252. Guide rail 266*a* and 266*b* extend in intersecting planes such that the space between the two guide rails 266 is reduced as the guide rails extend out from an area substantially below the cup dispenser 206. In operation, as each cup 102 moves along the conveyor belts 252 of the cup feeder 208 in the direction of the cup spacer 210, each cup engages one of the guide rails 266. As the cups move closer to the cup spacer, the engagement with the guide rails 266 causes the cups to move into a single-file order. It should be appreciated that the cup feeder may include any suitable apparatus or method for transporting the cups from the cup dispenser to the cup spacer.

Figure 25:
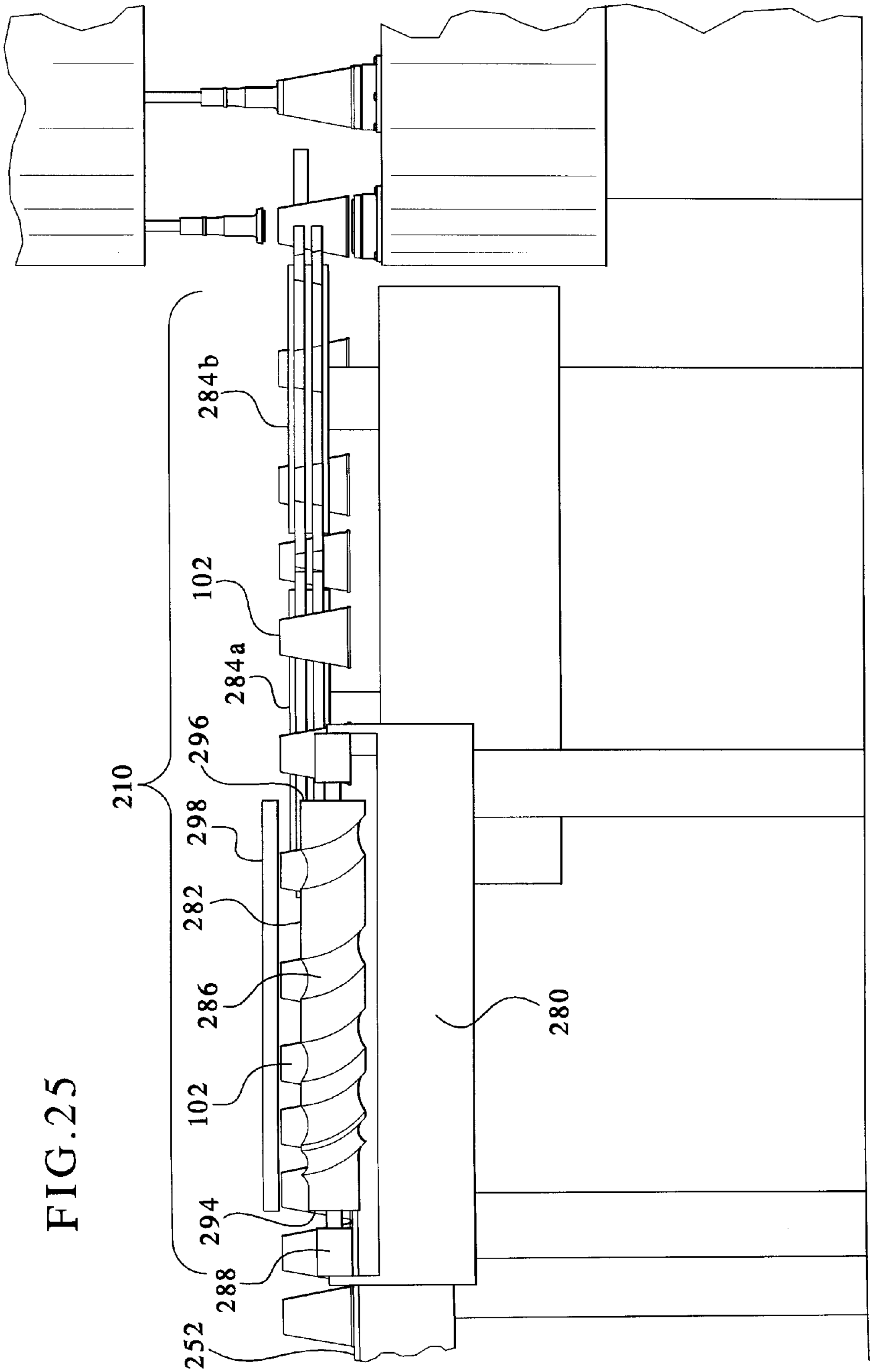
FIG. 25 is a side view of the spacing screw, the in-feed star wheels and a portion of the cup mover of one embodiment of the cup reinforcing system disclosed herein.
Figure 26:
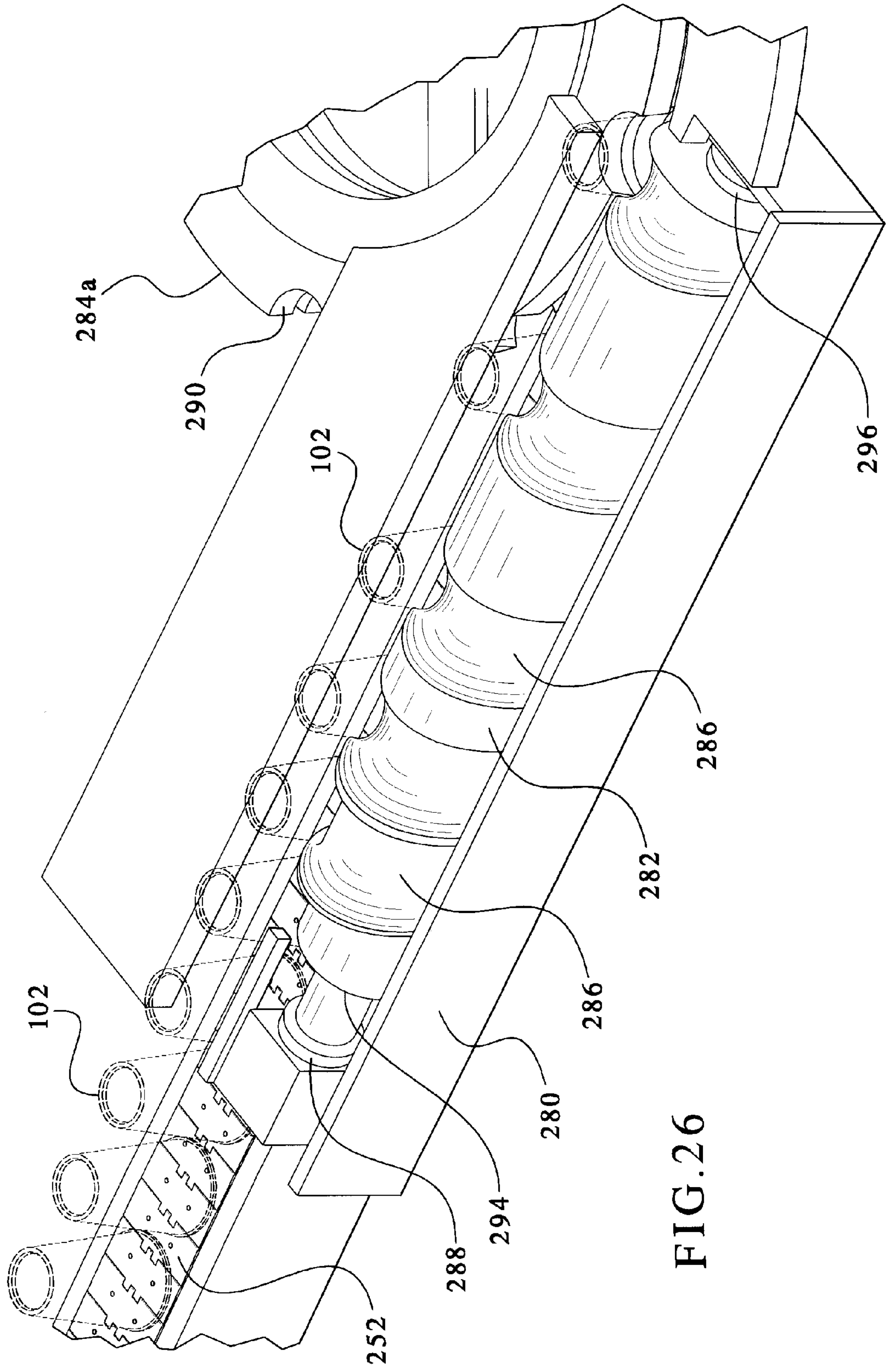
FIG. 26 is a front perspective view of one embodiment of a portion of the cup feeder, the spacing screw and a portion of an in-feed star wheel of one embodiment of the cup reinforcing system disclosed herein.
Figure 27A:
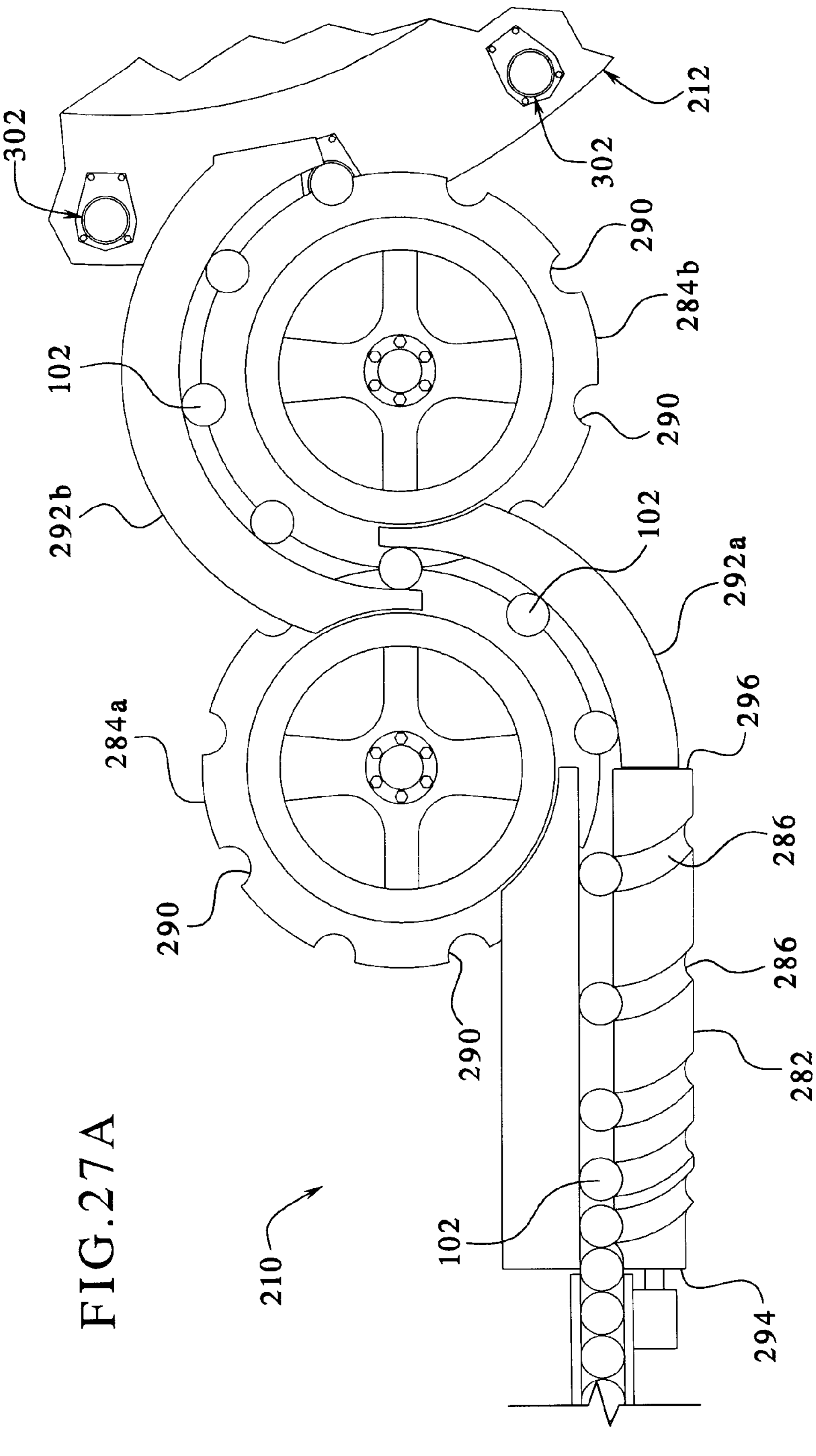
FIG. 27A is a top plan view of one embodiment of a portion of the cup feeder, the cup spacer illustrating the spacing screw and a plurality in-feed star-wheels and a portion of the cup mover.
Figure 27B:
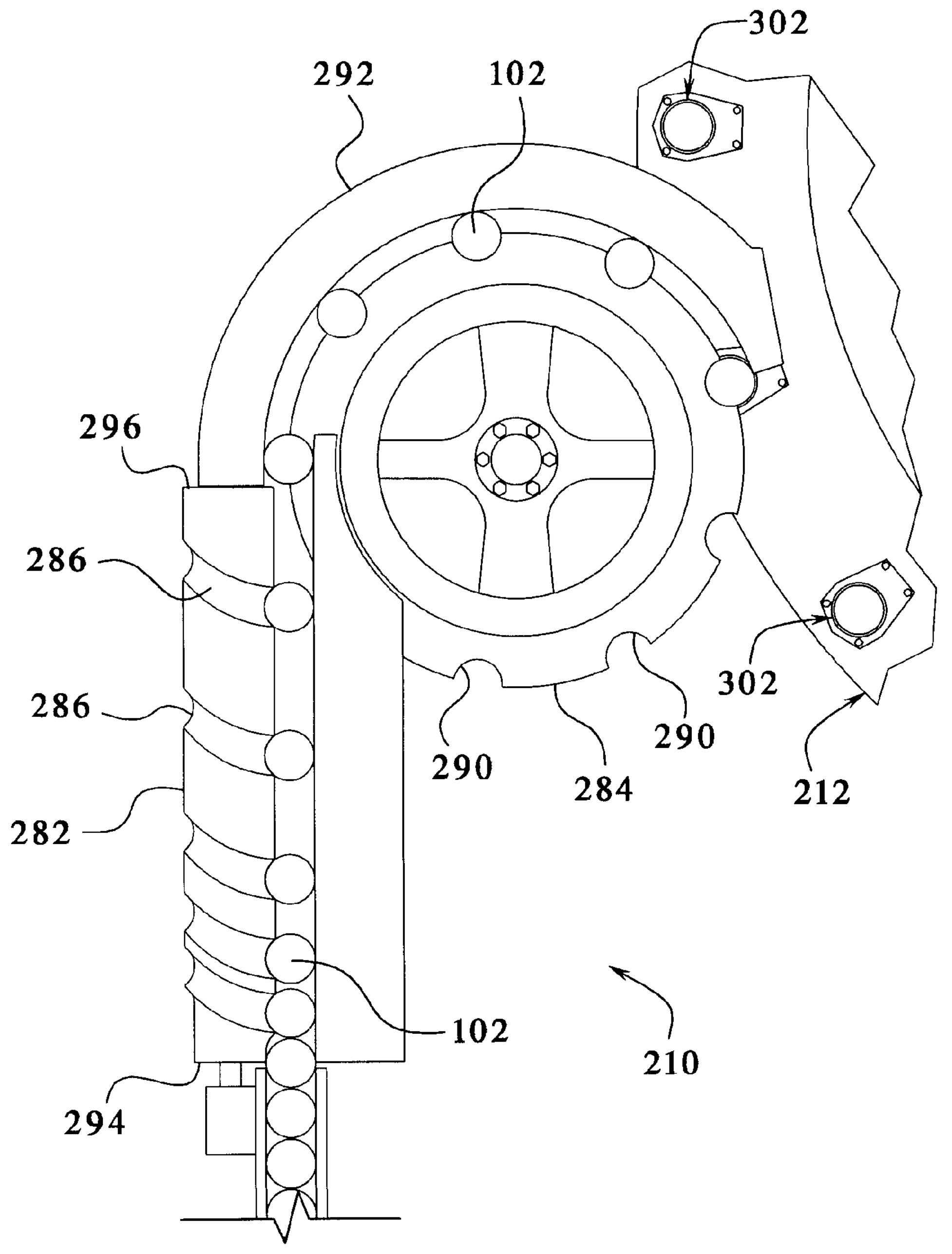
FIG. 27B is a top plan view of an alternative embodiment of a portion of the cup feeder, the cup spacer illustrating the spacing screw and one in-feed star-wheel and a portion of the cup mover.

As illustrated in FIGS. 25 to 27B, the cup spacer 210 of the cup conveyor system includes a frame 280 positioned adjacent to and at substantially the same height as the cup feeder 208. As seen in FIG. 27A, the frame of the cup feeder supports an in-feed screw or spacing screw 282 and two co-acting inlet stars or in-feed star-wheel conveyors 284*a* and 284*b* (referred to generally as 284). As seen in FIG. 27B, in one embodiment, the frame of the cup feeder supports an in-feed screw or spacing screw 282 and one inlet star or in-feed star-wheel conveyor 284*a*. In these embodiments, the cup spacer 210 is utilized to transport the each cup 102 from the cup feeder 208 to the cup mover 212.

The in-feed screw or spacing screw 282 of the cup spacer 210 is a horizontally or substantially horizontally disposed member made of any suitable smooth surfaced, non-abrasive material with self-lubrication properties, such as any suitable plastic, for example a DELRIN® plastic manufactured by E. I. DU PONT DE NEMOURS AND COMPANY. The spacer screw has internally extending threading 286 on its outer surface. The threading 286 is suitably sized and angled to correlate to the tapered side wall of the cups. As seen in FIGS. 25 and 26, the space between the threads of the spacer screw gradually and consistently increase from a first end 294 of the spacer screw adjacent to the cup feeder 208 to a second end 296 of the spacer screw adjacent to the cup mover 212. The increased spacing between the spacer screw threads provides that as each cup 102 is transported from the first end 294 of the spacer screw to the second end 296 of the spacer screw, each cup (which is engaged by a portion of the threading of the spacer screw) is suitably spaced apart. Such spacing of the cups corresponds to the spacing between each pocket 290 of the first in-feed star wheel 284*a*. In other words, the in-feed screw or spacing screw 282 sequentially separates, regaps or spaces the single-file cups transported by the conveyor belt 252 to establish a separation distance that corresponds to the spacing between the pockets 290 of the first in-feed star-wheel 284*a*. That is, the spacer screw 282 delivers, at the correct intervals, each cup into one of the pockets 290 of the first in-feed star-wheel 284*a*. It should be appreciated that due to the direction of rotation of the spacer screw 282, a cup may be slightly lifted off the conveyor belt as that cup is transported form the first end 294 of the spacer screw to the second end 296 of the spacer screw. Accordingly, a hold down member 298, such as a bar made of any suitable smooth surfaced, non-abrasive material with self-lubrication properties, such as any suitable plastic, for example a DELRIN® plastic manufactured by E. I. DU PONT DE NEMOURS AND COMPANY, is supported by the frame 280 of the cup spacer 210. In this embodiment, if the spacer screw lifts the cup off the conveyor belt, the hold down member 298 engages the bottom of the upside down cup to keep the cup in contact with the threads of the spacer screw. In one embodiment, the spacer screw is movably connected or coupled to at least one actuator 288, such as a motor or other suitable movement generating device controlled by the cup reinforcing system processor which causes the spacer screw to rotate in any suitable direction at any suitable speed in a conventional manner.

Each inlet star 284 of the cup spacer 210 is a horizontally or substantially horizontally disposed circular or substantially circular member made of any suitable smooth surfaced, non-abrasive material with self-lubrication properties, such as any suitable plastic, for example a DELRIN® plastic manufactured by E. I. DU PONT DE NEMOURS AND COMPANY. Each inlet star 284 defines a plurality of pockets 290 suitable spaced around the circumference of that inlet star. The number of pockets is determined based on the size of the cups and the size of the reinforcing members. Each pocket 290 is configured to hold or otherwise engage a cup 102 as the cup is transferred from the cup feeder 208 to the cup mover or turntable 212. Each inlet star is movably connected or coupled to at least one actuator (not shown), such as a motor or other suitable movement generating device controlled by the cup reinforcing system processor which causes that inlet star to move in any suitable direction at any suitable speed in a conventional manner.

Figure 28:
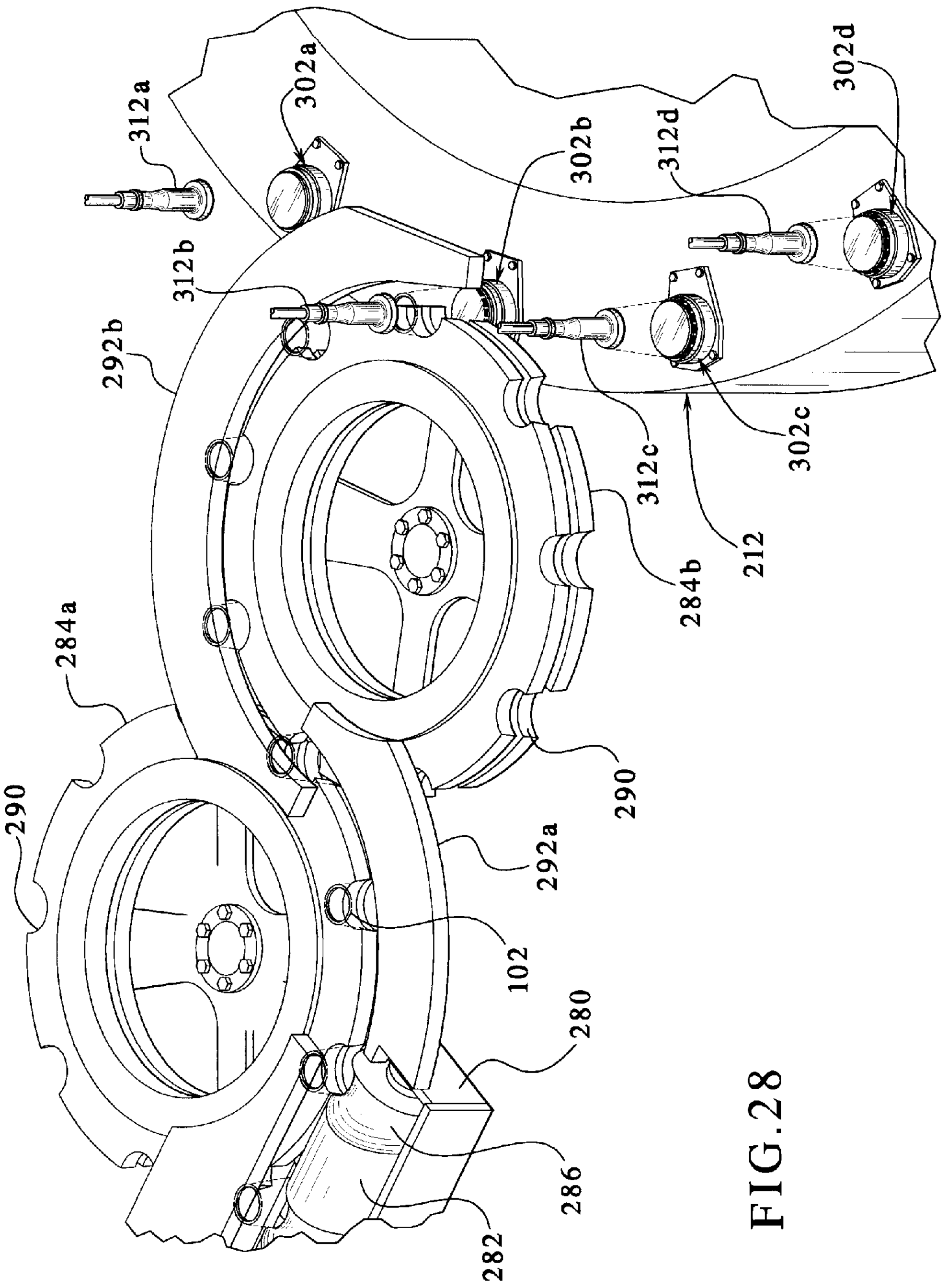
FIG. 28 is a front perspective view of the portion of the cup feeder, the cup spacer illustrating the spacing screw and the plurality in-feed star-wheels and the portion of the cup mover of FIG. 27A.

As illustrated in FIGS. 27A and 28, the frame 280 of the cup spacer supports two inlet star guide members or guide rails 292*a* and 292*b* (referred to generally as 284). Guide rail 292*a* is located adjacent to inlet star 284*a* and guide rail 292*b* is located adjacent to inlet star 284*b*. Each guide rail 292 prevents the cups transported by the inlet stars 284 from becoming displaced, such as by tipping over. The cup guide members are suitable sized and suitable angled offset from a vertical plane to correlate to the cups.

In operation, as best seen in FIGS. 27A and 28, each cup 102 is transported from at or near the second end 296 of the spacer screw 282 to a first pocket 290 of the first inlet star 284*a*. The first inlet star 284*a* transports the cup to a second pocket of the second inlet star 284*b*. The second inlet star 284*b* transports the cup, along a horizontally-disposed cup support member 297, to a cup holding station 302 of the cup mover 212 as described below. That is, the pockets of the second inlet star 284*b* and guide rail 292*b* co-act to hold a cup in the proper position and place the cup onto one of the cup holding stations 302 of the cup mover. It should be appreciated that any suitable means or manner for transporting one or more cups from the cup dispenser to the cup mover or turntable may be employed in accordance with the cup reinforcing system disclosed herein.

Figure 29:
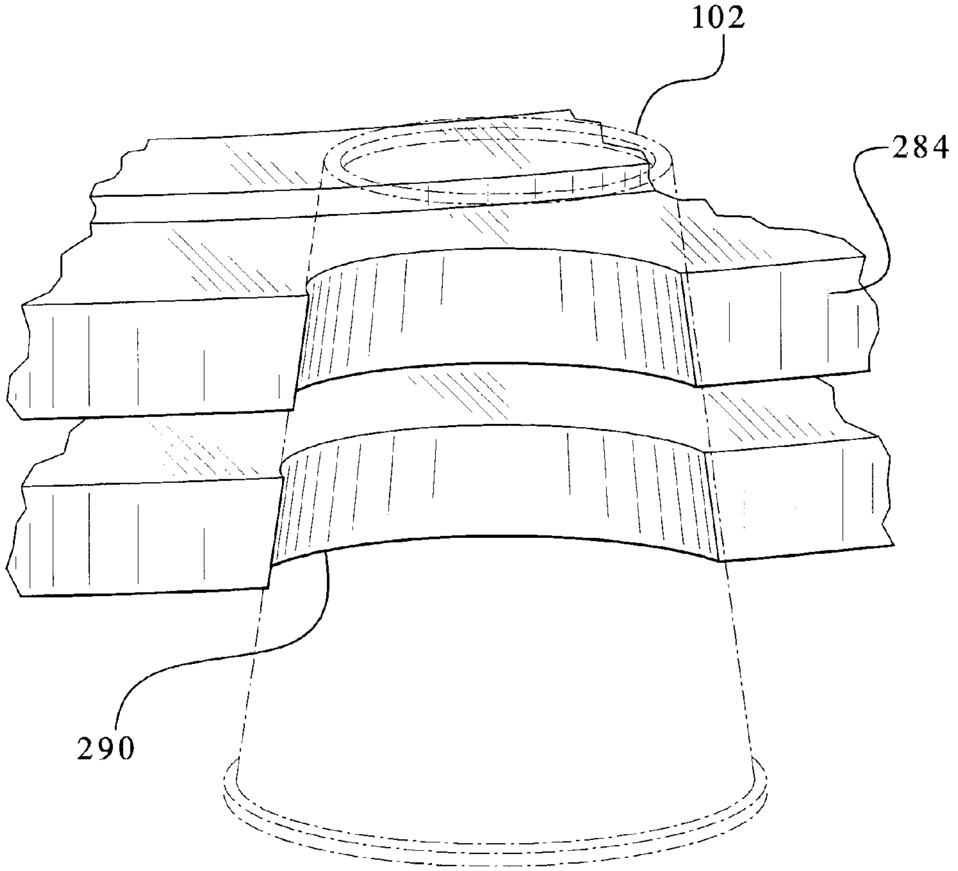
FIG. 29 is a cross-sectional side view of one of the cup pockets of one of the star-wheels of the cup reinforcing system disclosed herein.
Figure 30:
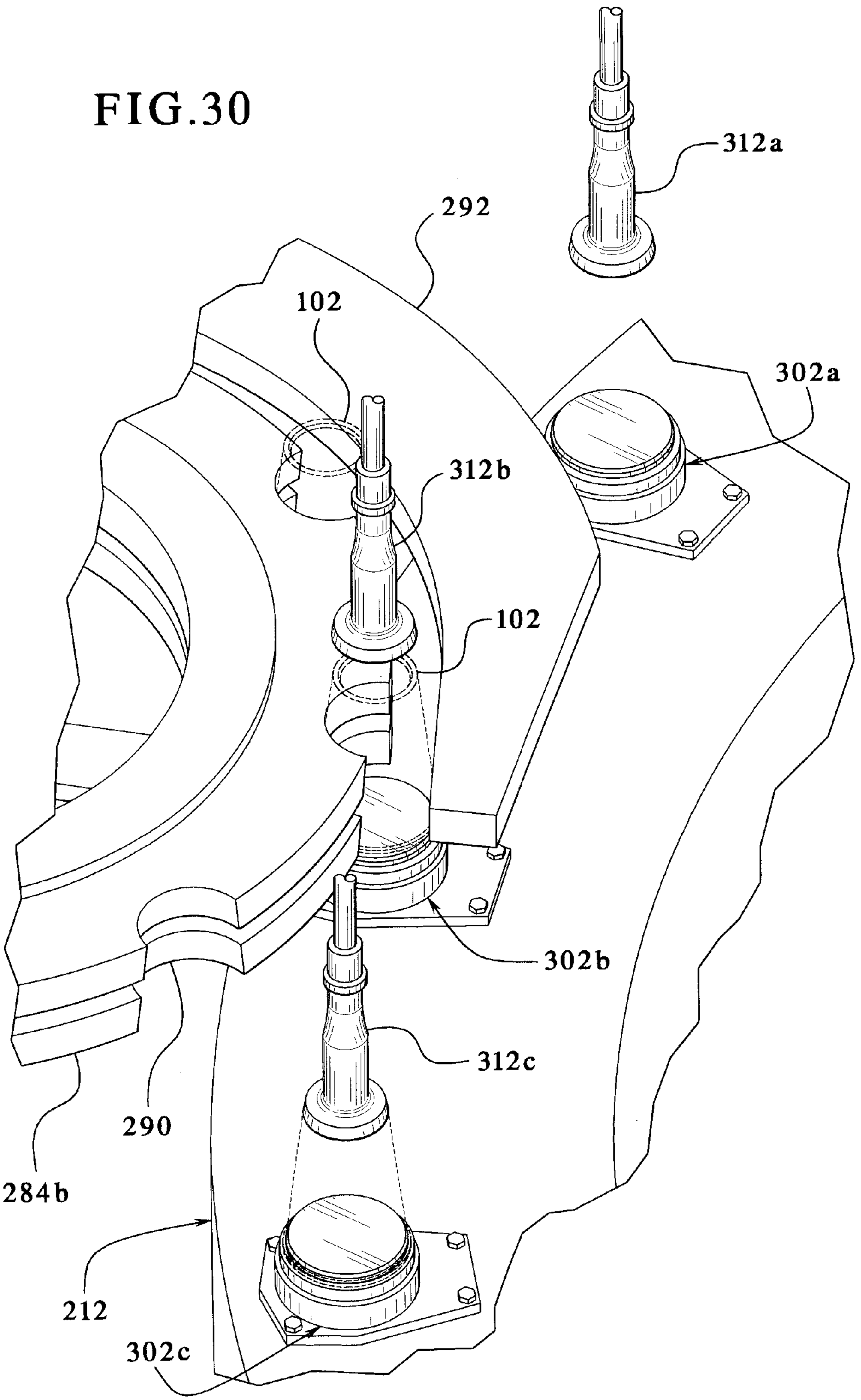
FIG. 30 is a front perspective view of one of the in-feed star wheels and the cup mover of one embodiment of the cup reinforcing system disclosed herein illustrating a plurality of cup holders associated with a plurality of centering bells.

As seen in FIG. 29, the sidewall of each pocket 290 is angled offset from a vertical plane at a suitable angle to match the angle of the tapered side walls of the cup 102. That is, because even relatively small amounts of forces may cause indentions to the outer surfaces of the cup 102, each star-wheel pocket 290 is configured to prevent damaging the relatively fragile surface of the base cups. In other words, unlike the star-wheel pockets of known bottle labeling machines which are designed to transport relatively durable glass bottles, the star-wheel pockets 290 of the cup spacer 210 of the cup reinforcing system disclosed herein is designed to handle the relatively fragile plastic foam cups.

As seen in FIGS. 27A to 31B, the cup mover or turntable 212 of the cup conveyor system is rotatably supported by a suitable frame 300 positioned adjacent to the cup spacer 210 and at a height slightly below the cup spacer 210. The turntable is a horizontally or substantially horizontally disposed cylindrical or substantially cylindrical member made of any suitable smooth surfaced, non-abrasive material with self-lubrication properties, such as any suitable plastic, for example a DELRIN® plastic manufactured by E. I. DU PONT DE NEMOURS AND COMPANY. The turntable 212 is movably connected or coupled to at least one actuator, such as a motor or other suitable movement generating device which causes the turntable to move in any suitable direction at any suitable speed in a conventional manner. In operation, as described above, the cup mover 212 transports each base cup toward the attachment position adjacent to a reinforcing member dispenser 204.

The cup mover 212 includes a plurality of individual rotary cup plates or cup holding stations 302*a*, 302*b*, 302*c* and 302*d* (referred to generally as 302) positioned uniformly around the periphery of the cup spacer. Each cup plate or holding station 302 is configured to receive a cup 102 from a pocket 290 of the second inlet star 284*b*. As described above, each cup holding station includes a rotational base 303 operable to rotate a full 360 degrees in clockwise and counterclockwise directions. In another embodiment, each cup holding station is spring loaded and operable to rise to engage the cup transported from the cup spacer and lower to disengage the cup from the cup mover after a reinforcing member has been applied to the cup.

Each cup holding station includes a plurality of suitably shaped and sized walls which frictionally engage the walls of the cup to fix the cup in the suitable position on the cup holding station. In operation, as each cup 102 is placed on a cup plate or holding station, the cup is held in place by a spring biased centering bell 312. Each centering bell is operable to rotate a full 360 degrees in clockwise and counterclockwise directions. It should be appreciated that any suitable manner of holding the cup which provides that the tapered side wall of the cup is free for application of the reinforcing member may be implemented in accordance with the cup reinforcing system disclosed herein.

Figure 31A:
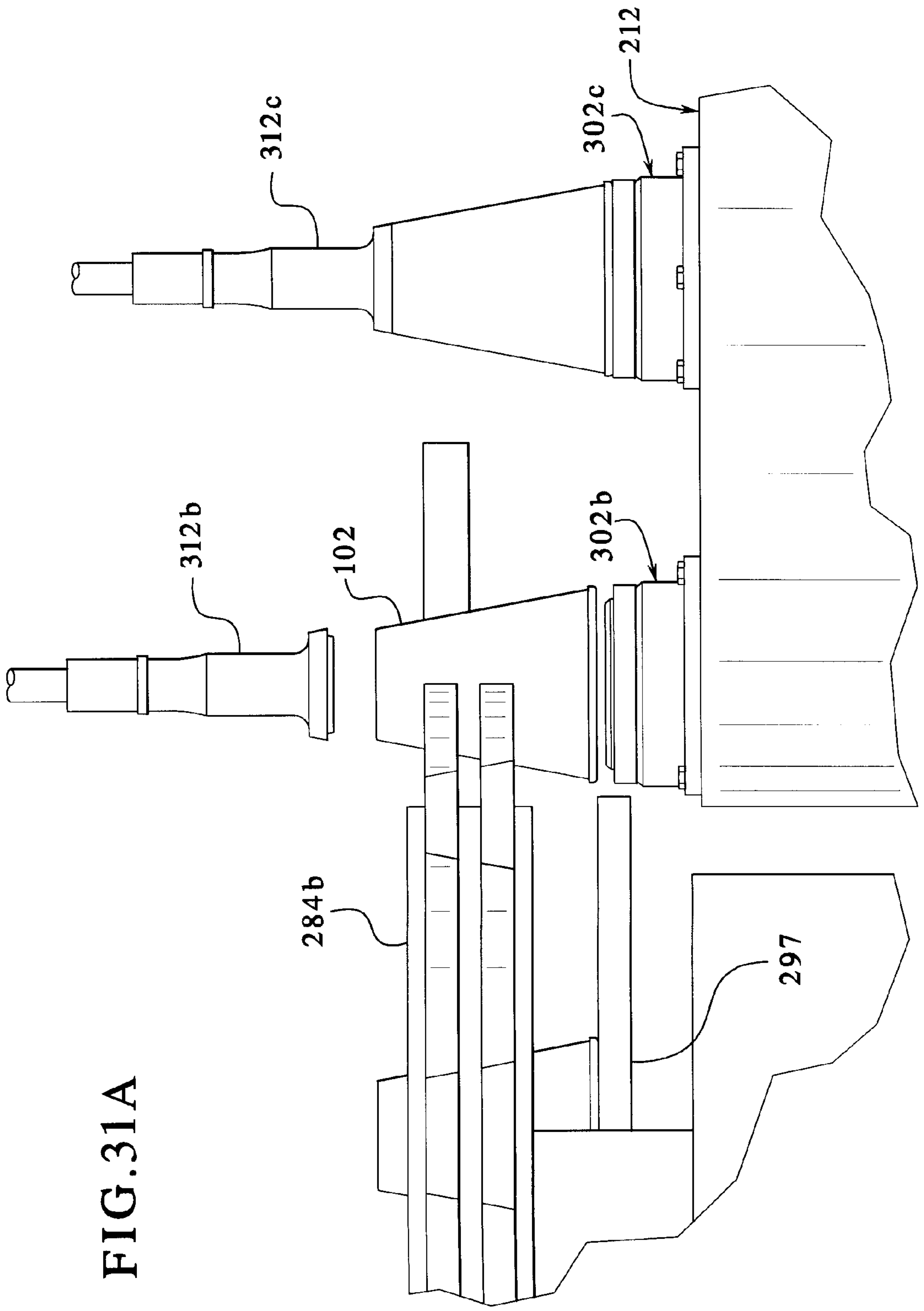
FIG. 31A is a side view of the in-feed star wheel and the cup mover of FIG. 30, illustrating the cup mover positioned adjacent to and slightly below the in-feed star wheel.
Figure 31B:
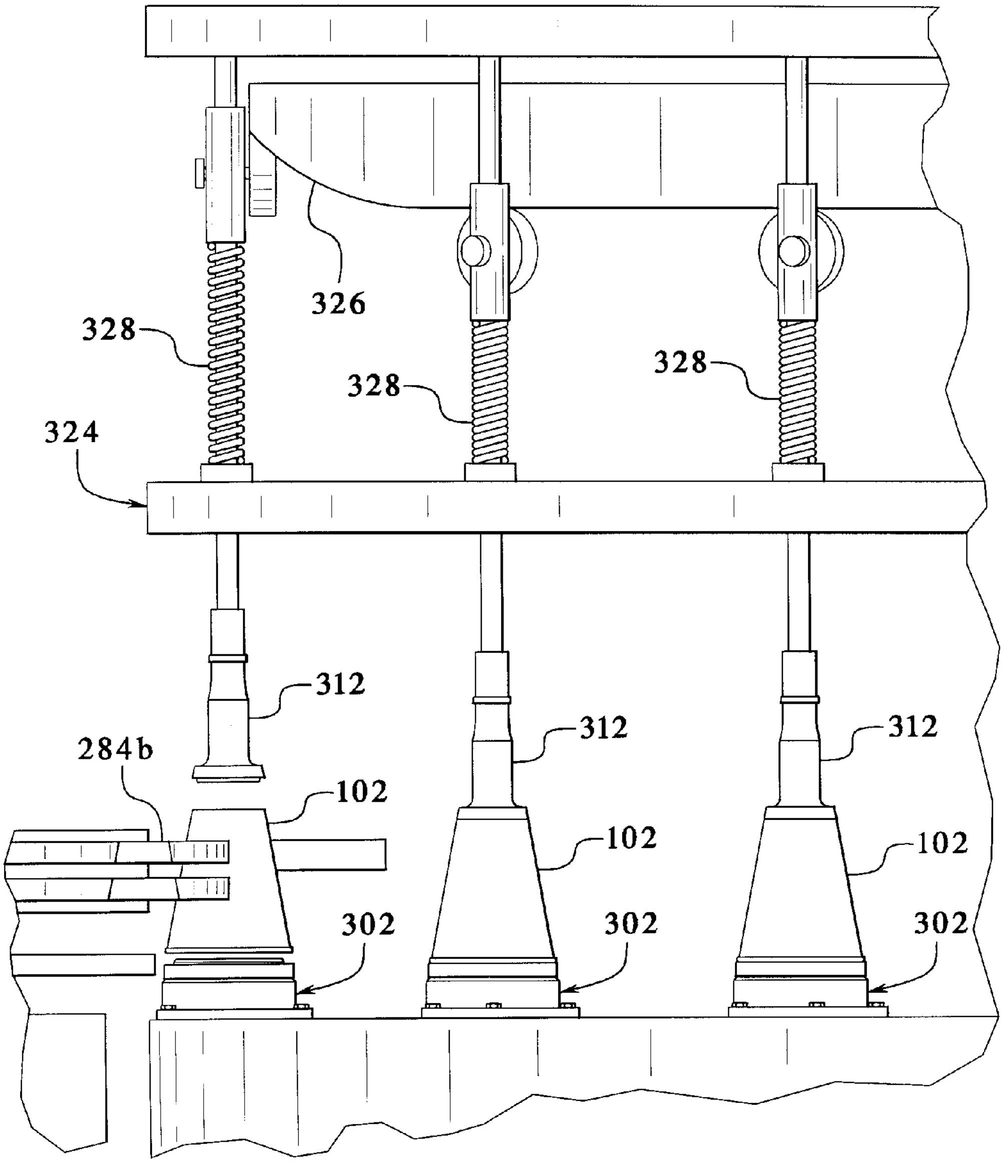
FIG. 31B is a side view of the in-feed star wheel, the cup mover of FIG. 30 and a superstructure which supports the plurality of centering bells.

As best seen in FIG. 31B, each centering bell 312 is supported from a rotatable superstructure 324. The rotatable superstructure includes a cam 326 and a plurality of spring loaded members 328 suitably connected to the plurality of centering bells 312. The spring loaded members are each movably connected or coupled to at least one actuator, such as a motor or other suitable movement generating device which causes each of the spring loaded members to move in any suitable direction at any suitable speed in a conventional manner. In operation, as the plurality of spring loaded members 328 rotate about the cam 326, the shape of the cam causes each spring located member to coil or retract which causes each centering bell to extend to engage a plurality of the walls of the cup or retract to disengage the plurality of walls of the cup. The spring mounted pressure of the centering bells engages the cups with at least enough force to hold the cup as the cup is rotated and with less force than would damage the relatively fragile foam cup. It should be appreciated that any suitable mechanism or mechanisms which cause the centering bells to engage and disengage a plurality of walls of the cup may be implemented in accordance with the cup reinforcing system disclosed herein.

Figure 32:
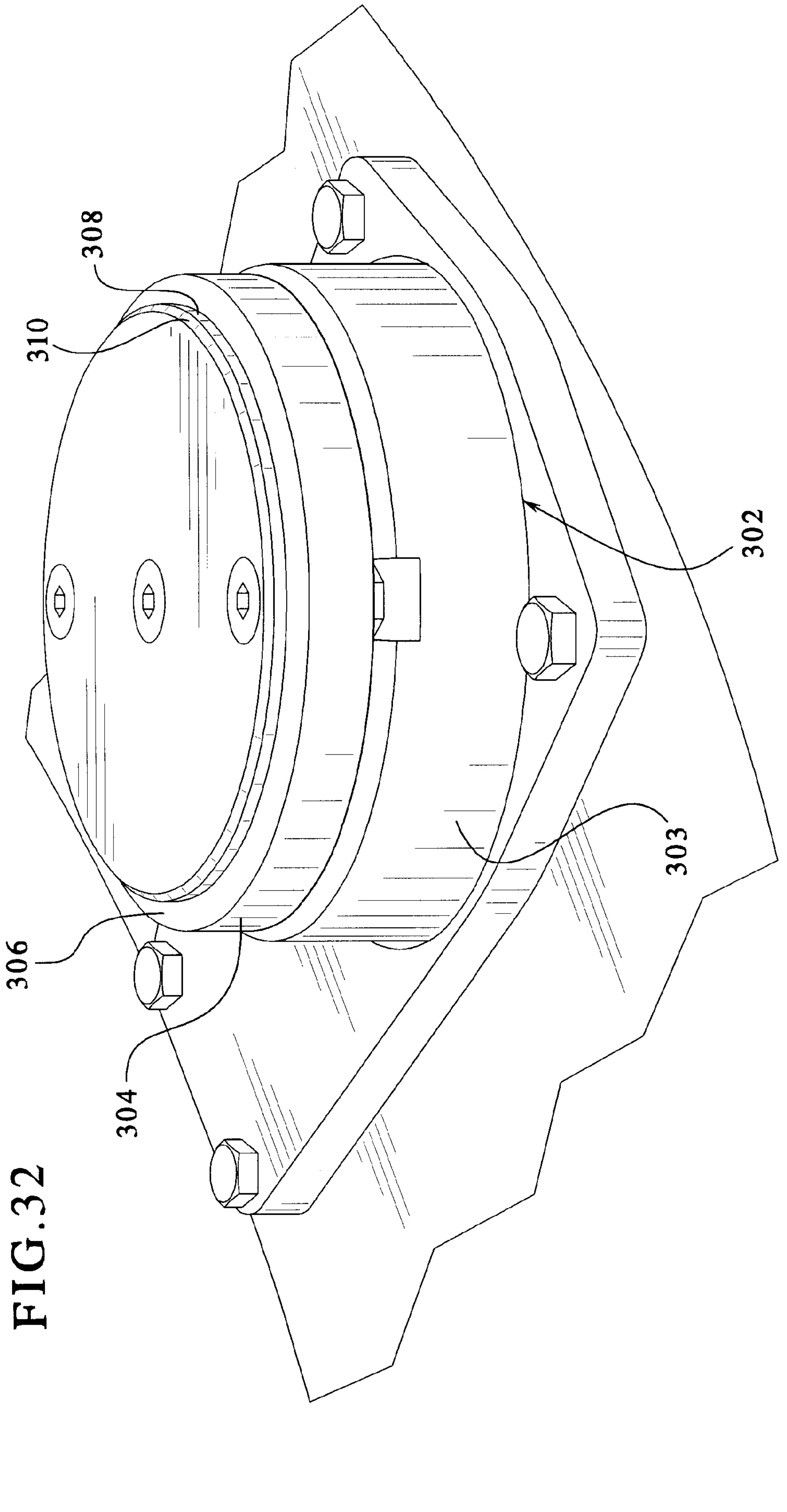
FIG. 32 is a front perspective view of the bottom member of one of the cup holding stations of the cup mover of one embodiment of the cup reinforcing system.
Figure 33:
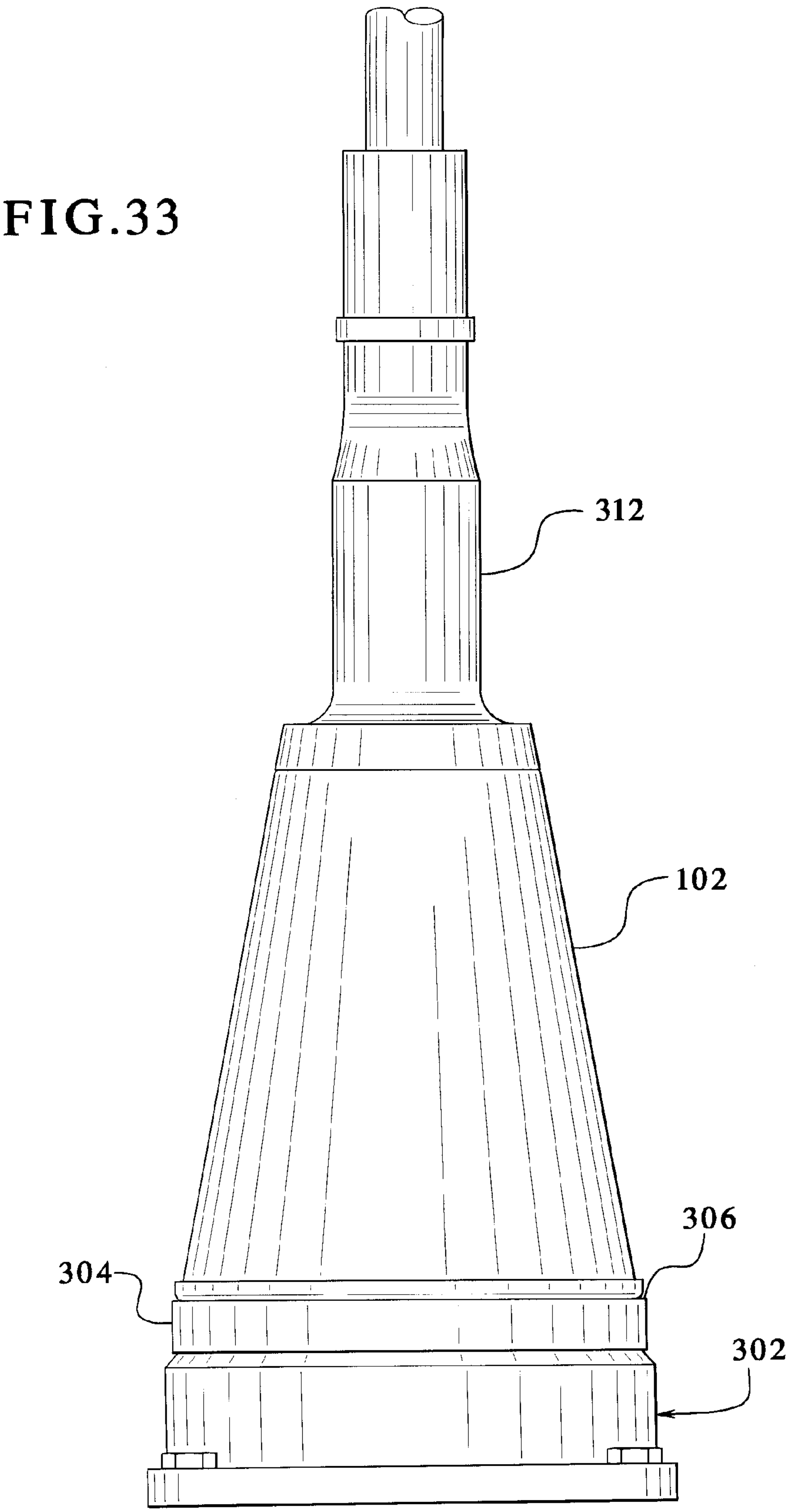
FIG. 33 is a side view of one embodiment of a centering bell of the cup holding station engaging a cup which is positioned on the bottom member of the cup holding station of the cup mover.

As illustrated in FIGS. 32, 33, 34 and 35, the outer wall of each cup holding station 302 is suitably beveled and tapered to match and engage the taper of the inner side wall of the top portion of the base cup 102. As best illustrated in FIG. 32, each cup holding station 302 includes a vertically disposed sidewall or cup support 304, a horizontally disposed first wall 306 connected to the sidewall, a vertically disposed second wall 308 connected to the first wall and a beveled third wall 310 connected to the second wall. The first wall 306 of the cup holding station engages the top 330 of the formed lip of the upside down cup and the second wall 308 of the cup holding station engages a top portion 332 of the inner surface of the upside down cup. It should be appreciated that any suitable engagement surface which creates a male-female connection between the cup holding station and the cup may be implemented with the cup reinforcing system disclosed herein.

In one embodiment, to transport the base cup from the cup spacer to the cup holding stations of the turntable, to account for the height of the frictional engagement members of the holding stations, the turntable is positioned slightly below the cup spacer. Such positioning of the cup mover below the cup spacer allows each transported cup to be placed directly on top of one of the cup holding stations 302 of the cup mover 212. That is, to account for the height of the vertically disposed second wall 308 of the holding stations 302 when transporting each cup 102 from the cup spacer 210 to the cup holding stations 302 of the turntable 212, the turntable is positioned slightly below the cup spacer.

Figure 34:
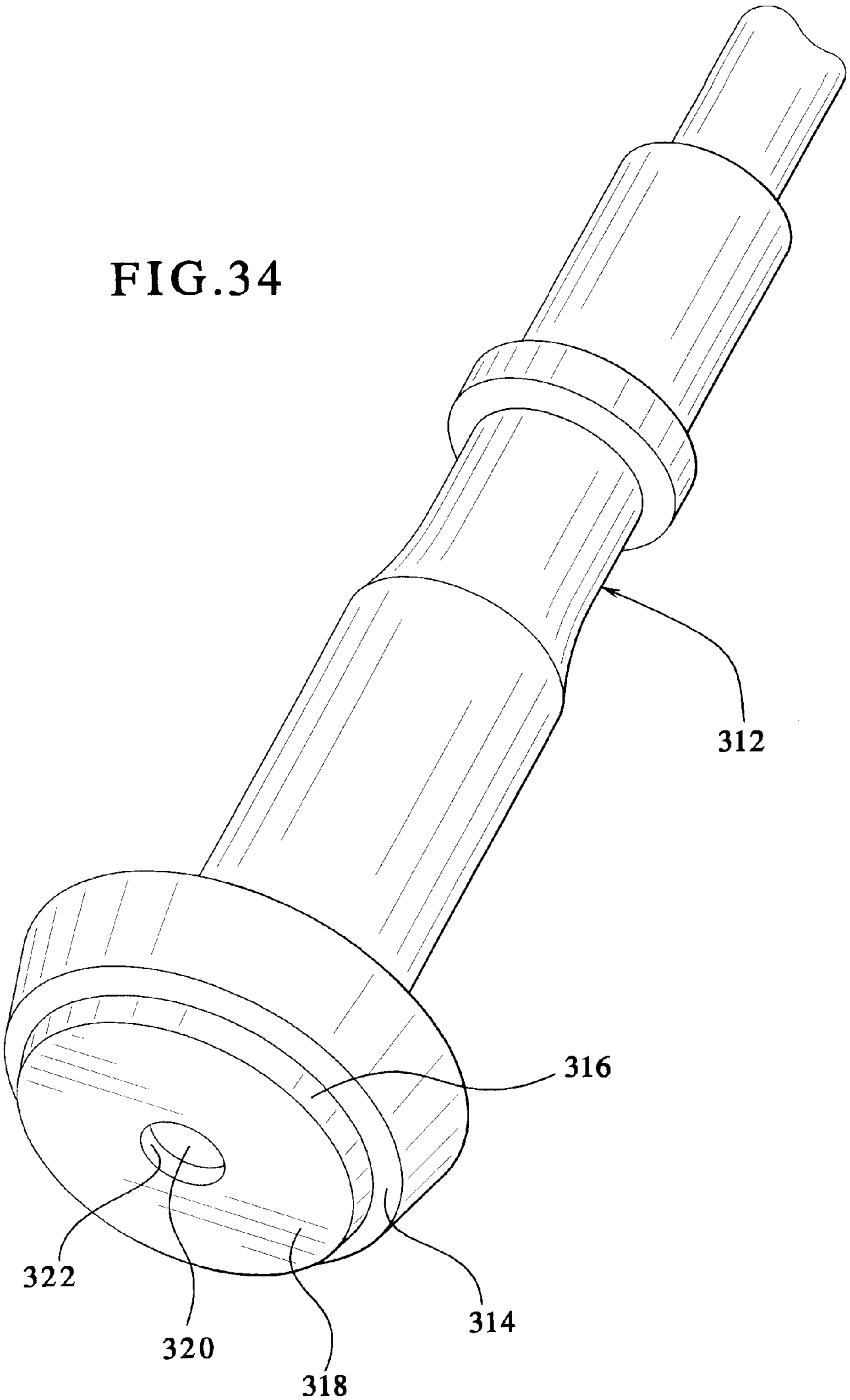
FIG. 34 is a front perspective view of one embodiment of a centering bell of a cup holding station of the cup mover.
Figure 35:
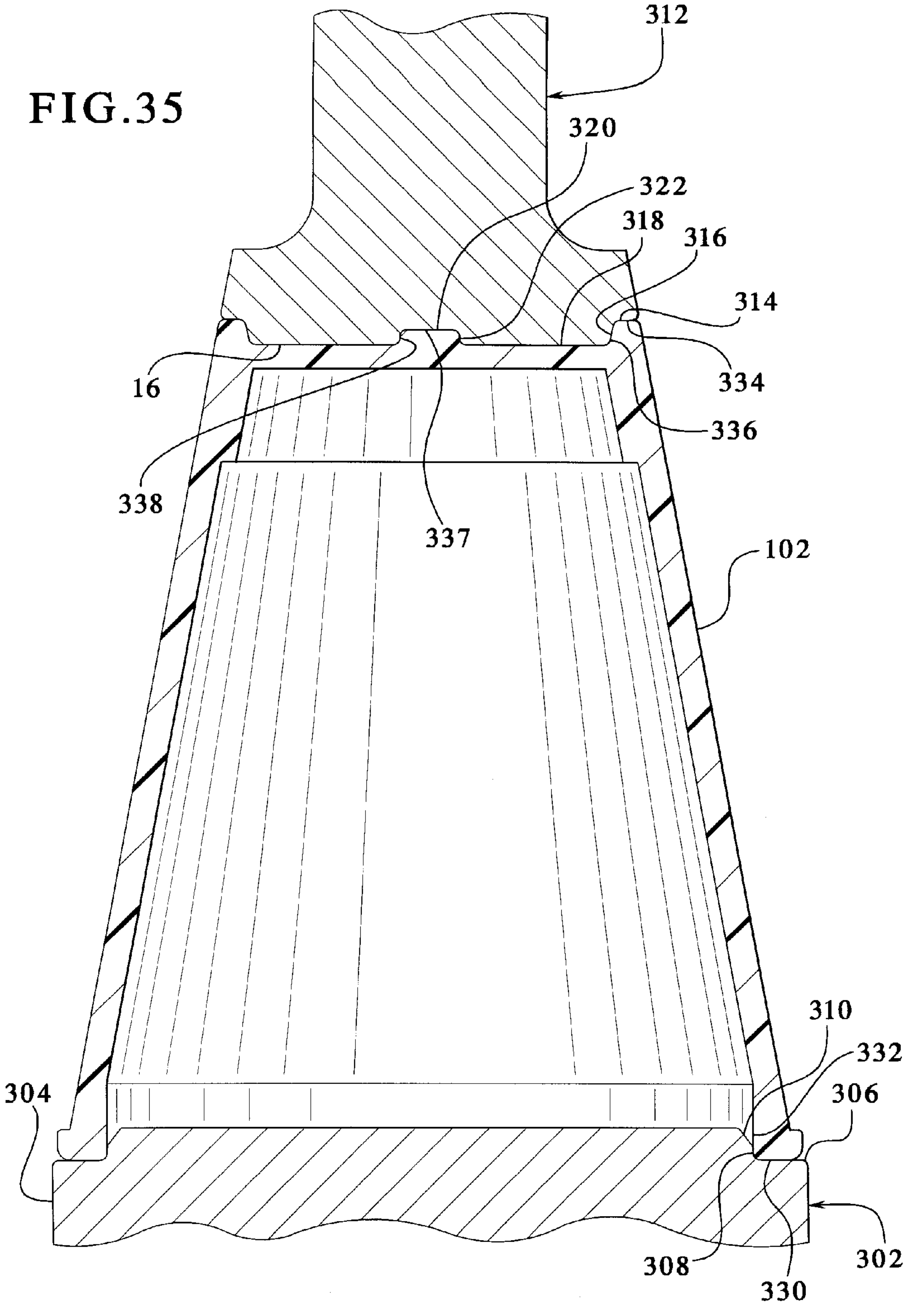
FIG. 35 is a cross-sectional side view of one embodiment of a centering bell of the cup holding station engaging a cup which is positioned on the bottom member of the cup holding station of the cup mover.

Moreover, the walls of the centering bell are suitably configured to match and engage a plurality of the walls of the cup. As best illustrated in FIGS. 34 and 35, a first wall of the centering bell 314 engages the bottom rim 334 of the cup and a beveled or tapered second wall of the centering bell 316 engages the beveled or tapered inner side wall 336 of the cup. In this embodiment, a third wall of the centering bell 318 engages the outer bottom wall 16 of the cup, a fourth wall of the centering bell 320 engages the top surface of a centered raised portion 337 of the outer bottom wall of the cup and a fifth wall of the centering bell 322 engages the side wall 338 of the centered raised portion of the outer bottom wall of the cup. It should be appreciated that any suitable engagement surface which creates a male-female connection between the centering bell and the cup may be implemented with the cup reinforcing system disclosed herein.

It should be appreciated that when compared to a turntable of known bottle labeling devices, the turntable of the cup reinforcing system includes a reduced number of holding stations to accommodate the length of the reinforcing member. That is, since the reinforcing members applied to the base cups are of greater length than the labels applied to the bottles of a bottle labeling machine and such greater length may cause interferences when the reinforcing member is partially attached to the cups as described below, a greater distance must be between each holding station/centering bell of the turntable. Accordingly, providing a greater distance between each holding station/centering bell of the turntable without increasing the size of the turntable requires a reduction in the number of holding stations/centering bells of the turntable.

As described above and best illustrated in FIGS. 42A to 43F, the frame of the cup mover 212 supports a plurality of reinforcing member application pads 390*a* and 390*b* (referred to generally as 390). Each reinforcing member application pad 390 includes a base 392*a* and 392*b* (referred to generally as 392) and a reinforcing member engaging surface 394*a* and 394*b* (referred to generally as 394), wherein the reinforcing member engaging surface includes any suitable material with anti-adhesion properties, such as a polytetrafluoroethylene or Teflon® coated tape, which resists adherence by the adhesive coated on the reinforcing member. Each reinforcing member application pad 390 is positioned relative to the reinforcing member point of attachment to provide a suitable surface which is engaged by the tapered side wall of the cup to secure the reinforcing member (which is positioned between the tapered side wall of the cup 102 and the engaging surface 394 of the reinforcing member application pad 390) to the tapered side wall of the cup. Each reinforcing member application pad 390 is suitably shaped and sized to accommodate the size and shape of the cups which are reinforced as well as to accommodate the size of the cup mover 212 which is moving the cups. For example, each reinforcing member application pad 390 is suitably beveled and tapered to match and engage the tapered side wall of the cup. It should be appreciated that the height or angle of one or more reinforcing member application pads may be suitable adjusted to accommodate the shape and size of the cups.

As described above, the cup mover 212 is configured to transport each base cup into a reinforcing member point of attachment or engagement or attachment position. At this point of attachment, a reinforcing member, dispensed from the reinforcing member dispenser 204 described below, is suitable partially attached to the tapered side wall of the cup 102.

Figure 37:
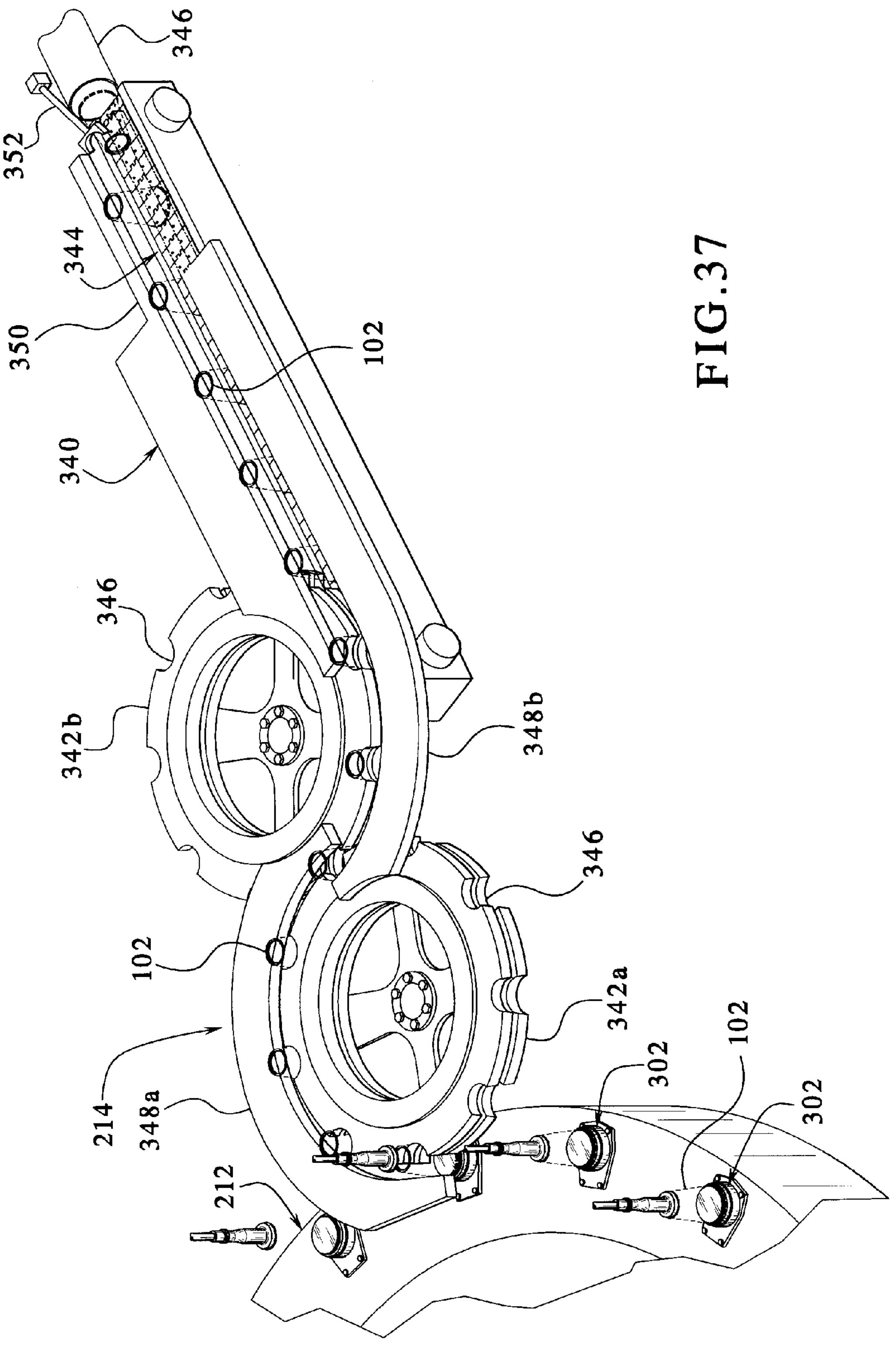
FIG. 37 is a front perspective view of one embodiment of the cup remover of the cup reinforcing system disclosed herein.

After a reinforcing member is attached to a cup 102, the cup mover 212 transports each reinforced cup to a cup remover 214. As illustrated in FIG. 37, the cup remover 214 of the cup conveyor system includes a frame 340 positioned adjacent to and at substantially the same height as the cup mover 212. The frame 280 of the cup feeder supports two co-acting inlet stars or in-feed star-wheel conveyors 342*a* and 342*b* (referred to generally as 342), an out-feed conveyor device 344 and a reinforced cup exhaust device 346. In one embodiment, the cup reinforcing system includes one outlet star or out-feed star-wheel which transports the cups from the cup mover to the out-feed reinforced cup conveyor device. In one embodiment (not shown), the cup reinforcing system utilized one or more brushes to engage the sidewall of each cup to enhance the movement of each cup from the turntable of the cup mover to the out-feed reinforced cup conveyor device. Each outlet star 342 is movably connected or coupled to at least one actuator, such as motor or other suitable movement generating device controlled by the cup reinforcing system processor which causes the outlet star to rotate or move in any suitable direction at any suitable speed in a conventional manner. Similar to the inlet stars described above, each outlet star 342 includes a plurality of pockets 346 on its circumference. Each pocket 346 is configured to hold a cup 102 as the cup is transferred from the cup mover 212. The sidewall of each pocket 246 is angled offset from a vertical plane at a suitable angle to match the angle of the tapered side walls of the base cups.

The frame 340 of the cup remover 212 supports two outlet star guide members or guide rails 348*a* and 348*b* (referred to generally as 348). Guide member 348*a* is located adjacent to outlet star 342*a* and guide member 348*b* is located adjacent to outlet star 342*b*. Each guide member 348 prevents the cups transported by their respective outlet star 342 from becoming displaced, such as by tipping over. The cup guide members 348 are sized and angled offset from a vertical plane to correlate to the specifications of the reinforced cups. In another embodiment, the cup reinforcing system includes a plurality of inlet stars or in-feed star-wheels which co-act to transport the cup from the cup mover 212 to the out-feed cup conveyor device 344.

The out-feed cup conveyor device 344 is suitably movably connected or coupled to at least one actuator, such as a motor or other suitable movement generating device which causes the conveyor belts to move at any suitable speed in a conventional manner. The cup remover includes at least two opposing spaced-apart elongated guide rails or guide tracks 350 supported by the frame 340 of the cup remover. The guide rails 350 are angled offset from a vertical plane at a suitable angle to match the angle of the tapered side walls of the cups transported by the out-feed cup conveyor device 344.

As seen in FIG. 37, each cup 102 is transported, via the out-feed reinforced cup conveyor device 344, to a cup positioner 352, such as a cup tipper or other suitable member, which positions or tips the reinforced cup onto its side (downside leading). The guide rails 350 insure that the tipped cup is positioned on its side. The tipped cup is then vacuum pulled via the cup exhaust system 346 (not shown) to a stack of nested reinforced cups. It should be appreciated that any suitable means or manner for transporting one or more cups from the cup dispenser to the cup mover or turntable may be employed in accordance with the cup reinforcing system disclosed herein.

In one embodiment, as illustrated in FIGS. 38A, 38B, 39 and 40, each reinforcing member dispenser 204 of the cup reinforcing system includes a frame 360 which supports an adjustable base or support 386. As described above, the reinforcing member dispenser 204 is operable to feed each reinforcing member 42 toward a cup 102 at a suitable angle offset form a vertical plane which corresponds with the angle (also offset from a vertical plane) of the tapered side wall of the cup. Accordingly, the adjustable base 386 of the reinforcing member dispenser 204 is suitably angled offset from a vertical plane. The angle which the adjustable base 386 of the reinforcing member dispenser 204 is at may be adjusted (via a suitable angle adjustment mechanism 382) to accommodate for different base cups with different angled tapered side walls.

In addition to adjusting the angle of the reinforcing member dispenser offset from a vertical plane, the height of the adjustable base 386 of the reinforcing member dispenser 204 may be adjusted (via a suitable height adjustment mechanism 384) to accommodate for different sized cups and variances in different reinforcing members positioning on the liner. Moreover, the angle which the adjustable base 386 of the reinforcing member dispenser 204 is at may be adjusted offset from a horizontal plane if necessary. Accordingly, it should be appreciated that the reinforcing member dispenser may be individually adjusted in three separate planes to facilitate a proper attachment of a reinforcing member to the tapered sidewall of a cup. In alternative embodiments, the reinforcing member dispenser may be adjusted to any suitable angle in any suitable plane or number of planes to facilitate a proper attachment of a reinforcing member to the tapered sidewall of a cup.

The reinforcing member dispenser includes two reinforcing member supply holders 362*a* and 362*b* (referred to generally as 362) supported by the adjustable base 386. Each reinforcing member supply holder 362 is configured to hold a supply 364*a* and 364*b* (referred to generally as 364) of reinforcing members, wherein each supply of reinforcing members includes a plurality of reinforcing members sequentially releasably attached to an elongated release liner (as best seen in FIGS. 7 and 7A) wound about a central cylindrical tube 388*a* and 388*b* (referred to generally as 388) into a roll. Each reinforcing member dispenser includes at least one and preferably a plurality of drive rollers, such as drive rollers 366*a* and 366*b* (referred to generally as 366) supported by the adjustable base 386 and configured to drive or pull the release liner 56 (which the reinforcing members are releasably attached to). In operation, drive roller 366*a* pulls or drives the release liner 56 from the supply roll toward drive roller 366*a* and into a designated area 374 of a release liner slack accumulator 372 (as described below). Drive roller 366*b* then pulls or drives the release liner from the designated area 374 of the release liner slack accumulator 372 and towards the cup-reinforcing member point of attachment or engagement. Each drive roller 366 is suitably movably connected or coupled to at least one actuator (not shown), such as a motor or other suitable movement generating device which causes the drive rollers to move at any suitable speed. In one embodiment, one, more or each of the drive rollers 366 includes a knurled surface to better engage the release liner as it is fed through the reinforcing member dispenser. In another embodiment, one, more or each of the drive rollers 366 includes a rubber surface to better engage the release liner as it is fed through the reinforcing member dispenser.

Each reinforcing member dispenser includes a powered take-up roller 367, supported by the adjustable base 386 and configured to pull or drive the used release liner 56 to a liner accumulation holder 376. The powered take-up roller 367 is suitably movably connected or coupled to at least one actuator (not shown), such as a motor or other suitable movement generating device which causes the take-up roller to move at any suitable speed.

Each reinforcing member dispenser also includes a plurality of guides and tensioners, such as guide rollers 368, supported by the adjustable base 386 and configured to guide the release liner (which the reinforcing members are releasably attached to) toward the point of engagement with the cups as well as maintain suitable amounts of tension on the release liner.

The reinforcing member dispenser 204 includes a vertically disposed release liner splicer 370 supported by the adjustable base 386 and configured to allow a plurality of supplies of reinforcing members to be spliced together. The release liner splicer 370 includes a first area (not shown) configured for holding the trailing end of a first release liner supply and a second area (not shown) for holding the leading end of a second release liner supply. The release liner splicer provides a mechanism for a user of the cup reinforcing system to splice the trailing end of the first release liner supply to the leading end of the second release liner supply to insure that the reinforcing member dispenser is provided a continuous supply of release liner.

For example, in one embodiment, when the last reinforcing member of the first release liner supply is detected, a user centers the first release liner supply over a cutting groove and utilizes one or more suitable mechanisms to hold the first release liner supply in place. The user then slides the second release liner supply over the first release liner supply, places the leading edge of the first reinforcing member of the second release liner supply exactly over the last reinforcing member of the first release liner supply and utilizes one or more suitable mechanisms to hold the second release liner supply in place. The user utilizes a suitable cutting head and cutting guide to cut the first and second release liner supplies, removes the scrap pieces from the first and second release liner supplies and tapes the first and second release liner supplies together.

Figure 38A:
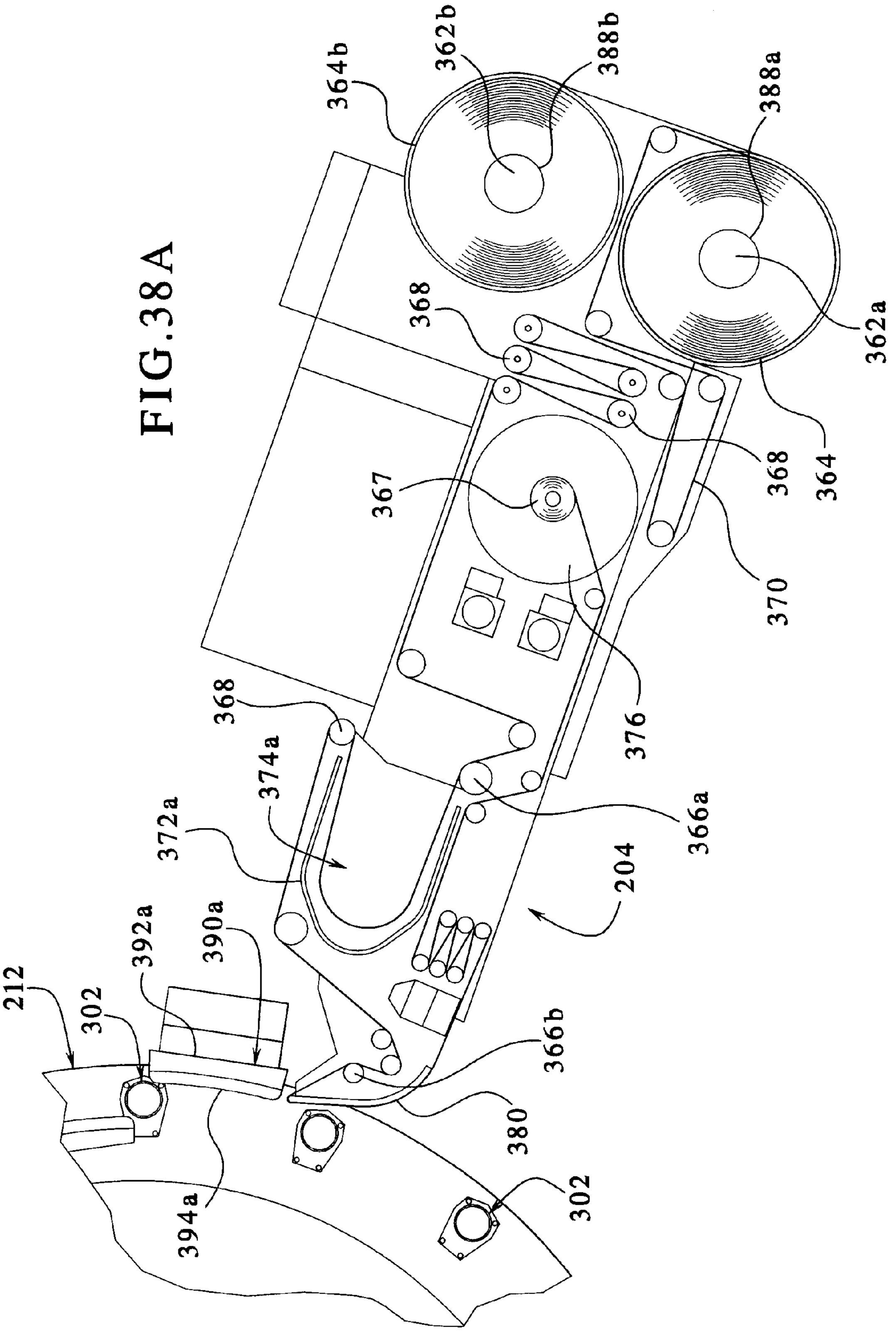
FIG. 38A is a top plan view of one embodiment of the reinforcing member dispenser of the cup reinforcing system disclosed herein.
Figure 38B:
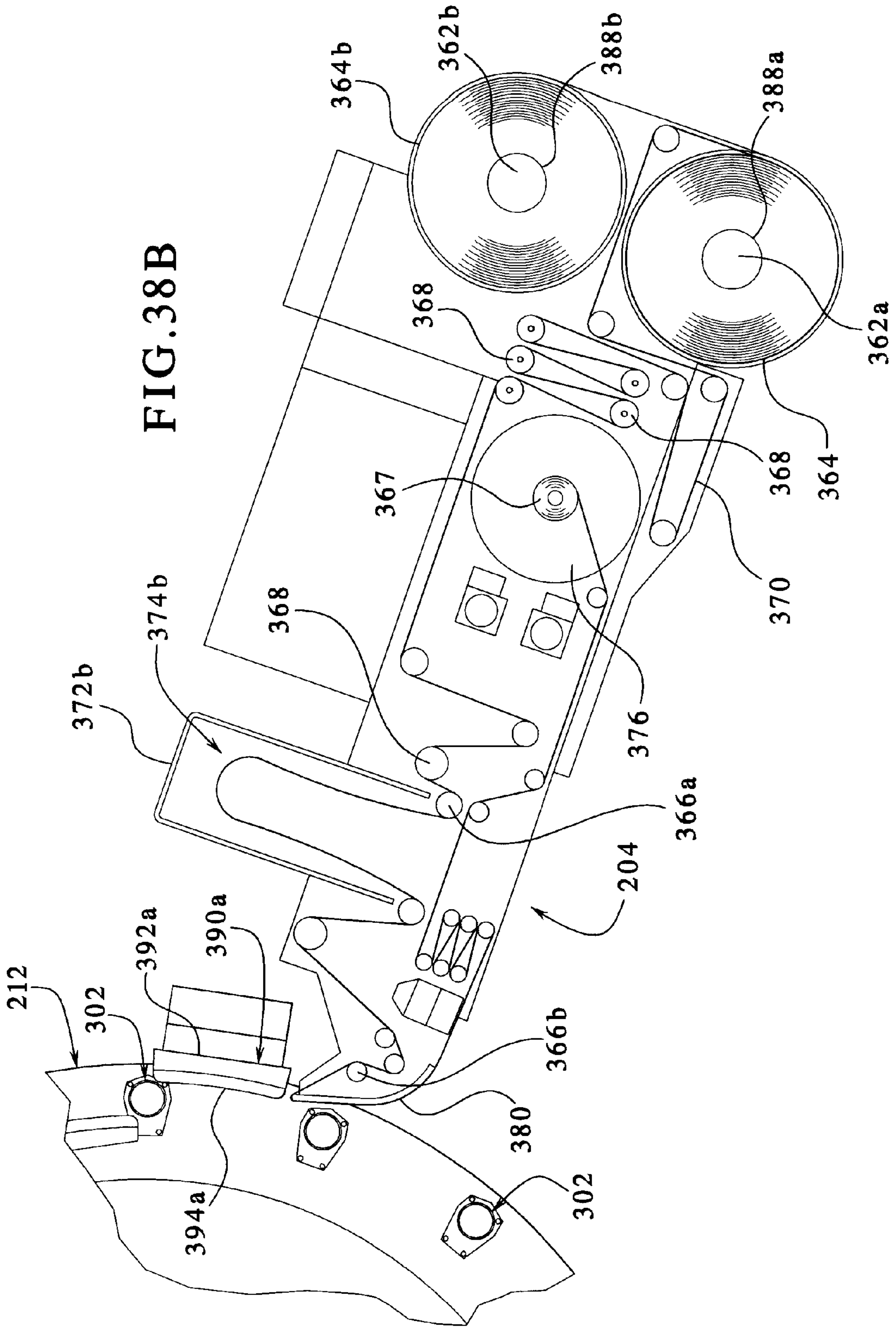
FIG. 38B is a top plan view of an alternative embodiment of a reinforcing member dispenser of the cup reinforcing system disclosed herein, illustrating an alternative design of a release liner slack accumulator.

As seen in FIG. 38A, the reinforcing member dispenser 204 also includes a release liner slack accumulator 372*a* supported by the adjustable base 386 and configured to provide a designated area 374*a* where slack in the release liner may accumulate. As seen in FIG. 38B, in an alternative embodiment, the reinforcing member dispenser 204 includes an alternatively designed release liner slack accumulator 372*b* supported by the adjustable base 386 and configured to provide an alternatively designed designated area 374*b* where slack in the release liner may accumulate. In one embodiment (not shown), the release liner slack accumulator includes one or more debris removes supported by the adjustable base and configured to remove any debris, such as dust or powder, from the back side of the release liner as the release liner is fed into and/or out from the designated area where slack in the release liner may accumulate. The reinforcing member dispenser 204 also include a liner accumulation holder 376 supported by the adjustable base 386 and configured to hold the release liner after separation from the reinforcing members.

As seen in FIGS. 42B and 43A to 43F, the reinforcing member dispenser 204 also includes at least one sensor 378 supported by the adjustable base 386 and configured for determining the location of a reinforcing member 42. It should be appreciated that the height and position of the sensor 378 may be adjusted depending on the configuration of the cups which are being reinforced. In one embodiment, the reinforcing member dispenser also includes one or more sensors (not shown) supported by the adjustable base and configured for determining the position and amount of release liner which has accumulated in the designated area of the release liner slack accumulator. The reinforcing member dispenser 204 includes a release liner separator 380, such as a separation plate, supported by the adjustable base 386 and configured for separating the reinforcing members from the release liner.

Each reinforcing member supply holder 362 is configured to hold a wound supply roll of liner 56 (which the plurality of reinforcing members are releaseably attached to). In one embodiment, each roll of wound reinforcing members are held in a horizontal configuration. In this embodiment, as the reinforcing members are held in the same configuration which they will be applied to the base cups, it is not necessary to reconfigure or otherwise twist the reinforcing members prior to application to the cups. In another embodiment, each roll of wound reinforcing members are held in a vertical configuration. In this embodiment, the reinforcing members must be reconfigured or twisted prior to application to the base cups.

In one embodiment, the plurality of guide rollers 368 of the reinforcing member dispenser 204 are designed to feed the liner 56 from the liner supply roll 364, past the liner splicer 370, through the release liner slack accumulator 372, past the sensor 378 and the release liner separator 380 and to the roll of used liner 376. In one embodiment, one, more or each of the guide rollers 368 includes a knurled surface to better engage the release liner as it is fed through the reinforcing member dispenser. In another embodiment, one, more or each of the guide rollers 368 includes a rubber surface to better engage the release liner as it is fed through the reinforcing member dispenser. It should be appreciated that the rollers are of suitable height to accommodate the size of the release liner (and the attached reinforcing members) which are engaged by the plurality of rollers.

Figure 39:
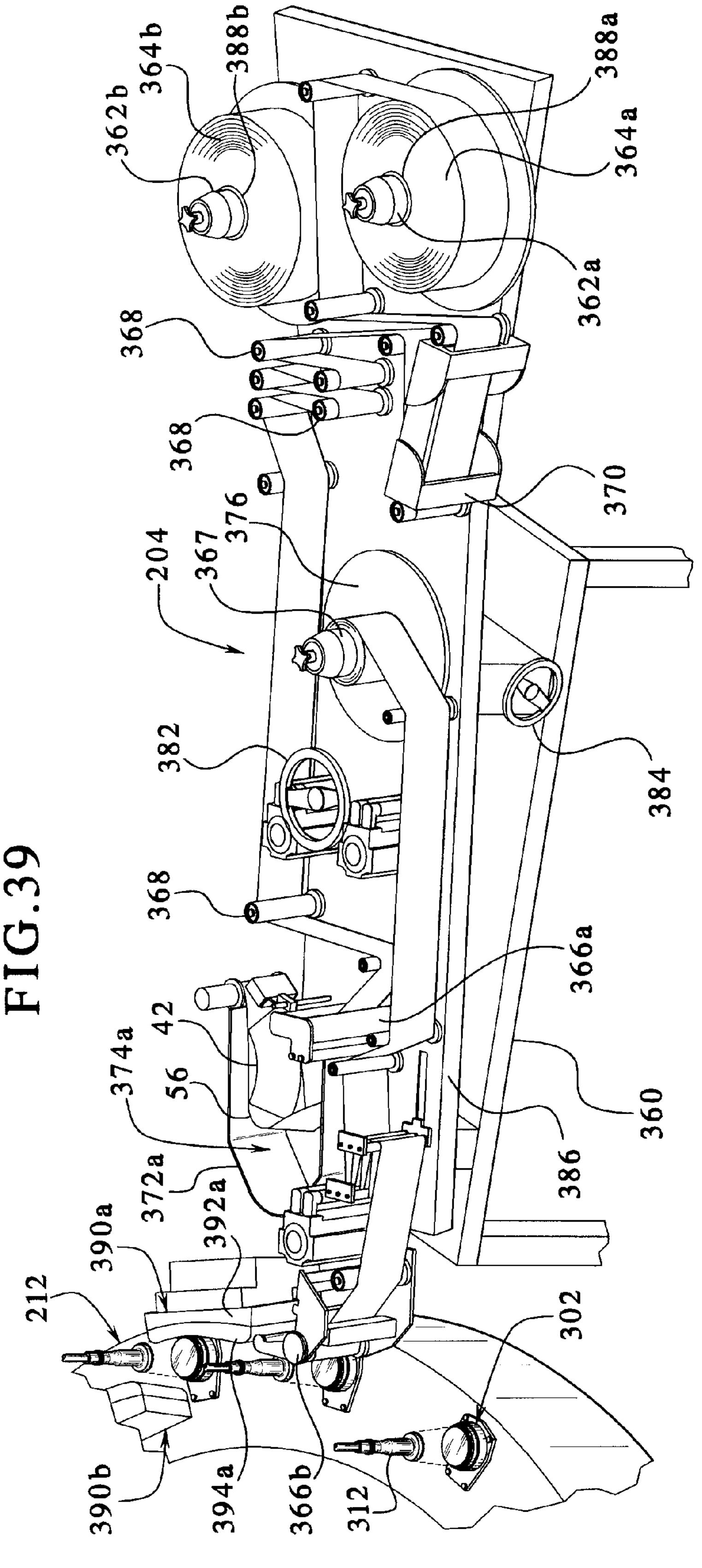
FIG. 39 a front perspective view of the reinforcing member dispenser of FIG. 38A, illustrating the reinforcing member dispenser at an appropriate angle relative to the cup mover.
Figure 40:
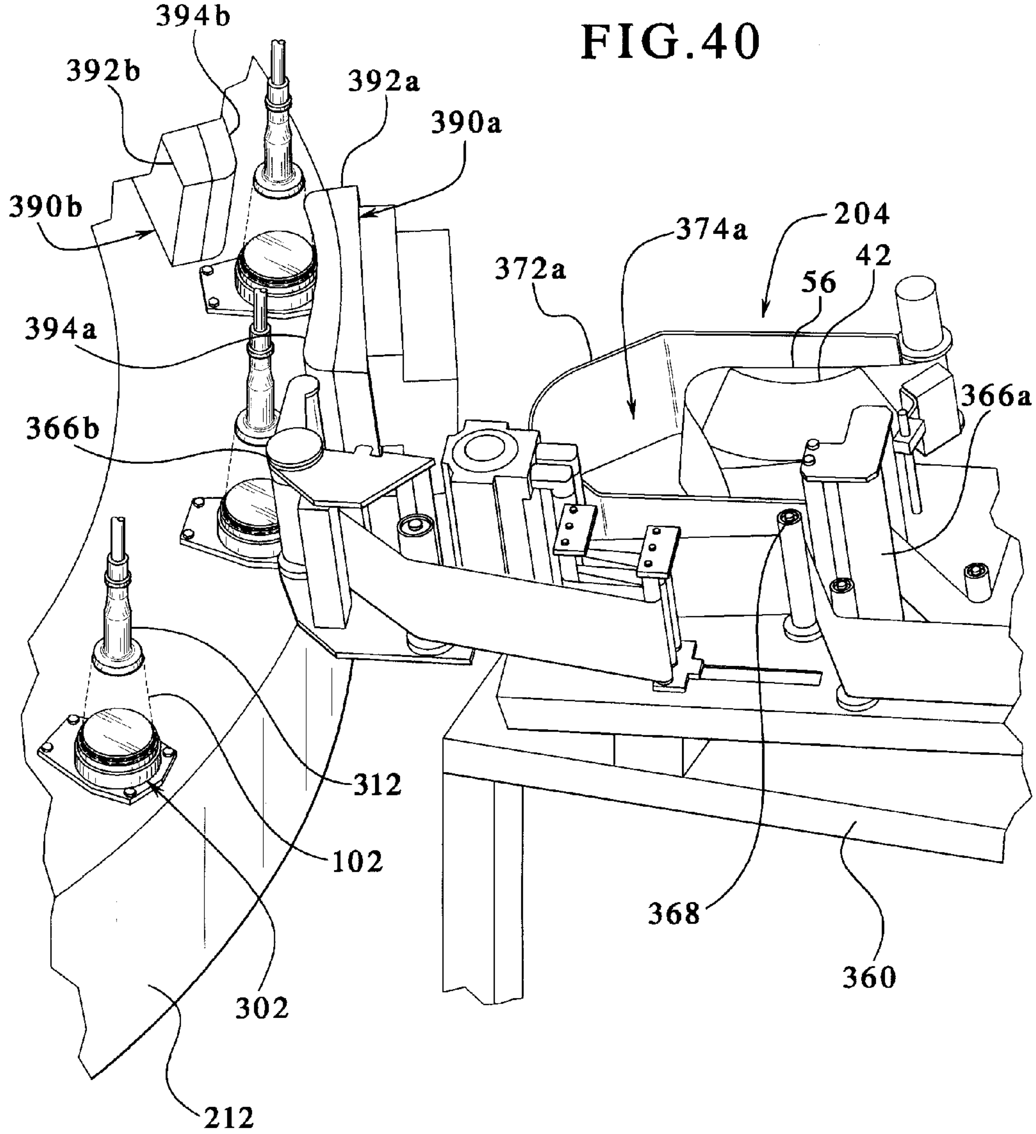
FIG. 40 an enlarged front perspective view of the reinforcing member dispenser of FIG. 38A, illustrating a portion of the reinforcing member dispenser interacting with the cups transported via the cup mover.

As best illustrated in FIGS. 39 and 40, the release liner slack accumulator 372 is an elongated substantially u-shaped member which provides a designated area 374 wherein slack in the liner 56 may accumulate. That is, due to the need to accurately apply the reinforcing members to the tapered side wall of the cup along the centered vertical axis of the reinforcing member, the processor of the cup reinforcing system often must adjust the speed which the reinforcing members are moving to insure that the cups moving on the turntable and the reinforcing members dispensed by the reinforcing dispenser come into contact at the appropriate time and location such that the centered vertical axis of the reinforcing member is applied to the cup on a consistent basis with a range of error of less than plus or minus 0.1 inches. In other words, providing an area where slack can accumulate enables the processor of the cup reinforcing system to adjust the speed at which the liner is fed through the reinforcing member dispenser without otherwise affecting the feed of the release liner from the supply of release liner. For example, the designated area of the release liner slack accumulator is operable to accommodate the length of release liner which five to six reinforcing members are releasably attached to. It should be appreciated that the release liner slack accumulator associated with the cup reinforcing system disclosed herein is longer and more narrow than the release liner slack accumulators of known bottle labeling systems to accommodate for the increased length of the reinforcing members applied to the base cups.

As described above, the sensor 378 of each reinforcing member dispenser 204 is utilized for determining or verifying the location or position of the reinforcing member 42 relative to the position of the cup 102. The sensor may be any suitable sensor, including but not limited to optical sensors or ultrasonic sensors. In operation, the sensor 378 detects the location of the substantially vertical portion of the front or leading edge 70 of the reinforcing member 42 to determine the relative position of the reinforcing member. Based on this determined position of the reinforcing member and any other suitable information (such as the speed the cup is moving, the speed the reinforcing member is being fed through the reinforcing member dispenser, the length of the reinforcing member and the diameter of the cup), the processor 402 of the cup reinforcing system determines or calculates when the reinforcing member is moved into a position in which the centered vertical axis of the reinforcing member is aligned with the tapered side wall of the base cup.

Figure 42A:
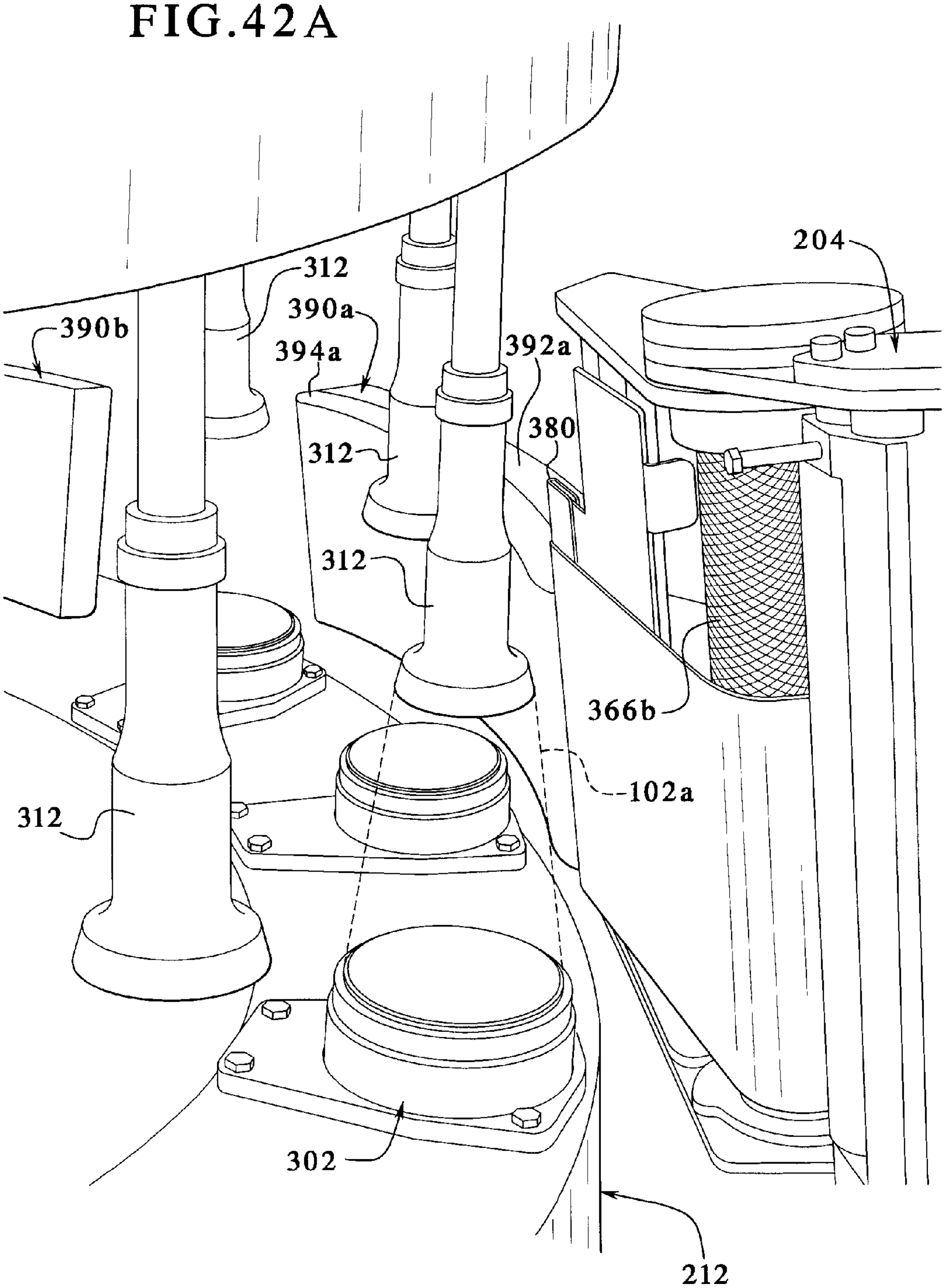
FIGS. 42A to 42E are perspective views of the interaction between the cup mover and the reinforcing member dispenser of one embodiment of the cup reinforcing system disclosed herein.
Figure 42B:
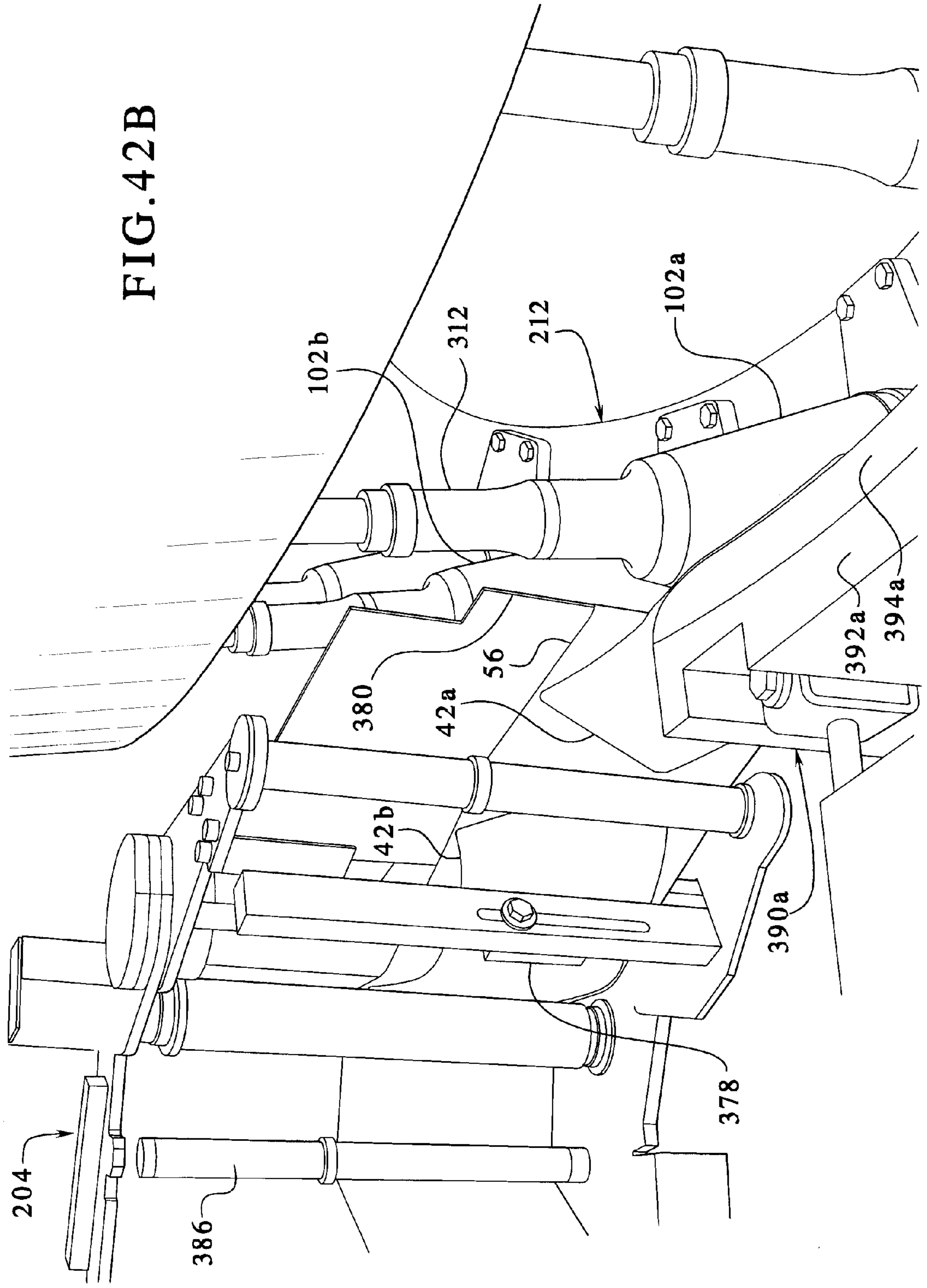

As best illustrated in FIG. 42B, the sensor 378 is positioned or placed such that the sensor detects the relative location of each reinforcing member immediately prior to that reinforcing member being affixed to a base cup. In this embodiment, positioning the sensor at such a location provides for increased accuracy in the placement of the reinforcing member on the base cup which provides for a proper engagement between the reinforcing member and the cup. It should be appreciated that in a bottle labeling machine, since the labels first engage the bottles at the labels leading edge, accuracy in attaching the labels at a specific position of the label is sacrificed to increase the speed which the labels are attached. Accordingly, the sensor in known bottle labeling machines is placed at a position substantially upstream from where the labels are attached to the bottles. On the other hand, in the cup reinforcing system disclosed herein, since the reinforcing members must be attached to the tapered side wall of the base cup not by the leading edge but at a specific position along the centered vertical axis, the sensor is placed adjacent to where the reinforcing member will engage the base cup to increase the accuracy in attaching the reinforcing member at a specific position. In this embodiment, the cup reinforcing system disclosed herein sacrifices the speed which the cups may be reinforced in exchange for increased accuracy in the proper reinforcement of such cups and specifically the proper positioning of the attachment of the reinforcing members to the tapered side walls of the cups.

The release liner separator 380, such as a separation plate, of each reinforcing member dispenser 204 is configured to separate the reinforcing members 42 from the release liner 56. That is, based on the orientation of the reinforcing member 42 relative to the release liner separator, the reinforcing members will separate from the release liner (which protects the pressure sensitive adhesive) when the reinforcing members are fed, via the release liner, through the release liner separator 380. It should be appreciated that since the reinforcing members are toward the base cups at a suitable angle offset form a vertical plane which corresponds with the angle (also offset from a vertical plane) of the tapered side wall of the base cup, the release liner separator 380 is also suitably angled offset from a vertical plane.

The liner accumulation holder 376 is configured to accumulate and suitably wind the release liner after the reinforcing members are separated from the release liner. In one embodiment, after the release liner passes the reinforcing member point of attachment or point of engagement, the release liner is fed, via one or more suitable rollers, to the release liner accumulation holder. In one embodiment, the liner accumulation holder is movably connected or coupled to one or more actuators (or other suitable movement generating devices controlled by the cup reinforcing system processor) which causes the liner accumulation holder 376 to rotate or move in any suitable direction at any suitable speed. In different embodiments, each wound roll of used release liner is held in a horizontal configuration or in a vertical configuration.

As seen in FIG. 18A, the cup reinforcing system disclosed herein may sequentially utilize a plurality of cup reinforcing dispensers 204*a* and 204*b*. In operation, while a first cup reinforcing dispenser 204*a* is applying or attaching a plurality of reinforcing members 42 to a plurality of cups 102, a second cup reinforcing dispenser 204*b* is being suitably prepared (i.e., part of the wound roll of liner is fed, via the rollers, through the entire cup reinforcing dispense) to also apply or attach reinforcing members. Accordingly, when the supply of reinforcing members of the first cup reinforcing dispenser 204*a* is exhausted, the second cup reinforcing dispenser 204*b* begins applying or attaching a plurality of reinforcing members to a plurality of base cups with minimal delay.

As seen in FIG. 41A to 41D, in various alternative embodiments, a plurality of reinforcing member dispensers 204*a*, 204*b* and 204*c* are operable to sequentially reinforce each cup 102. In this embodiment, a first reinforcing member is applied to a base cup by a first reinforcing member dispenser followed by the application of a second reinforcing member by a second reinforcing member dispenser. For example, the first reinforcing member dispenser 204*a* applies a first reinforcing member to a base cup at a first point of engagement on the cup mover and at a second, downstream point of engagement, a second reinforcing member is applied by a second reinforcing member dispenser 204*b* or 204*c*. It should be appreciated that in this embodiment, any suitable number of reinforcing member dispensers 204 may be implemented in accordance with the cup reinforcing system disclosed herein.

Figure 41A:
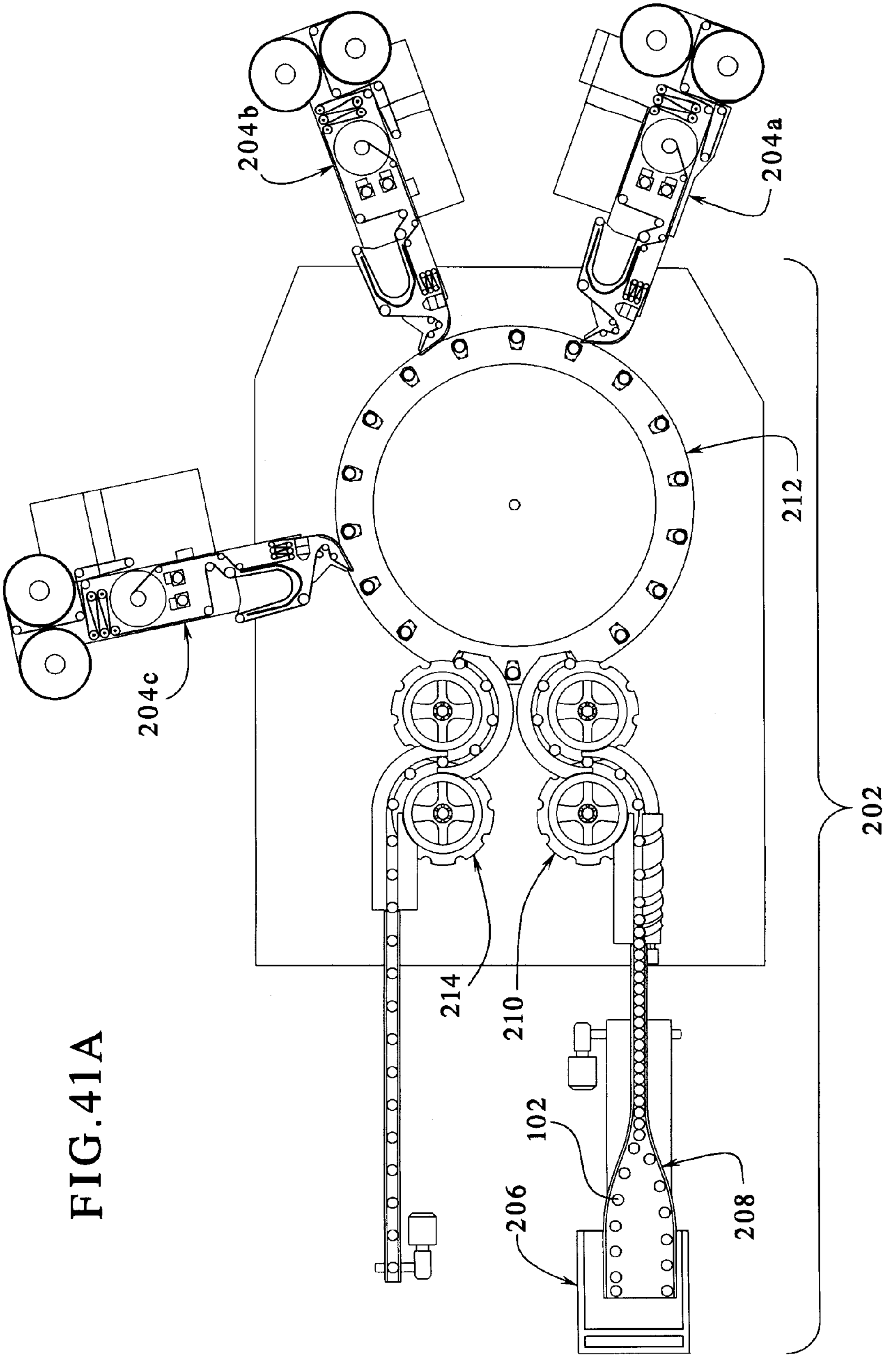
FIG. 41A is a diagrammatic top plan view of an alternative embodiment of the cup reinforcing system disclosed herein.
Figure 41B:
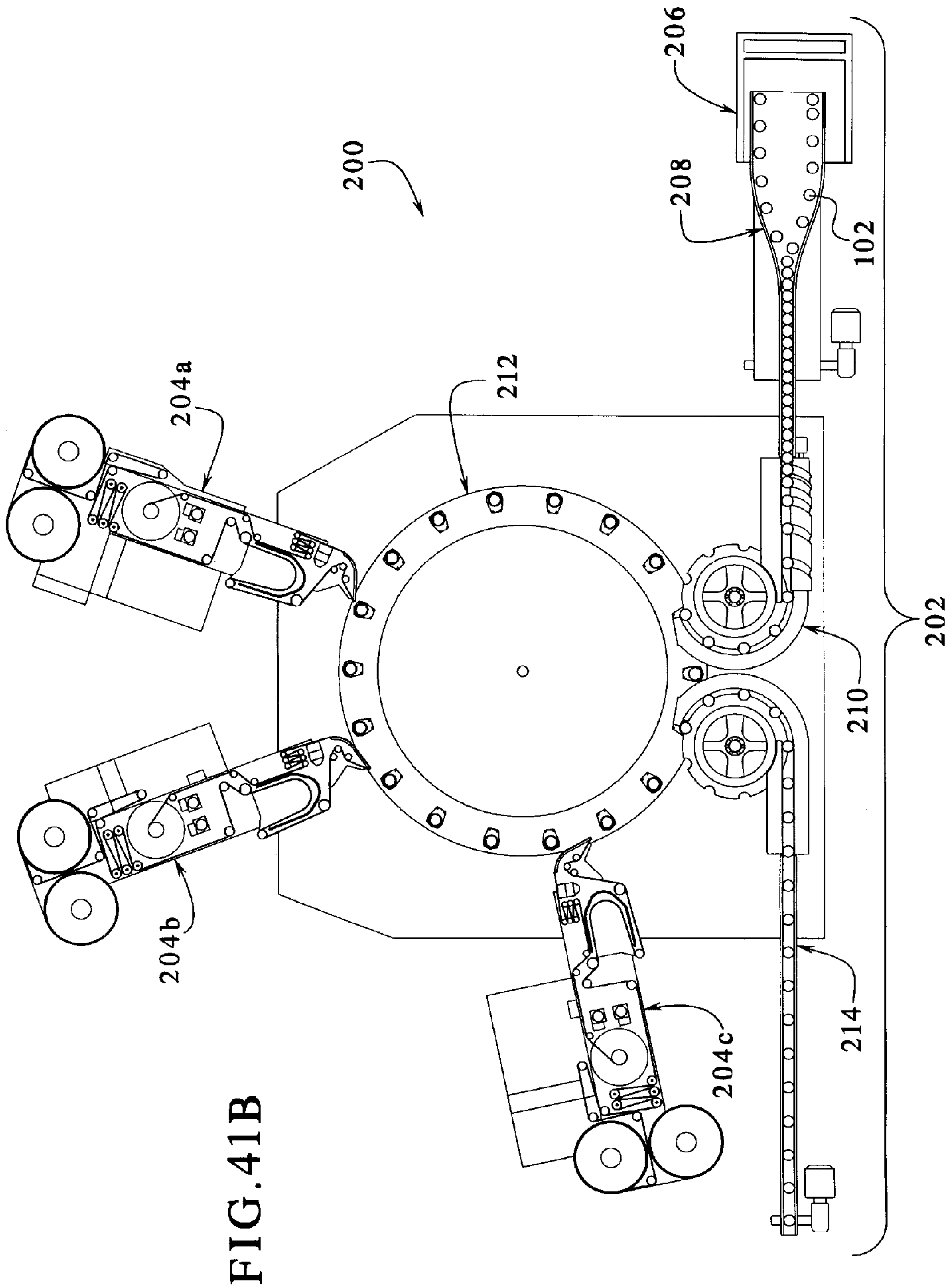
FIG. 41B is a diagrammatic top plan view of an alternative embodiment of the cup reinforcing system disclosed herein.
Figure 41C:
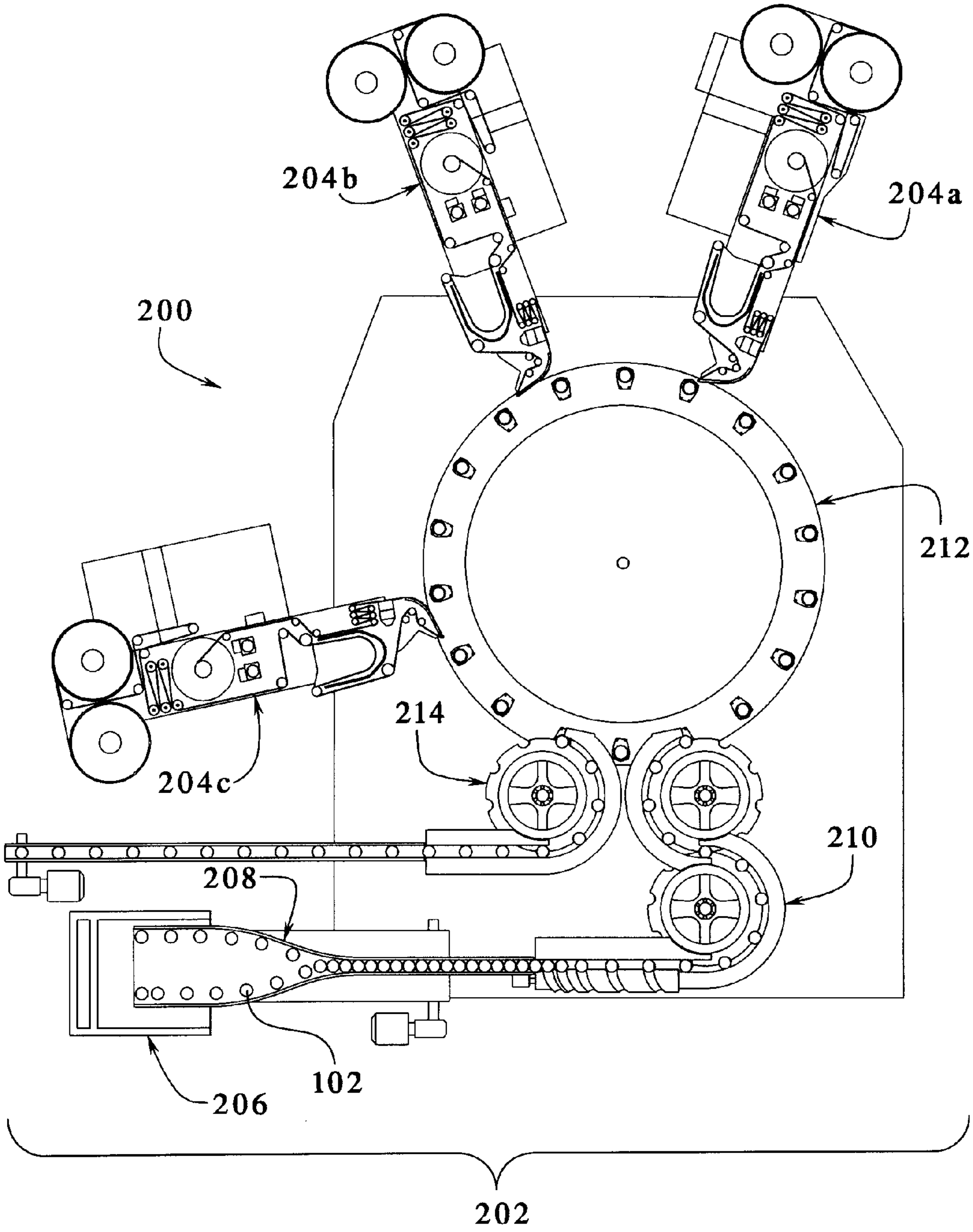
FIG. 41C is a diagrammatic top plan view of an alternative embodiment of the cup reinforcing system disclosed herein.
Figure 41D:
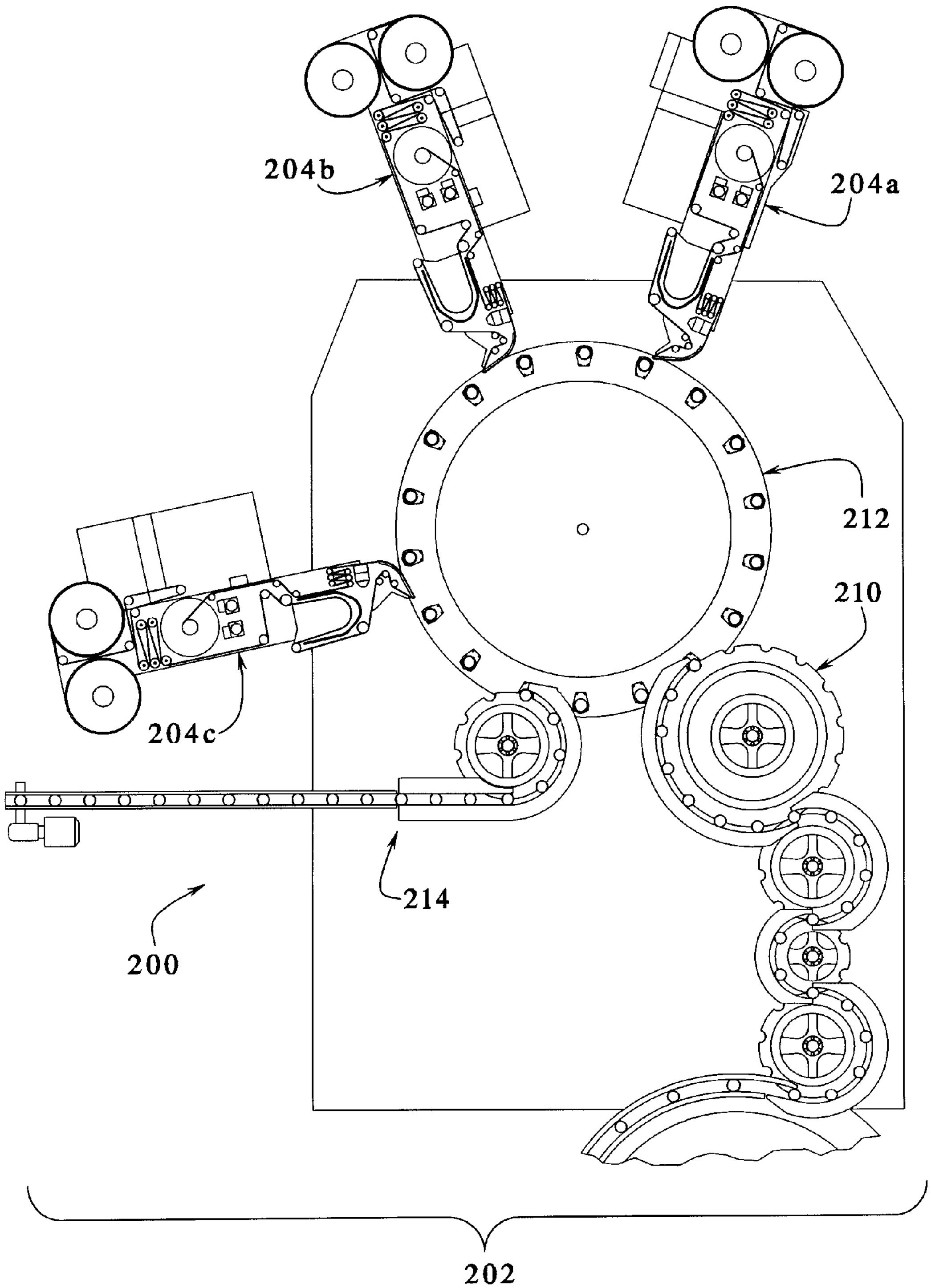
FIG. 41D is a diagrammatic top plan view of an alternative embodiment of the cup reinforcing system disclosed herein.

It should be appreciated that any suitable configuration of the cup reinforcing system and specifically any suitable design of the cup conveyor system relative to one or more reinforcing member dispensers may be utilized to attach a reinforcing member to a base cup as described above. For example, FIG. 41A illustrates the configuration of the cup conveyor illustrated in FIGS. 18A and 18B with three reinforcing member dispensers. FIG. 41B illustrates another embodiment wherein the cup spacer and cup remover each utilize one star-wheel and the cups enter and exit the cup reinforcing system through opposite ends. FIG. 41C illustrates another embodiment wherein the cup spacer utilizes two star-wheels, the cup remover utilizes one star-wheel and the cups enter and exit the cup reinforcing system through the same end. FIG. 41D illustrates another embodiment wherein the cup spacer utilizes a plurality of star-wheels, the cup remover utilizes one star-wheel and the cups enter and exit the cup reinforcing system through different ends.

Figure 43A:
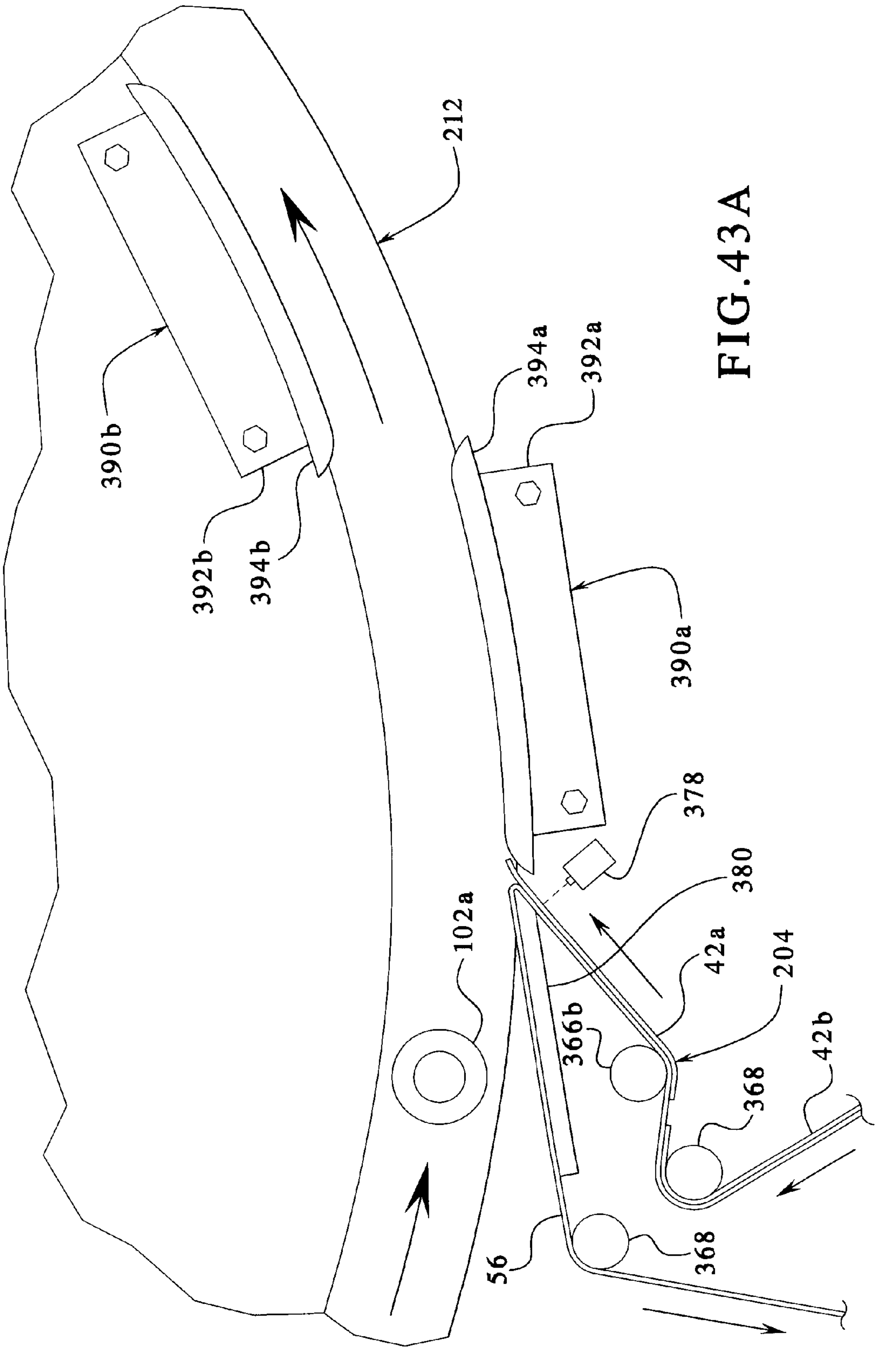
FIGS. 43A to 43F are diagrammatic top plan views of the cup reinforcing system disclosed herein, illustrating one embodiment of the attachment of a reinforcing member to a plastic foam cup.
Figure 43B:
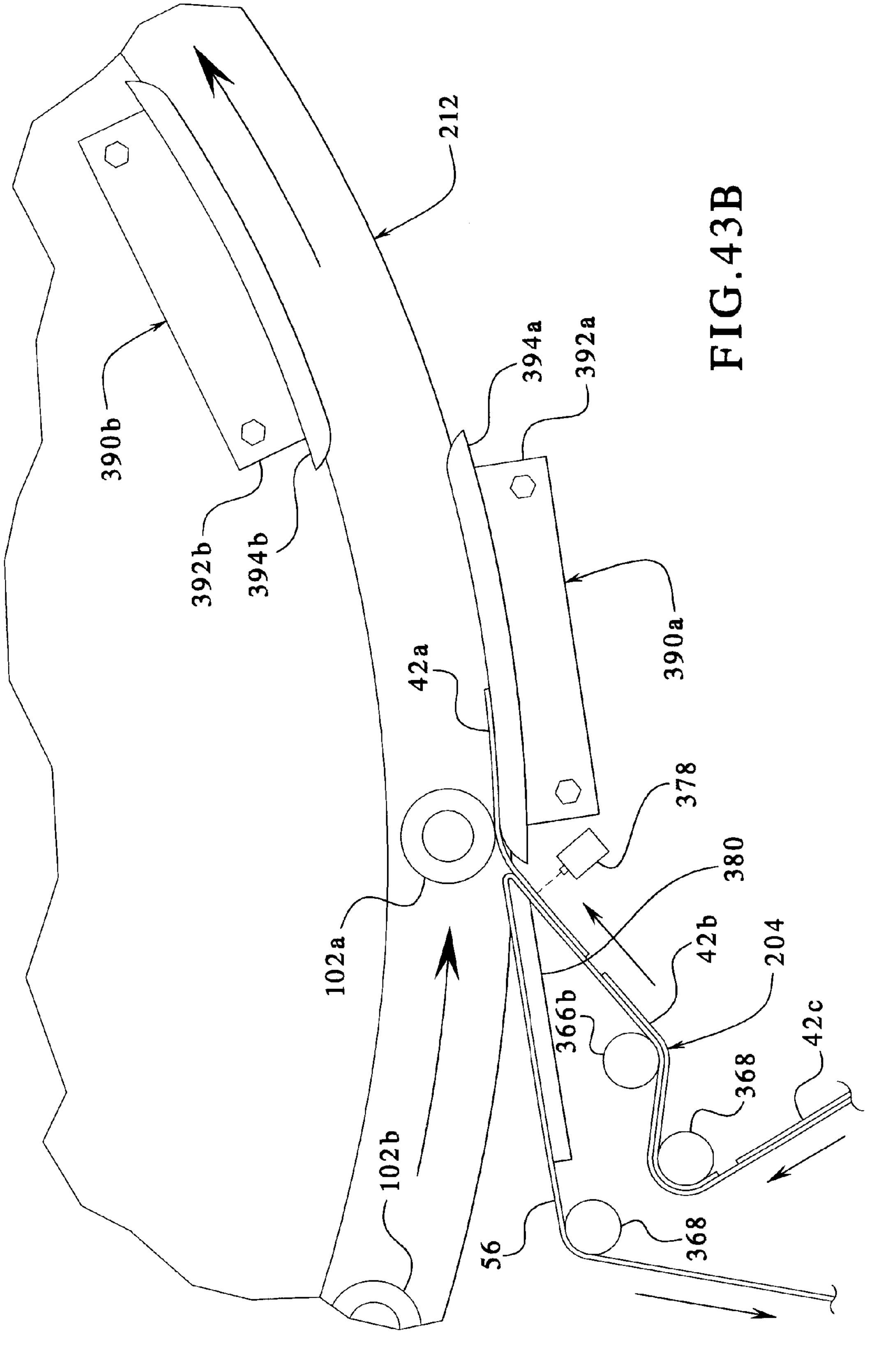

In an alternative embodiment, as illustrated in FIGS. 42A and 43A, a first base or pre-reinforced cup 102*a* is moved into an attachment position and the reinforcing member dispenser 204 dispenses a first reinforcing member 42*a*. As seen in FIGS. 42B and 43B, the reinforcing member engages the tapered side wall of the base cup. As described above, the first reinforcing member 42*a* engages the tapered side wall of the first base cup 102*a* at an angle offset from a vertical plane which corresponds to the angle of the tapered side wall of the base cup.

Figure 43C:
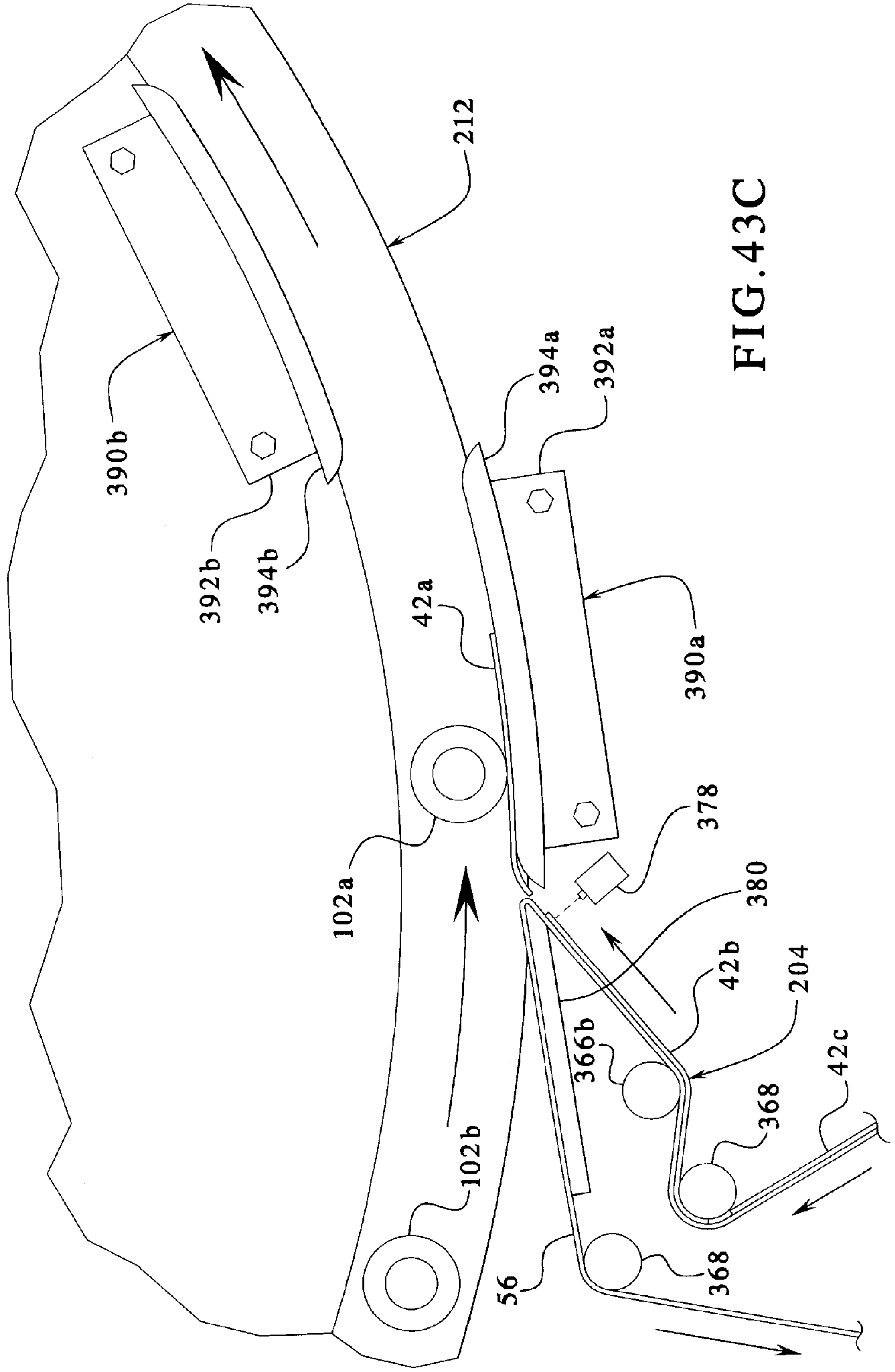

As illustrated in FIG. 43C, after the first reinforcing member 42*a* engages the first base cup 102*a*, in one embodiment, the first cup 102*a* is moved, via the cup mover 212, downstream from the point of engagement or attachment of the reinforcing member. In this embodiment, since the first reinforcing member 42*a* is attached, along a centered vertical plane, to the tapered side wall of the first base cup 102*a*, as the cup is moved away from the point of engagement, any remaining portion of the first reinforcing member 42*a* which is attached to the release liner is separated from the release liner 56.

Figure 42C:
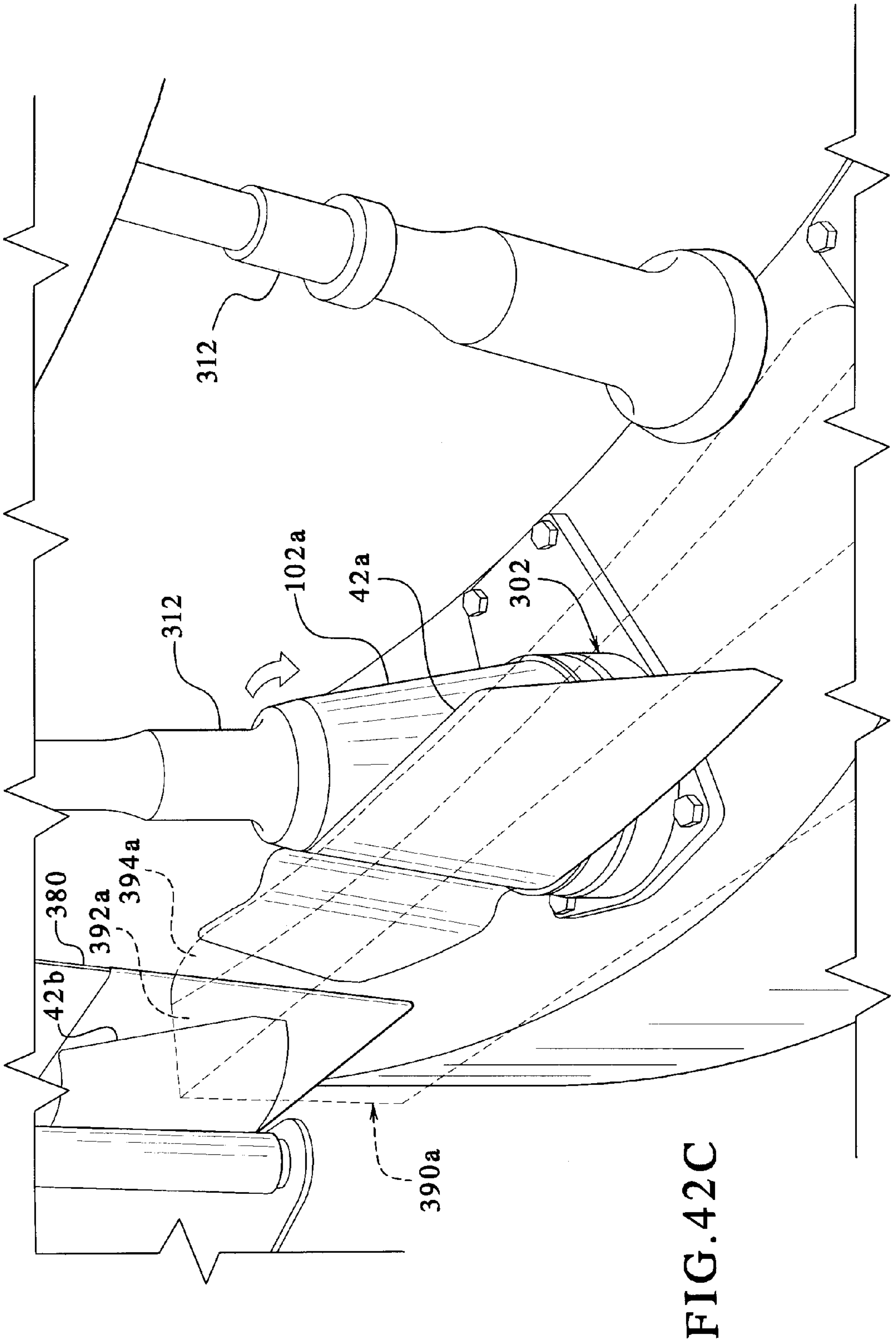
Figure 43D:
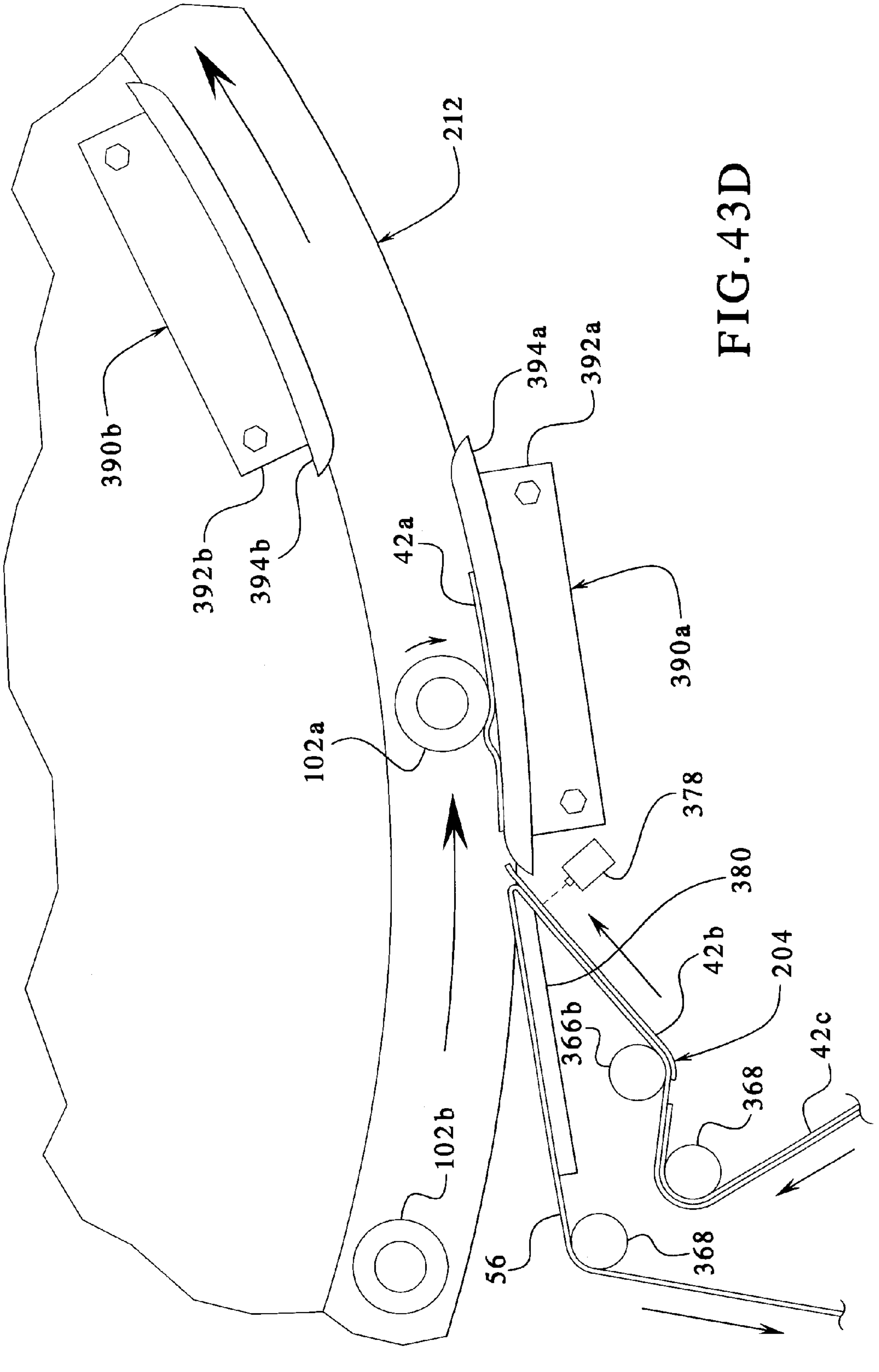

As illustrated in FIGS. 42C and 43D, after the first cup 102*a* and first reinforcing member 42*a* are moved downstream from the point of engagement to completely separate the first reinforcing member 42*a* from the release liner 56, in one embodiment, the first base cup 102*a* is rotated 10 degrees to 20 degrees in a first, clockwise direction to attach a first, centered portion of the first reinforcing member 42*a* to the cup. In this embodiment, the rotation of the base cup causes a portion of the reinforcing member and the base cup to engage a reinforcing member application pad 390*a*, such that the tapered side wall of the cup presses against or engages the reinforcing member engaging surface 394*a* of the application pad 390*a* to cause the first, centered portion of the first reinforcing member 42*a* (which is positioned between the tapered side wall and the reinforcing member application pad 390*a*) to engage with and adhere to the tapered side wall of the first cup 102*a*.

It should be appreciated that this first rotation of 10 degrees to 20 degrees reduces the length of the unattached reinforcing member and reduces the possibility that at least one of the edges of the reinforcing member from the first cup will interfere with the attachment of a reinforcing member to a second, subsequently reinforced cup. Moreover, such a first rotation further secures the reinforcing member to the base cup by providing that an area of the reinforcing member greater than the centered vertical axis of the reinforcing member is attached to the base cup. In another embodiment, the reinforcing member is attached to the cup without such a first rotation of 10 degrees to 20 degrees. It should be further appreciated that when the reinforcing member is initially attached to the cup, the sensing edge 70 is: (i) perpendicular or substantially perpendicular to the bottom edge of the cup; and (ii) parallel to the centered vertical axis of the reinforcing member. Such a configuration provides an absolute reference point for the cup reinforcing system to determine the location of the reinforcing member.

Figure 42D:
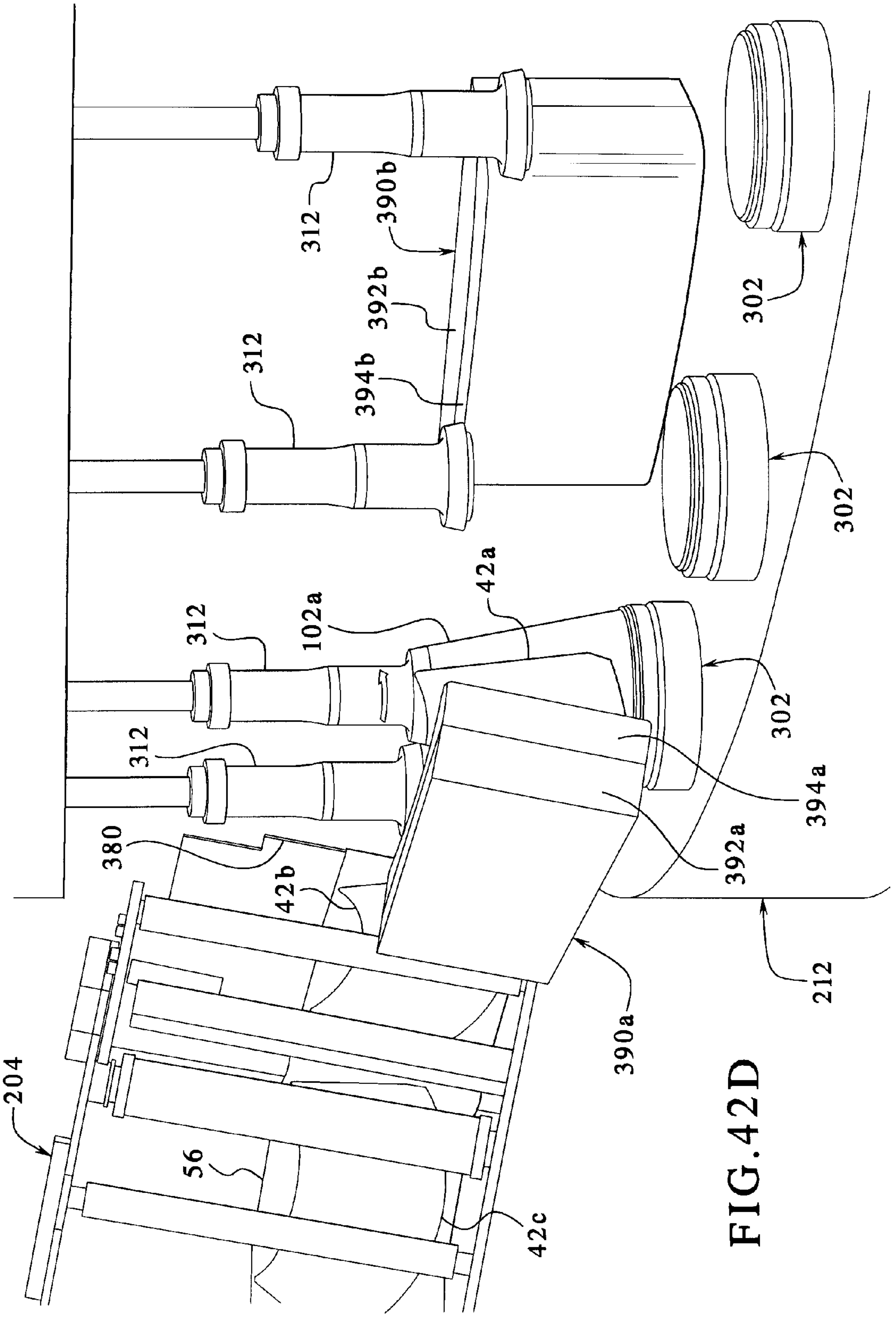
Figure 43E:
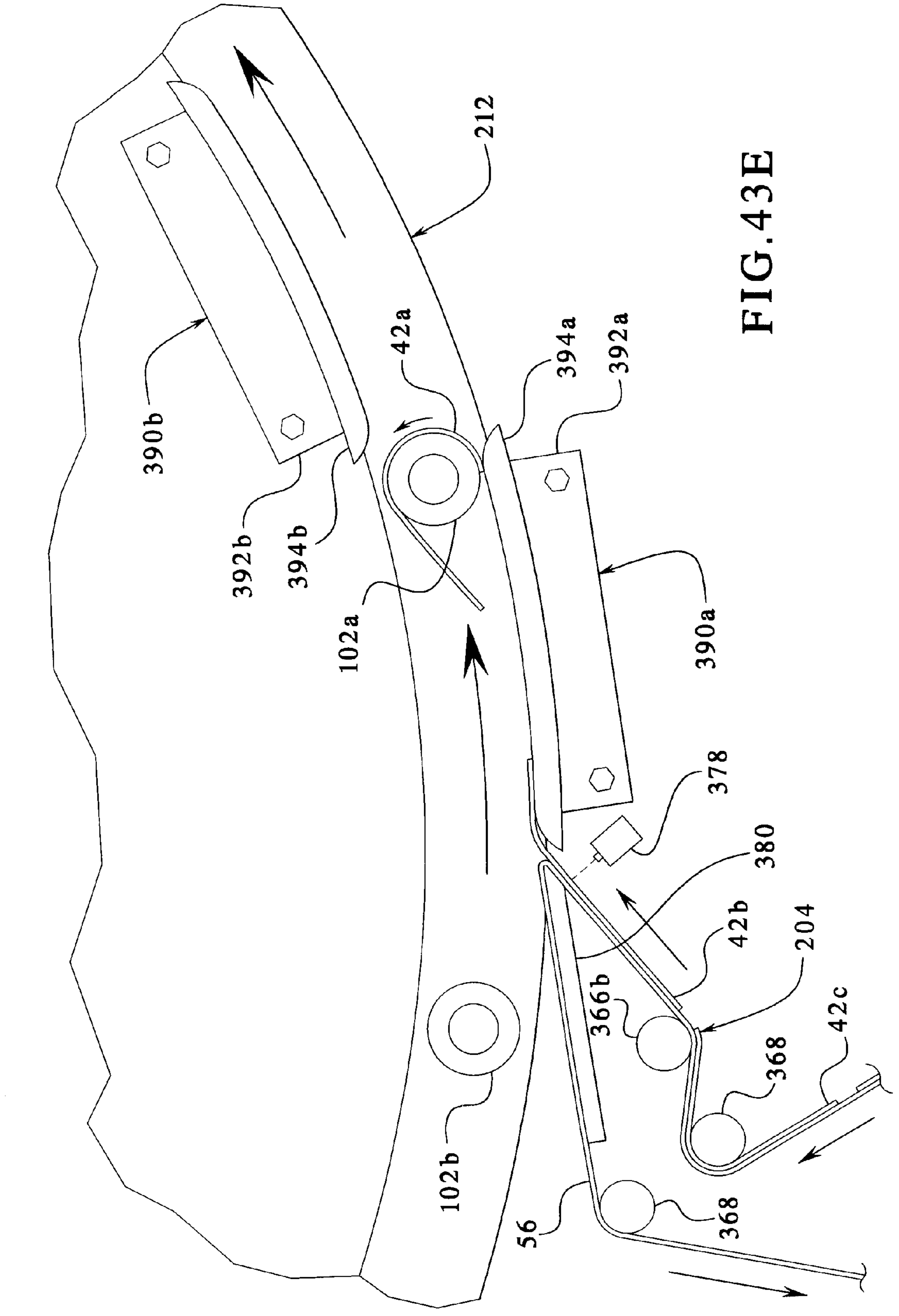

As illustrated in FIGS. 42D and 43E, in one embodiment, the first rotation of the cup is followed by a second, counterclockwise rotation greater than 180 degrees to attach a second, trailing edge portion of the first reinforcing member 42*a* to the first cup 102*a*. In this embodiment, the rotation of the base cup causes a portion of the reinforcing member 42*a* and the cup 102*a* to engage a reinforcing member application pad 390*a*, such that the tapered side wall of the cup presses against or engages the reinforcing member engaging surface 394*a* of the application pad 390*a* to cause the second, trailing edge portion of the first reinforcing member 42*a* (which is positioned between the tapered side wall and the reinforcing member application pad 390*a*) to engage with and adhere to the tapered side wall of the first cup 102*a*.

Figure 42E:
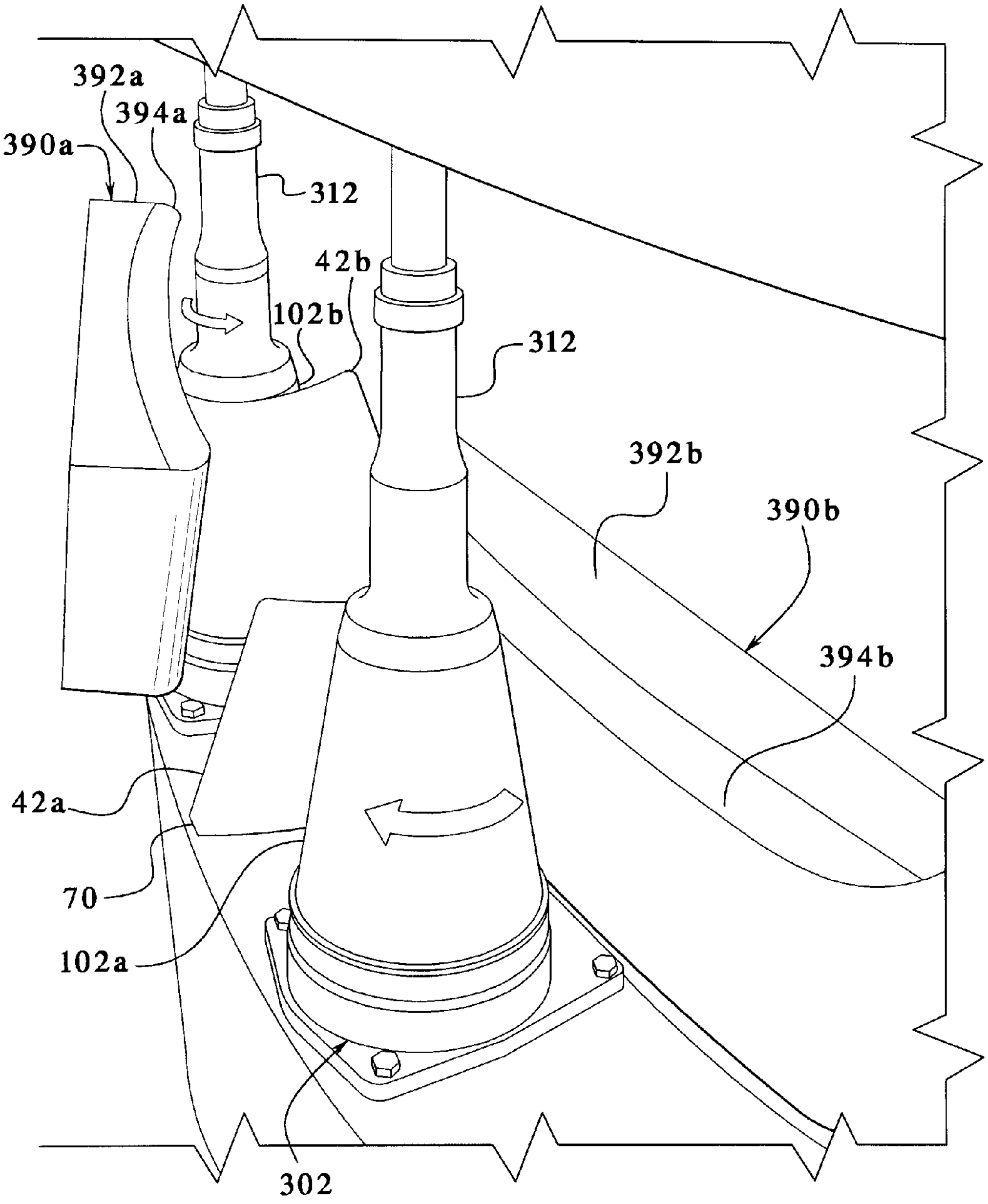
Figure 43F:
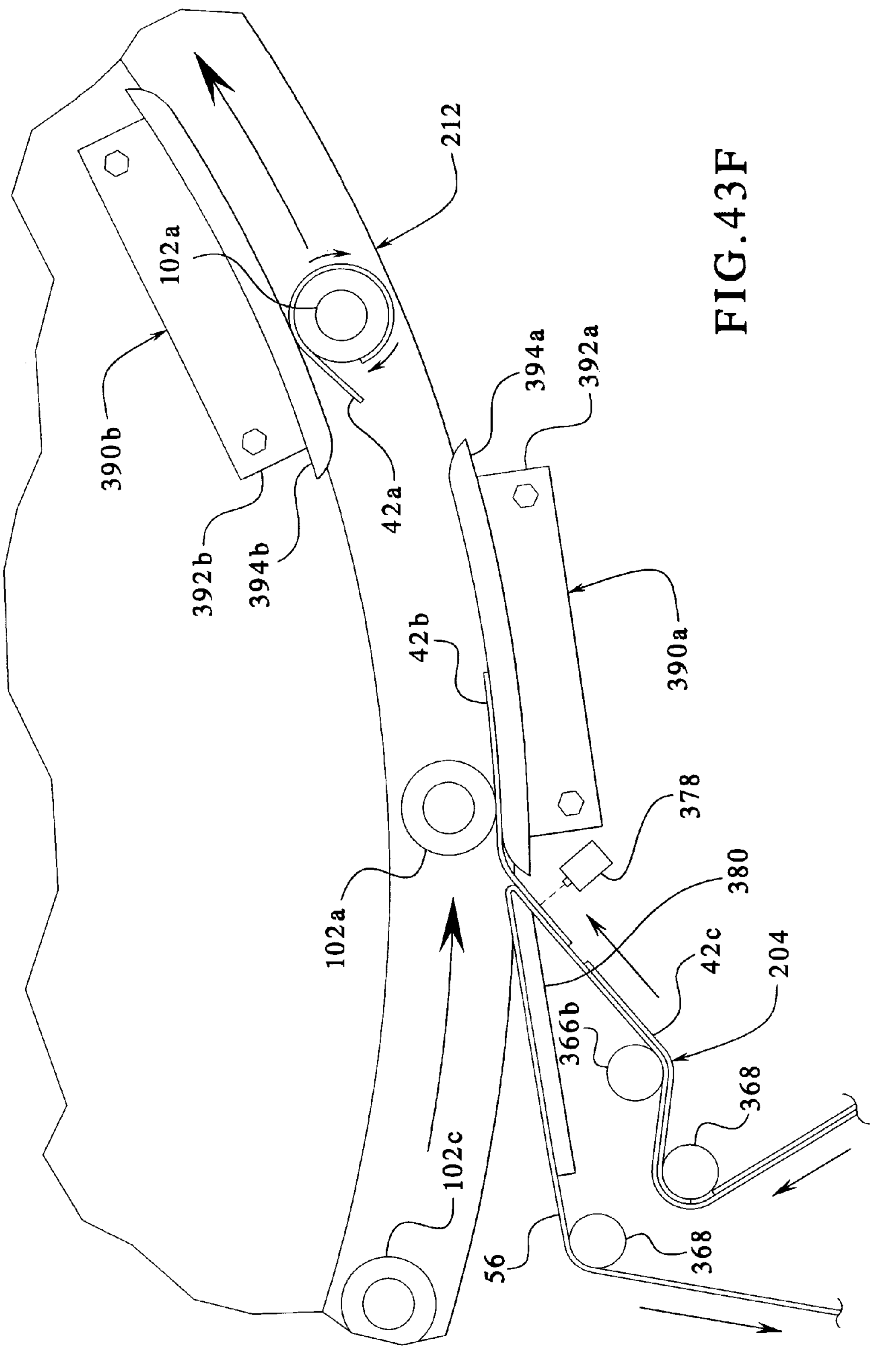

As seen in FIGS. 42E and 43F, in one embodiment, the second rotation is followed by rotating the cup a third, clockwise rotation greater than 360 degrees to attach a third, leading edge portion of the first reinforcing member 42*a* to the first cup 102*a*. In this embodiment, the rotation of the base cup causes a portion of the reinforcing member 42*a* and the cup 102*a* to engage a reinforcing member application pad 390*b*, such that the tapered side wall of the cup presses against or engages the reinforcing member engaging surface 394*b* of the application pad 390*b* to cause the third, leading edge portion of the first reinforcing member 42*a* (which is positioned between the tapered side wall and the reinforcing member application pad 390*a*) to engage with and adhere to the tapered side wall of the first cup 102*a*.

It should be appreciated that as described above, the cup reinforcing system disclosed herein is operable to sequentially reinforce a plurality of cups. As best seen in FIGS. 42D, 42E, 43E and 43F, after the first cup 102*a* and first reinforcing member 42*a* moved downstream from the point of engagement, a second cup 102*b* and a second reinforcing member 42*b* are moved into an appropriate attachment position.

In another embodiment, one or more reinforcing member application pads are movable and suitably operable to attach, either sequentially or simultaneously, the remaining free portions of the reinforcing member to the tapered side wall of the cup. In this embodiment, the cup is kept substantially stationary or stationary and the reinforcing member attachment pads rotate or move to attach the reinforcing member to the tapered sidewall of the cup.

In another embodiment (not shown), the reinforcing member is initially attached to the tapered sidewall of the cup not along the centered vertical axis of the reinforcing member. In this embodiment, the reinforcing member is applied along an off-centered vertical axis of the reinforcing member and the methods described above are suitably modified to compensate for the off-centered point of attachment. In another embodiment (not shown), the reinforcing member is initially attached to the tapered sidewall of the cup along the leading edge of the reinforcing member. Accordingly, it should be appreciated that any suitable method and apparatus operable to target or attach a specific spot or location on the reinforcing member to a specific spot or location on the cup may be utilized in the cup reinforcing system disclosed herein.

Figure 44A:
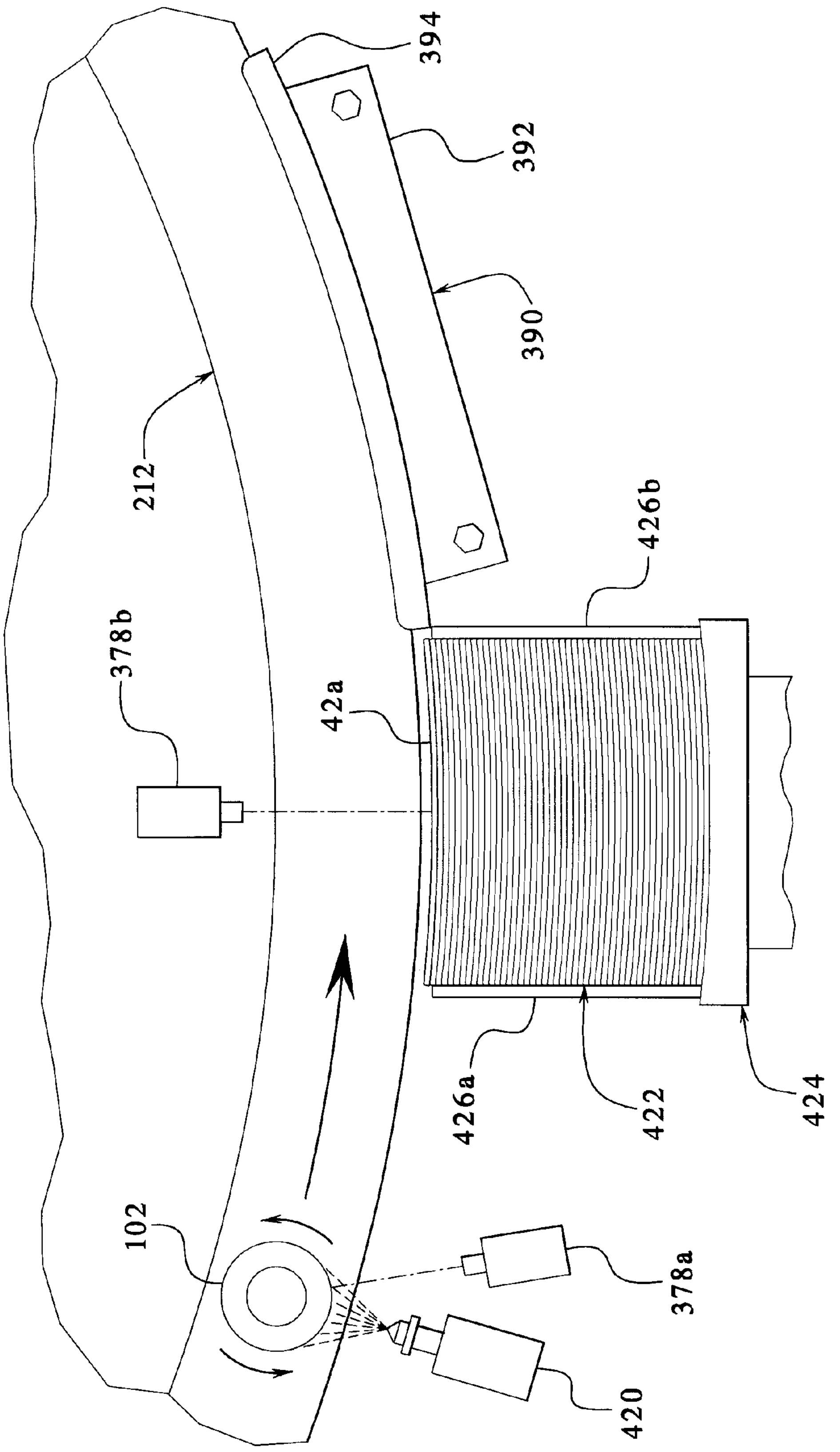
FIGS. 44A to 44D are diagrammatic top plan views of an alternative embodiment of the cup reinforcing system disclosed herein.

In one alternative embodiment, as illustrated in FIGS. 44A to 44D, one side of the reinforcing members are not completely or substantially completely coated with an adhesive. In this embodiment, as described above, the cups are placed on cup holding stations of the cup mover 212 and transported to different areas of the cup reinforcing system. As best seen in FIG. 44A, the cup reinforcing system includes an adhesive application device 420. In operation, when a suitable sensor 378*a* detects the appropriate position of a cup 102, the adhesive application device 420 applies a suitable adhesive directly to the surface of the tapered side walls of the base cup. In one embodiment, the adhesive is applied or sprayed onto the surface of the tapered side wall of the base cup as a mist or atomized spray. It should be appreciated that the adhesive may be applied using other suitable processes such as dipping the base cup into a container of the adhesive.

Figure 44B:
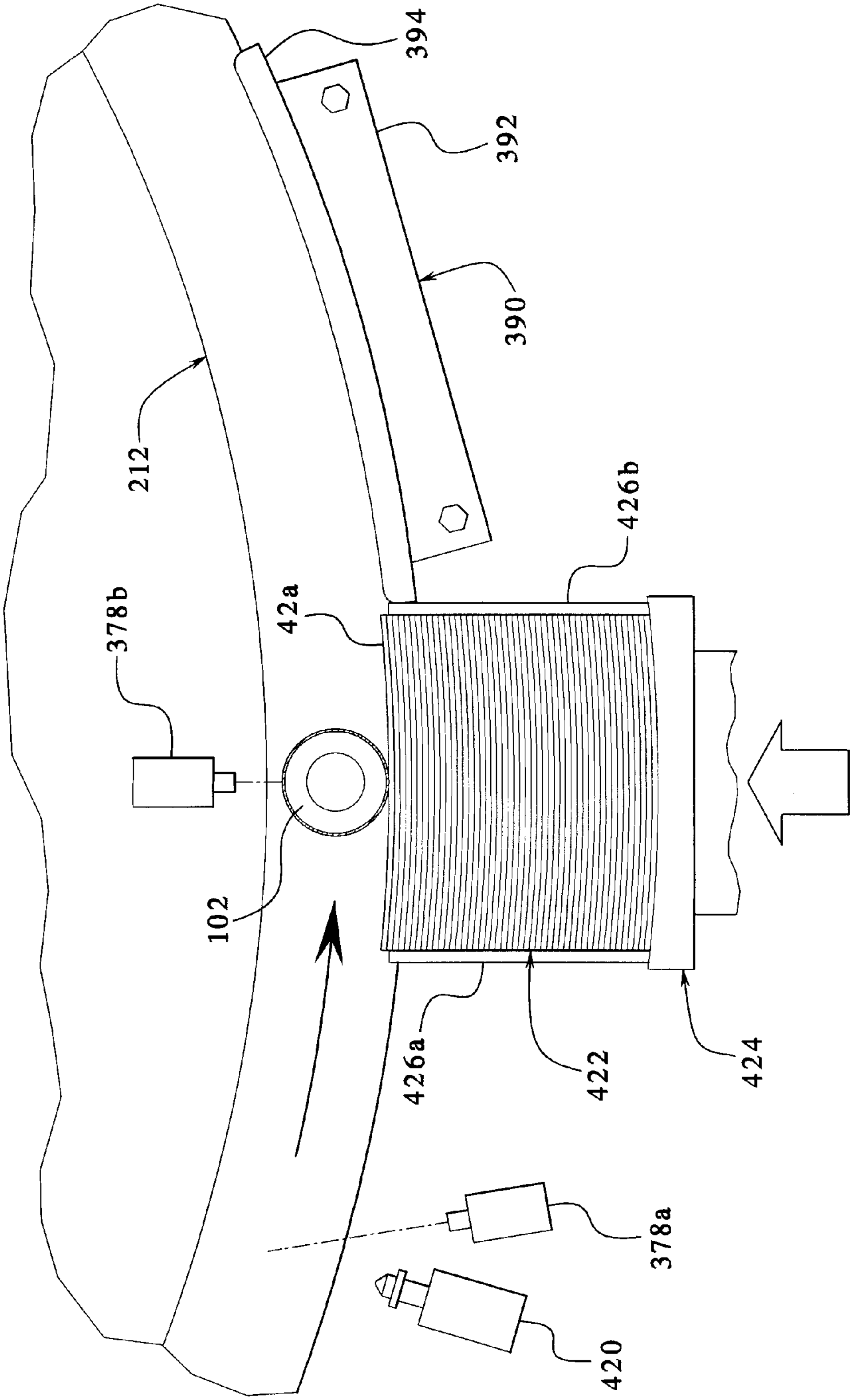

In one such embodiment, as best seen in FIG. 44B, after the tapered side walls of the base cup are completely or substantially completely coated with an adhesive and a suitable sensor 378*b* detects the appropriate position of the cup, a reinforcing member 42 is attached to the base cup. In this embodiment, since one side of the reinforcing members are not coated with an adhesive, the reinforcing members do not need to be stored along a release liner and may be stored as a stack of reinforcing members 422. Accordingly, in this embodiment, a suitable reinforcing member holding device or mechanism 424 dispenses the non-adhesive backed reinforcing members, one at a time, to engage the tapered side wall of the base cups. The reinforcing member holding device 424 includes suitably spaced apart sidewalls 426*a* and 426*b* which support the stack of reinforcing members. The reinforcing member holding device may be connected or coupled to at least one actuator, such as a motor, a spring-loaded mechanism or other suitable movement generating device controlled by the cup reinforcing system processor which causes the reinforcing member holding device to move into a suitable position such that a held reinforcing member engages an adhesive coated cup. In an alternative embodiment, the adhesive is suitably sprayed onto an applicator which applies the adhesive to the sidewall of the cup. In another embodiment, the adhesive is suitably sprayed onto an applicator which applies the adhesive to one of the surfaces of the reinforcing member. As described above, in these alternative embodiments, the reinforcing member is situated at an angle which corresponds with the angle of the tapered side wall of the cup and thus the reinforcing member is attached to the base cup at an angle which corresponds with the angle of the wall of the base cup. Moreover, as described above, in these alternative embodiments, the reinforcing member must initially engage the base cup along the centered vertical axis of the base cup.

Figure 44C:
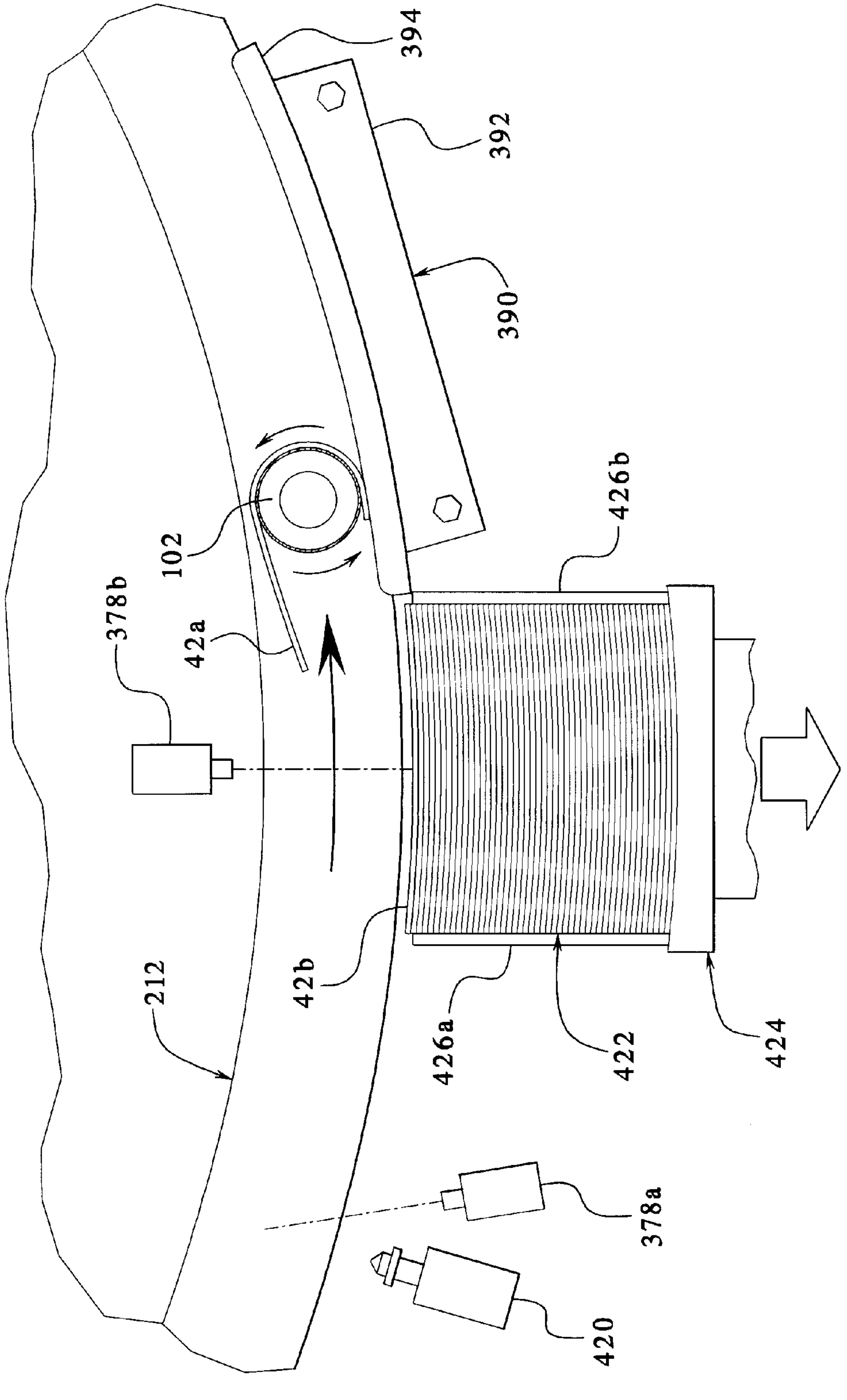

As best illustrated in FIG. 44C, after the reinforcing member 42 is attached to the tapered side wall of the cup 102 along the centered vertical axis 108 of the reinforcing member, this embodiment of the cup reinforcing system is operable to cause the remaining unattached portions of the reinforcing member to engage and attach to the tapered side wall of the cup. In one embodiment, utilizing the cup holding station on which the cup resides, the cup rotates 180 degrees in a first direction. As the cup is rotating, the tapered side wall of the cup presses against or engages a reinforcing member engaging surface 394 of a reinforcing member application pad 390 to cause a first portion or section of the reinforcing member to engage and attach, due to the adhesive coating applied to the sidewall of the cup, to the tapered side wall of the cup. In one embodiment, the first portion or section includes the portion of the reinforcing member which extends from the centered vertical axis to the trailing edge.

Figure 44D:
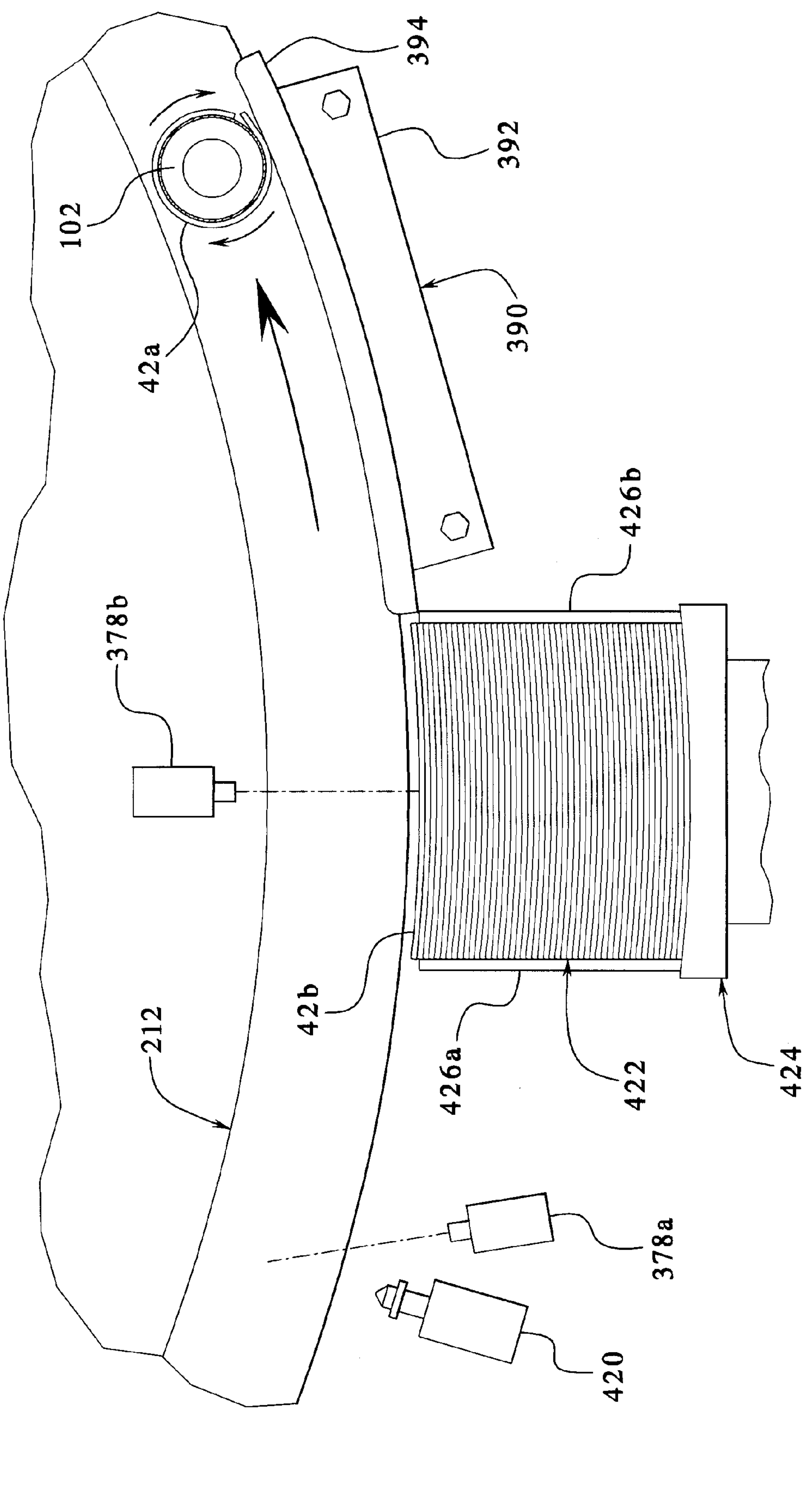

As best seen in FIG. 44D, in one embodiment, following a rotation of the cup in a first direction, the cup is then rotated 360 degrees in an opposite, second direction. As the cup is rotating, the tapered side wall of the cup presses against or engages the reinforcing member engaging surface 394 of the reinforcing member application pad 390 to cause the second portion or section of the reinforcing member to engage and attach to the tapered side wall of the cup. In one embodiment, the second portion or section includes the portion of the reinforcing member which extends from the centered vertical axis to the leading edge. It should be appreciated that this embodiment of the cup reinforcing system is operable to sequentially reinforce a plurality of cups. For example, a first reinforcing member from the stack of reinforcing members engages a first adhesive coated cup followed by a second reinforcing member from the stack of reinforcing members engaging a second adhesive coated cup.

In another alternative embodiment, the structure of the cup reinforcing system illustrated in FIGS. 18A and 18B is suitably reversed. That is, rather than the cup mover 212 rotating in a counter-clockwise direction, the cup mover rotates in a clockwise direction. It should be appreciated that in this embodiment, the individual rotations of each cup holding station would be modified to accommodate for the change in direction of the cup mover. In other words, each cup holding station would rotate each individual cup 15 degrees to 20 degrees in a first, counter-clockwise direction, followed by a second, clockwise rotation greater than 180 degrees and followed by a third, counter-clockwise rotation greater than 360 degrees.

It should be appreciated that the methods and apparatus described above may also be utilized to apply a reinforcing member or otherwise suitably wrap any other container or receptacle, such as a bowl, a bottle, a carton, a dish, a jar, a mug, or a pitcher. It should be further appreciated that the methods and apparatus described above may also be utilized to apply a reinforcing member or otherwise suitably wrap a non-plastic foam container, such as a paper container or another type of plastic container.

Accordingly, in one embodiment, the cup reinforcing system disclosed herein produces a reinforced plastic foam cup including a plastic foam conical body, and a flat reinforcing member affixed around the outer surface of the tapered side wall in an overlapping manner. The plastic foam conical body defines an open top end, a closed bottom end, and a tapered side wall extending from the bottom end to the top end, wherein the top end includes an outwardly rolled lip, the top end has a greater diameter than the bottom end and the tapered side wall having an outer surface and an inner surface. The flat reinforcing member includes a rigid material layer having an inner surface and an outer surface, and a pressure sensitive adhesive layer which covers substantially the entire inner surface of the material layer. Prior to being affixed around the outer surface of the tapered side wall, the reinforcing member has a concave or first edge and a convex or second edge, wherein a trough of the concave edge is aligned in a same plane as an apex of the convex edge. The pre-affixed reinforcing member includes a leading or third edge and a sensing or fourth edge, the leading edge and sensing edge extending between the concave and convex edges at one end of the material layer. The pre-affixed reinforcing member also includes a trailing or fifth edge and an adhesive relief or sixth edge, the trailing edge and adhesive relief edge extending between the concave and convex edges at an opposite end of the material layer, the leading edge and trailing edge extending in intersecting planes, the sensing edge and adhesive relief edge extending in substantially parallel planes. After being affixed around the outer surface of the tapered side wall, the concave edge is adjacent to the closed bottom end of the plastic foam conical body, the convex edge is adjacent to the open top end of the plastic foam conical body, the leading edge and trailing edge extend in substantially parallel planes, and the sensing edge and adhesive relief edge extend in intersecting planes.

In another embodiment, the cup reinforcing system produces a reinforced plastic foam cup, the reinforced cup including a plastic foam cup and a reinforcing member affixed around the outer surface of the tapered side wall in an overlapping manner. The plastic foam cup includes a bottom wall, and a conical shaped side wall integrally formed at one end with the bottom wall and extending from the bottom wall to a top end, the side wall having an inner surface and an outer surface, the bottom wall and side wall defining a cavity, the top end defining an opening for the cavity, the top end having a greater diameter than the bottom end. The plastic foam cup also includes an outwardly extending lip integrally formed with the top end of the side, and a downwardly extending lip integrally formed with the side wall and extending below the bottom wall. The reinforcing member includes a paper material layer having an inner surface and an outer surface, and a pressure sensitive adhesive layer which covers substantially the entire inner surface of the paper material layer. Prior to being affixed around the outer surface of the side wall, the reinforcing member has a concave or first edge, and a convex or second edge, wherein a trough of the concave edge is aligned in a same plane as an apex of the convex edge. The pre-affixed reinforcing member includes a leading or third edge, and a sensing or fourth edge, the leading edge and sensing edge extending between the concave and convex edges at one end of the material layer. The pre-affixed reinforcing member also includes a trailing or fifth edge, and an adhesive relief or sixth edge, the trailing edge and adhesive relief edge extending between the concave and convex edges at an opposite end of the material layer, the leading edge and trailing edge extending in intersecting planes, the sensing edge and the adhesive relief edge extending in substantially parallel planes. After being affixed around the outer surface of the side wall the concave edge is adjacent to a bottom edge of the downwardly extending lip, the convex edge is adjacent to the outwardly extending lip, the leading edge and trailing edge extend in substantially parallel planes, and the sensing edge and adhesive relief edge extend in intersecting planes.

In another embodiment, the cup reinforcing system disclosed herein includes a plastic foam cup reinforcing member supply roll which includes an elongated backing strip and a plurality of flat reinforcing members sequentially aligned along the elongated backing strip. Each reinforcing member including a paper material layer having an inner surface and an outer surface. Each reinforcing member has a concave or first edge, and a convex or second edge, wherein a trough of the concave edge is aligned in a same plane as an apex of the convex edge. Each reinforcing member has a leading or third edge, and a sensing or fourth edge, the leading edge and sensing edge extending between the concave and convex edges at one end of the material layer. Each reinforcing member also has a trailing or fifth edge, and an adhesive relief or sixth edge, the trailing edge and adhesive relief edge extending between the concave edge and convex edge at an opposite end of the material layer, the leading edge and trailing edge extending in intersecting planes, the sensing edge and adhesive relief edge extending in substantially parallel planes. Each reinforcing member configured such that when the reinforcing member is affixed around an outer surface of a tapered side wall of a conical cup having a bottom end and a top end, wherein the top end has a diameter greater than the diameter of the bottom end, the concave edge is adjacent to the bottom end of the conical cup, the convex edge is adjacent to the top end of the conical cup, the leading edge and trailing edge extend in substantially parallel planes, and the sensing edge and adhesive relief edge extend in intersecting planes. Moreover, each the reinforcing member affixed to the backing strip by a pressure sensitive adhesive layer which covers substantially the entire inner surface of the paper material layer.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A plastic foam cup reinforcing apparatus for applying a reinforcing member to a plastic foam cup having an angled side wall, said apparatus comprising:

a cup conveyor including:

(a) a cup dispenser;

(b) a cup feeder;

(c) a cup spacer;

(d) a cup mover including:

(i) a cup mover frame;

(ii) a turntable supported by the cup mover frame;

(iii) a turntable actuator movably coupled to the turntable;

(iv) a plurality of cup holding stations positioned around a periphery of the turntable, wherein each cup holding station includes a base and a spring biased centering bell, wherein each base includes:

(1) a substantially horizontally disposed first wall configured to engage a lip of the upside down cup;

(2) a substantially vertically disposed second wall connected to the first wall, said second wall configured to engage a top portion of an inner surface of the upside down cup; and (3) a beveled third wall connected to the second wall;

wherein each centering bell includes:

(1) a first wall configured to engage a bottom rim of the upside down cup;

(2) an angled second wall configured to engage a bottom portion of an outside surface of the angled side wall of the upside down cup;

(3) a third wall configured to engage a bottom portion of an outer surface of a bottom wall of the upside down cup; and (4) a fourth wall configured to engage a centered raised portion of the outer surface of the bottom wall of the upside down cup; and (v) each holding station coupled to a cup holding station actuator; and (e) a cup remover;

a reinforcing member dispenser and applicator; and at least one processor which at least controls the cup dispenser, the cup feeder, the cup spacer, the cup mover, the cup remover, and the reinforcing member dispenser and applicator.

* * * * *